US007698282B2

(12) United States Patent
Subramaniam et al.

(10) Patent No.: US 7,698,282 B2
(45) Date of Patent: *Apr. 13, 2010

(54) METHOD, APPARATUS, AND SYSTEM FOR REMOTE CLIENT SEARCH INDEXING

(75) Inventors: Pavitra Subramaniam, Alameda, CA (US); Jason Zoss, Foster City, CA (US); Jian-Jung Ying, Foster City, CA (US); Marc Caltabiano, San Francisco, CA (US); Robert H. Wang, Palo Alto, CA (US)

(73) Assignee: Siebel Systems, Inc., San Mateo, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 11/742,935

(22) Filed: May 1, 2007

(65) Prior Publication Data

US 2008/0021881 A1    Jan. 24, 2008

Related U.S. Application Data

(63) Continuation of application No. 09/883,776, filed on Jun. 18, 2001, now Pat. No. 7,213,013.

(51) Int. Cl.
    *G06F 17/30* (2006.01)
(52) U.S. Cl. .............................. 707/10; 707/3; 715/749
(58) Field of Classification Search ................ 707/3, 707/4, 5, 10, 101, 102, 200, 2; 717/172, 717/173, 174, 175, 177, 178; 715/700, 748, 715/749
    See application file for complete search history.

(56) References Cited

U.S. PATENT DOCUMENTS

| 4,754,326 | A | 6/1988 | Kram et al. .................. 364/900 |
| 4,974,191 | A | 11/1990 | Amirghodsi et al. ........ 364/900 |
| 5,161,204 | A | 11/1992 | Hutcheson et al. ........... 382/16 |

(Continued)

FOREIGN PATENT DOCUMENTS

EP        0627691 A1    12/1994

(Continued)

OTHER PUBLICATIONS

QPAT, "Internet Patent Search Resources Took a Big Step Forward with the Introduction of QPAT.US, Questel, Orbit's New Database of Full-Text U.S. Patents, 1974 to Present," Database, Cincinnati, US, vol. 19, No. 4, Aug. 1, 1996, pp. 56-60.

(Continued)

*Primary Examiner*—Greta L Robinson
(74) *Attorney, Agent, or Firm*—Cambpell Stephenson LLP

(57) ABSTRACT

In one embodiment, a method is provided in which search indices are configured on a server. The search indices are associated with corresponding business components. The search indices are displayed to a client that is connected to the server via a computer network. The client is configured to perform search using data records stored on a local machine. One or more particular search indices from the server are downloaded onto the client in response to the client's request to download the one or more particular search indices to be used for searching on the local machine.

18 Claims, 44 Drawing Sheets

U.S. PATENT DOCUMENTS

| | | | |
|---|---|---|---|
| 5,161,225 A | 11/1992 | Abraham et al. | 395/600 |
| 5,220,625 A | 6/1993 | Hatakeyama et al. | 382/54 |
| 5,260,999 A | 11/1993 | Wyman | 384/4 |
| 5,717,914 A | 2/1998 | Husick et al. | 395/605 |
| 5,787,428 A | 7/1998 | Hart | 707/9 |
| 6,546,554 B1* | 4/2003 | Schmidt et al. | 717/176 |
| 6,751,618 B1* | 6/2004 | Germscheid et al. | 707/10 |
| 7,047,233 B1* | 5/2006 | Humphreys et al. | 707/3 |
| 7,213,013 B1* | 5/2007 | Subramaniam et al. | 707/3 |
| 2001/0020235 A1 | 9/2001 | Game | 707/1 |
| 2002/0029228 A1* | 3/2002 | Rodriguez et al. | 707/204 |
| 2002/0073076 A1* | 6/2002 | Xu et al. | 707/3 |
| 2002/0129037 A1 | 9/2002 | Nathan | 707/104.1 |
| 2002/0138481 A1 | 9/2002 | Aggarwal et al. | 707/6 |
| 2002/0147704 A1 | 10/2002 | Borchers | 707/3 |
| 2002/0156779 A1 | 10/2002 | Elliott et al. | 707/6 |
| 2002/0169771 A1 | 11/2002 | Melmon et al. | 707/5 |
| 2003/0149934 A1 | 8/2003 | Worden | 715/513 |
| 2003/0182420 A1 | 9/2003 | Jones et al. | 709/224 |
| 2005/0050477 A1 | 3/2005 | Robertson et al. | 715/853 |

FOREIGN PATENT DOCUMENTS

WO    WO 02/103576 A1    12/2002

OTHER PUBLICATIONS

Williams, J. et al., "STN Easy: Point-and-Click Patent Searching on the World Wide Web," World Patent Information, Elsevier, Amsterdam, NL, vol. 10, No. 3, Sep. 1997, pp. 161-166.

* cited by examiner

| | |
|---|---|
| COLUMN NAME | 905 |
| CREATE COLUMN FLAG (OPTIONAL) | 910 |
| DATA TYPE (OPTIONAL) | 915 |
| INDEX MODE (OPTIONAL) | 920 |
| NAME | 925 |
| TEXT LENGTH (OPTIONAL) | 930 |
| TYPE | 935 |

| NAME | 1905 |
| --- | --- |
| DISPLAY NAME | 1910 |
| FILTER SEARCH SPECIFICATION (OPTIONAL) | 1915 |
| USE FILTERED SEARCH (OPTIONAL) | 1920 |
| SEQUENCE (OPTIONAL) | 1925 |

FIG. 19

| | |
|---|---|
| DISPLAY NAME (OPTIONAL) | 2005 |
| DISPLAY FORMAT (OPTIONAL) | 2010 |
| NAME | 2015 |
| SCALING FACTOR (OPTIONAL) | 2020 |
| SEQUENCE | 2025 |
| TEXT ALIGNMENT (OPTIONAL) | 2030 |
| USE IN SEARCH (OPTIONAL) | 2035 |
| VISIBLE (OPTIONAL) | 2040 |
| WIDTH (OPTIONAL) | 2045 |

| Name | Index Bastemp | Table Name | Exists | External Location | Language | Delete | Index Status | Save |
|---|---|---|---|---|---|---|---|---|
| Auction Item | Auction detail | FUL_AUCT | | | BNU | | | |
| Catalog Category | Catalog Catgory | FUL_CAT | ✓ | | | | 205 Records Indexed<br>0 Records Not Ignored | |
| Decision Issue | Decision Issue | FUL_DEC | ✓ | | | | 45 Records Indexed<br>0 Records Not Ignored | |
| Document | | FUL_EXTDOC | ✓ | WSWCALN142OWleQsearch_doc# | | | 15 Records Indexed<br>1 Records Not Ignored | |
| Literature | Sales Tool | FUL_LIT | ✓ | | | | 5 Records Indexed<br>4 Records Not Ignored | |
| Product | Winner Product | FUL_PROD | ✓ | | | | 173 Records Indexed<br>0 Records Not Ignored | |
| Resolution Documents | SR Resolution | FUL_RESDOC | ✓ | | | | 8 Records Indexed<br>4 Records Not Ignored | |

METHOD, APPARATUS, AND SYSTEM FOR REMOTE CLIENT SEARCH INDEXING

CROSS-REFERENCE TO RELATED APPLICATIONS

This application is a continuation of U.S. patent application Ser. No. 09/883,776, Jun. 18, 2001 which is now U.S. Pat. No. 7,213,013, entitled "Method, Apparatus, And System For Remote Client Search Indexing," issued on May 1, 2007, and naming Pavitra Subramaniam, Jason Zoss, Jian-Jung Ying, Marc Caltabiano and Robert H. Wang as inventors. This application is incorporated by reference herein, in its entirety and for all purposes.

FIELD OF THE INVENTION

The present invention relates generally to the field of data processing. More specifically, the present invention relates to an apparatus, method, and system for remote client search indexing.

BACKGROUND OF THE INVENTION

As technology continues to advance and the business environments have become increasingly complex and diverse, more and more companies have relied on various customer relationship management (CRM) software and eBusiness applications to conduct and manage various aspects of their enterprise business. In general, eBusiness applications are designed to enable a company or enterprise to conduct its business over an interactive network (e.g., Internet, Intranet, Extranet, etc.) with its customers, partners, suppliers, distributors, employees, etc. eBusiness applications may include core business processes, supply chain, back-office operations, and CRM functions. CRM generally includes various aspects of interaction a company has with its customers, relating to sales and/or services. At a high level, customer relationship management is focused on understanding the customer's needs and leveraging this knowledge to increase sales and improve service. CRM application and software is generally designed to provide effective and efficient interactions between sales and service, and unify a company's activities around the customer in order to increase customer share and customer retention through customer satisfaction.

Typically, CRM implementation strategy needs to consider the following:

Knowledge Management: one of the important factors of an effective CRM implementation is the acquisition of information about a customer, its analysis, sharing and tracking. Also integral to the use of knowledge for competitive advantage is for employees to know what actions to take as a result of this knowledge.

Database Consolidation: another important aspect of an effective and efficient CRM solution is the consolidation of customer information in a single database and the re-engineering of business processes around the customer. The goal here is to have all interactions with a customer recorded in one place to drive production, marketing, sales and customer support activities.

Integration of Channels and Systems: it is very important for a CRM application/software to provide the capability to respond to customers in a consistent and high-quality manner through their channel of choice, whether that is the e-mail, the phone, web-based user interfaces, etc. This may require the seamless integration of various communication channels with the customer or enterprise database. It also may require the integration of CRM with other parts of a company's business systems and applications.

Technology and Infrastructure: to enhance customer services, a CRM application/software may include various tools to automate and streamline online customer service. For example, a self-help model typically can be implemented using a combination of tools (e.g. knowledge bases with an intuitive search capability, agent technology or automated email, etc.).

Generally, eBusiness applications are designed to allow organizations to create a single source of customer information that makes it easier to sell to, market to, and service customers across multiple channels, including the Web, call centers, field, resellers, retail, and dealer networks. Advanced eBusiness applications are typically built on a component-based architecture and are designed to be Web-based and to deliver support for various types of clients on multiple computing platforms including mobile clients, connected clients, thin clients, and handheld clients, etc.

Intense competition for customer attention, pervasive channel expansion, and the Internet explosion have spawned unprecedented levels of customer choice. With the right solution in place, each interaction presents an opportunity to better understand the unique needs of the customer or extended household. By capitalizing on customer information captured during each interaction (e.g., through a call center), organizations can suggest the best combination of products and services to meet the customer's objectives and thereby increasing the chances that the customer will remain loyal.

Traditionally, the role of the call center has been limited to handling telephone calls from customers who were reporting service outages, activating or canceling service, or inquiring about standard billing and collection issues. The metrics of success were based on efficient delivery of service and operating the customer call center as inexpensively as possible. Customer interaction was considered a "cost" of doing business.

However as customers demand consistent service and sales support through every channel of communication, call centers are quickly evolving into complete customer contact centers. The call center's importance is rapidly escalating as it increasingly provides support for all customer interactions. Call centers now typically implement solutions providing the following capabilities:

Easy to use, unified agent desktop to allow an agent to handle multimedia interactions through a single user interface;

Consolidated view of the customer to ensure that each agent has complete knowledge of every interaction across all channels of communication including telephone, email, Web chat, Web voice, fax, and page;

Workflow automation and dynamic scripting to ensure that work is handled in the most efficient manner and that business processes and policies are always enforced;

Integrated sales, marketing, and customer service including inbound and outbound telesales, email response, and Web campaigns; and Comprehensive Web-based architecture to allow rapid application deployment and an off-the-shelf solution to minimize the total cost of ownership.

In order to support the aforementioned capabilities, an extensive database is required to store customer related information. At times, it is critical for users of this extensive database to be able to search the database and quickly retrieve a record or piece of information. In an exemplary scenario, a manager for a computing support group receives a call from a customer trying to find out information about the customer's account and also requesting a specific marketing literature item. In this exemplary scenario, it is highly desirable to have a central facility that could quickly and efficiently peruse through the extensive database to locate the information that the customer requested.

BRIEF DESCRIPTION OF THE DRAWINGS

The features and advantages of the present invention will be more fully understood by reference to the accompanying drawings, in which:

FIG. 9 generally illustrates properties of an exemplary Result Field object in accordance with one embodiment of the present invention;

FIG. 19 generally illustrates properties of an exemplary Search Category object associated with a Search Definition in accordance with one embodiment of the present invention;

FIG. 20 generally illustrates properties of an exemplary Custom Result Field object in accordance with one embodiment of the present invention;

FIG. 27 shows an exemplary Advanced Search View and Advanced Search Results View in accordance with one embodiment of the present invention;

FIG. 30 illustrates an exemplary Search Indices View in accordance with one embodiment of the present invention;

DETAILED DESCRIPTION

In the following detailed description numerous specific details are set forth in order to provide a thorough understanding of the present invention. However, it will be appreciated by one skilled in the art that the present invention may be understood and practiced without these specific details.

I. System Overview and Overall Architecture

Figure 1:
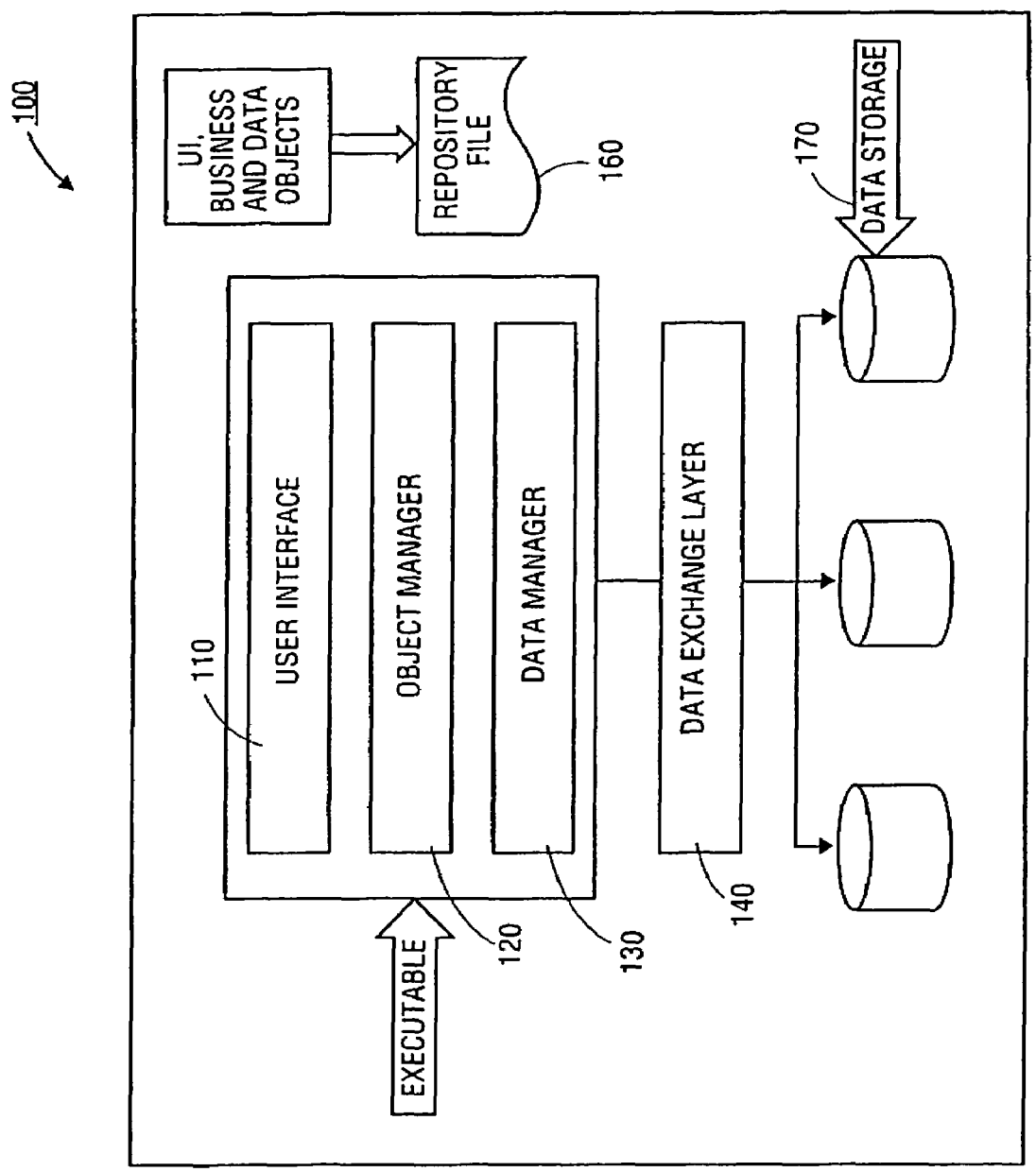
FIG. 1 shows a multi-layered system architecture in which the teachings of the present invention are implemented.

In one embodiment, a system in which the teachings of the present invention are implemented can be logically structured as a multi-layered architecture as shown in FIG. 1. In one embodiment, the logical multi-layered architecture as shown in FIG. 1 provides a platform for common services to support the various applications. These services may include a user interface layer 110, an object manager layer 120, a data manager layer 130, and a data exchange layer 140.

In one embodiment, the user Interface layer 110 may provide the applets, views, charts and reports, etc. associated with one or more applications. In one embodiment, various types of clients can be supported via the user interface layer 110. These various types of clients may include traditional connected clients, remote clients, thin clients over an intranet, Java thin clients or non-Windows-based operating systems, and HTML clients over the Internet, etc.

In one embodiment, the object manager layer 120 is designed to manage one or more sets of business rules or business concepts associated with one or more applications and to provide the interface between the user interface layer 110 and the data manager layer 130. In one embodiment, the business rules or concepts can be represented as business objects. In one embodiment, the business objects may be designed as configurable software representations of the various business rules or concepts such as accounts, contacts, opportunities, service requests, solutions, etc.

In one embodiment, the data manager layer 130 is designed to maintain logical views of the underlying data and to allow the object manager to function independently of underlying data structures or tables in which data are stored. In one embodiment, the data manager 130 may also provide certain database query functions such as generation of structure query language (SQL) in real time to access the data. In one embodiment, the data manager 130 is designed to operate on object definitions in a repository file 160 that define the database schema. In one embodiment, the data storage services 170 provide the data storage for the data model associated with one or more applications.

In one embodiment, the data exchange layer is designed to handle the interactions with one or more specific target databases and provide the interface between the data manager layer 130 and the underlying data sources.

Figure 2:
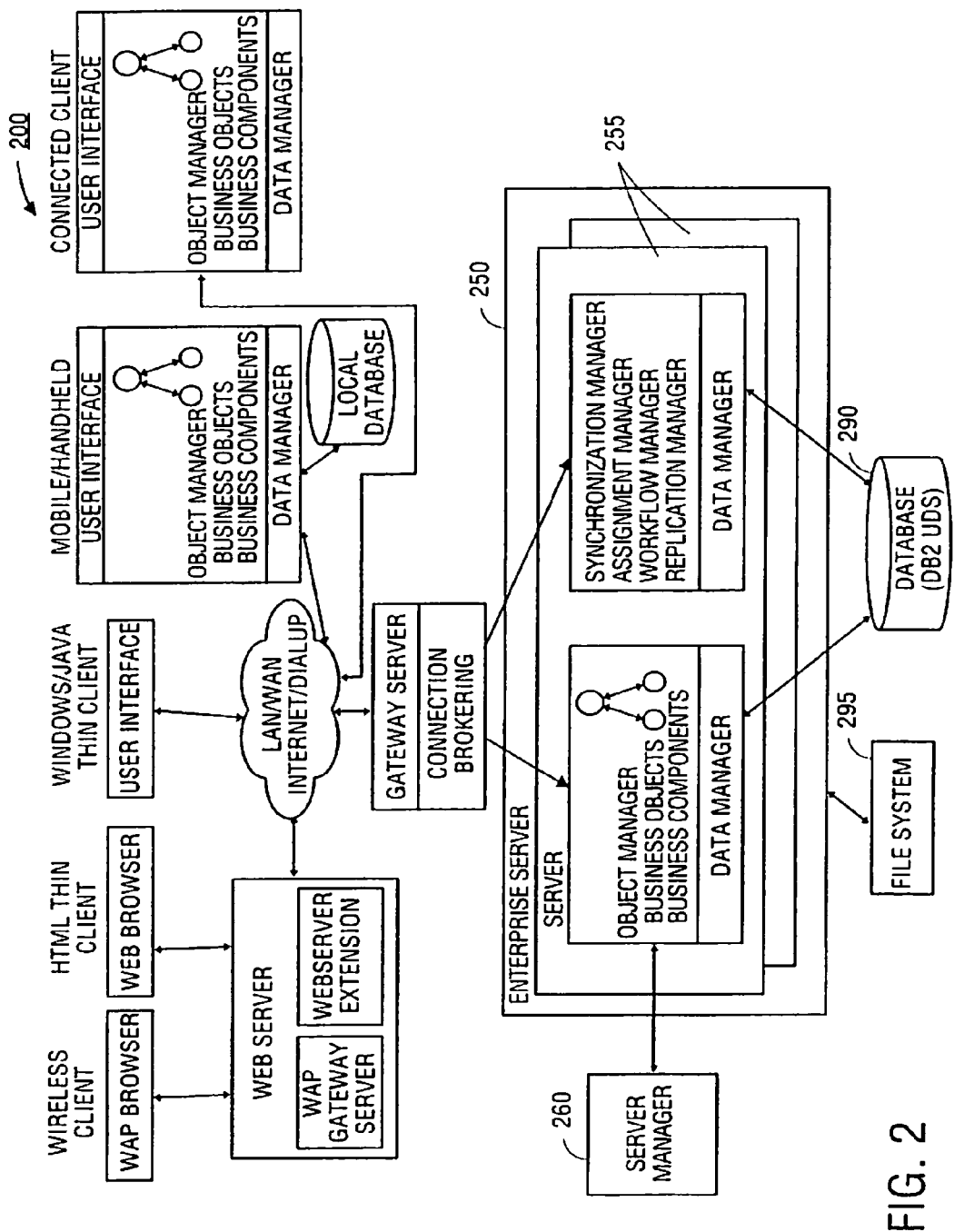
FIG. 2 shows various system components that may be included in the multi-layered architecture shown in FIG. 1.

FIG. 2 shows the various system components that may be included in the multi-layered system architecture illustrated in FIG. 1.

In one embodiment, the multi-layered architecture allows one or more software layers to reside on different machines. For example, in one embodiment, the user interface, the object manager, and the data manager can all reside on the connected and mobile clients. For thin clients, in one embodiment, the object manager and data manager can reside on a system server. As another example, the user interface resides on a system server for HTML clients. It should be appreciated and understood by one skilled in the art that the system configuration shown in FIG. 2 is for illustrative and explanative purposes and may vary depending upon the particular implementations and applications of the teachings of the present invention.

In one embodiment, the system environment illustrated in FIG. 2 may include more than one database 290. One or more subsets of the database 290 can be created or replicated by a replication manager. In addition, mobile clients can have additional remote databases (also called local databases). In one embodiment, unless the remote or local databases associated with the mobile clients are defined as read-only databases, these mobile clients can create and update data locally that will be ultimately propagated up to the primary database when each mobile client synchronizes with the system server.

In one embodiment, the database 290 is designed to store various types of data including predefined data schema (e.g., table objects, index objects, etc.), repository objects (e.g., business objects and components, view definitions and visibility rules, etc.), and user's or customer's data. In one embodiment, connected clients and server components, including those that operate in conjunction with the thin clients, can connect directly to the database 290 and make changes in real time. In one embodiment, mobile clients can download a subset of the server's data to use locally, and periodically synchronize with the server database through the system server to update both the local and the server database.

In one embodiment, the file system 295 is a network-accessible directory that can be located on an application server. In one embodiment, the file system 295 stores the physical files created by various applications, such as files created by third-party text editors, and other data that is not stored in the database 290. In one embodiment, physical files stored in the file system 295 can be compressed and stored under various naming conventions. In one embodiment, connected clients read and write files directly to and from the file system 295. In one embodiment, mobile clients can have a local file system, which they synchronize with the server-based file system 290 periodically. In one embodiment, thin clients access the file system 290 via the system server.

In one embodiment, the enterprise server 250 is a logical grouping of the system servers 255 that share a common table owner or a database, point to a common gateway Server, and can be administered as a group using server manager 260. In one embodiment, the connection to the gateway server can be established via TCP/IP. In one embodiment, the enterprise server 250 can be scaled effectively by deploying multiple system servers 255 in the enterprise server 250, thus providing a high degree of scalability in the middle tier of applications.

In one embodiment, the server 255 runs one or multiple server programs. It handles the incoming processing requests and monitors the state of all processes on the server. In one embodiment, server programs are designed and configured to perform one or more specific functions or jobs including importing and exporting data, configuring the database, executing workflow and process automation, processing to support mobile clients for data synchronization and replication, and enforcing business rules, etc. In one embodiment, the server 255 can be an NT Service (under Windows NT operating system) or a daemon (e.g., a background shell process) under UNIX operating system. In one embodiment, the server 255 supports both multi-process and multi-threaded components and can operate components in batch, service, and interactive modes.

In one embodiment, the server manager is configured as a utility that allows common control, administration and monitoring across disparate programs for the servers 255 and the enterprise server 250. In one embodiment, the server manager can be used to perform the following tasks: start, stop, pause, and resume servers 255, components, and tasks; monitor status and collect statistics for multiple tasks, components, and servers within an enterprise server; and configure the enterprise server, individual servers individual components, and tasks, etc.

In one embodiment, the gateway server can be configured as a logical entity that serves as a single entry point for accessing servers. In one embodiment, it can be used to provide enhanced scalability, load balancing and high availability across the enterprise server. In one embodiment, the gateway server may include a name server and a connection brokering component. In one embodiment, the name server is configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as a NT service. In a UNIX environment, the name server can run as a daemon process. In one embodiment, the connection brokering component is used to perform load balancing function such as directing client connection requests to an appropriate server (e.g., the least-busy server).

In one embodiment, as illustrated in FIG. 2, the various types of clients that can be supported by the system included the following clients: connected clients, mobile clients, HTML thin clients, wireless clients, thin clients for Windows, and Java thin clients, etc.

In one embodiment, connected (also called dedicated) clients are connected directly to a database server for data access via a LAN or WAN connection. In one embodiment, these connected or dedicated clients do not store data locally. These connected clients can also access the file system directly. In one embodiment, the mobile clients are designed and configured for local data access and thus can have their own local database and/or local file system. In one embodiment, mobile clients can interact with other components within the system via the gateway server. Through synchronization, the modifications from the local database and the server database can be exchanged.

Figure 3:
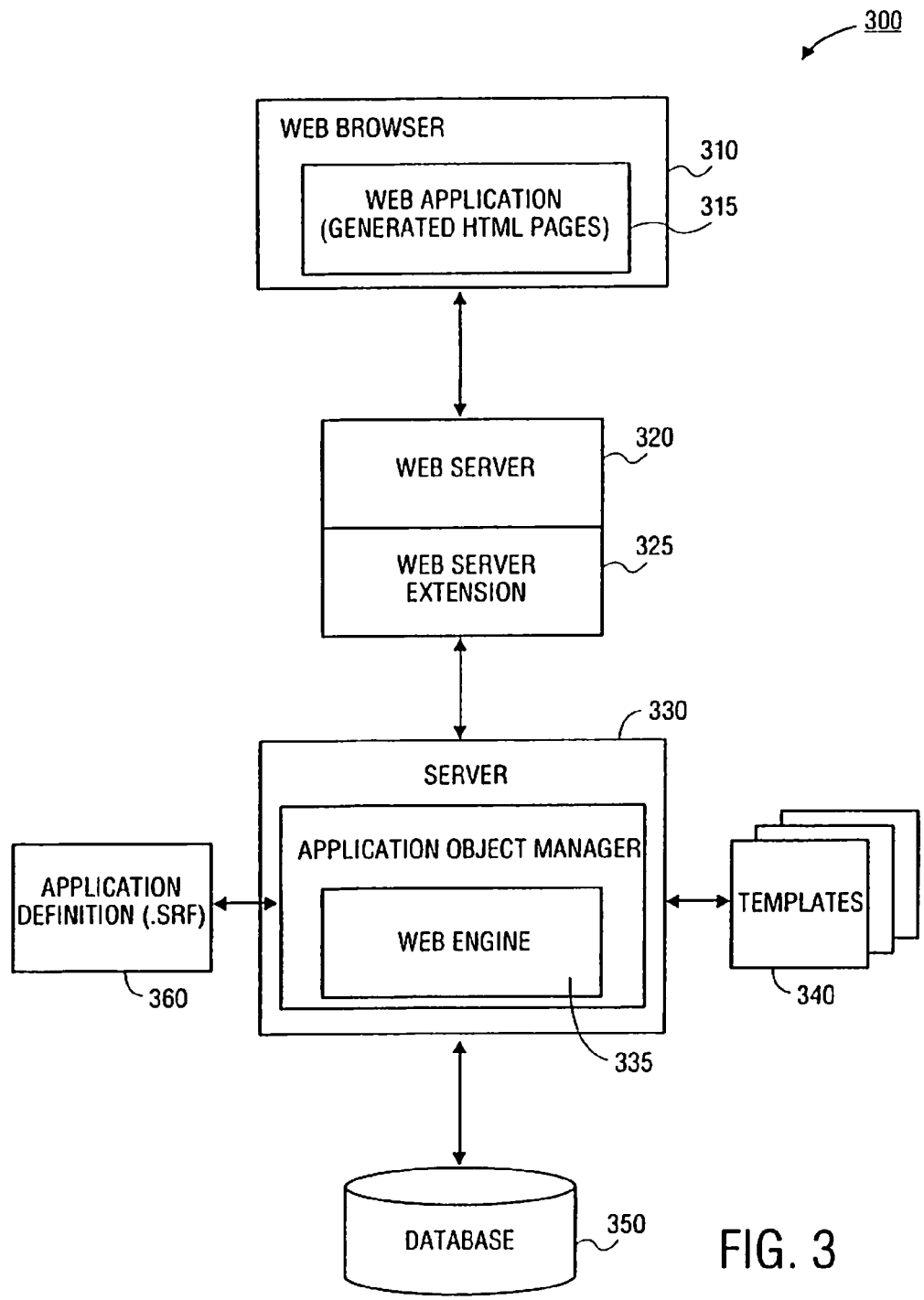
FIG. 3 illustrates the major components of a HTML thin client system configuration.

In one embodiment, HTML thin clients may include a set of components used to customize and implement web-based applications. These HTML thin clients, in one embodiment, are part of a larger system configuration that may include a server, a database, and a web server, etc. The major components of a HTML thin client system configuration are shown in FIG. 3 that include a web application, a web server extension, a web engine, and various templates. In one embodiment, wireless clients are essentially thin clients enabled on wireless devices. The wireless clients can use a wireless application protocol (WAP)-based user interface to communicate and exchange information/data with the system server. In one embodiment, the windows thin clients and the Java thin clients can access the applications dynamically over the network from machines that are connected to the system. The system is described in more details below with references to various databases, tables, file systems, etc. as illustrating examples.

Figure 4:
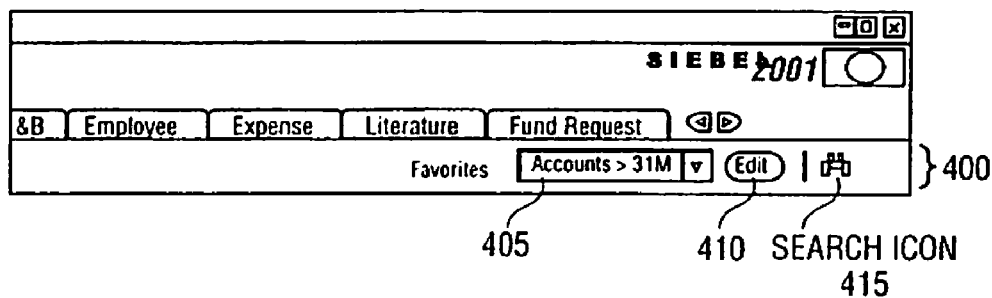
FIG. 4 illustrates an exemplary Search Tool Bar Icon in accordance with one embodiment of the present invention.

II. eSearch Application/System and Related System Components:

FIG. 4 illustrates an exemplary Search Tool Bar 400 in accordance with one embodiment of the present invention. In this embodiment, Search Tool Bar 400 includes a dropdown list 405, an Edit button 410, and a Search Icon 405. From the dropdown list 405, the user can select an item from the list to populate the content area or the Search Frame. Additional details regarding the Content Area Frame and the Search Frame are provided below in FIG. 5 and the text describing the figure.

Edit button 410 is typically used to open the Search Frame to allow the user to modify or delete items in the dropdown list 405. Search Icon 410 is generally used to open the Search Center Frame or Pane. Additional details on the Search Center Frame or Pane are provided below in FIG. 5 and the text describing the figure.

Figure 5:
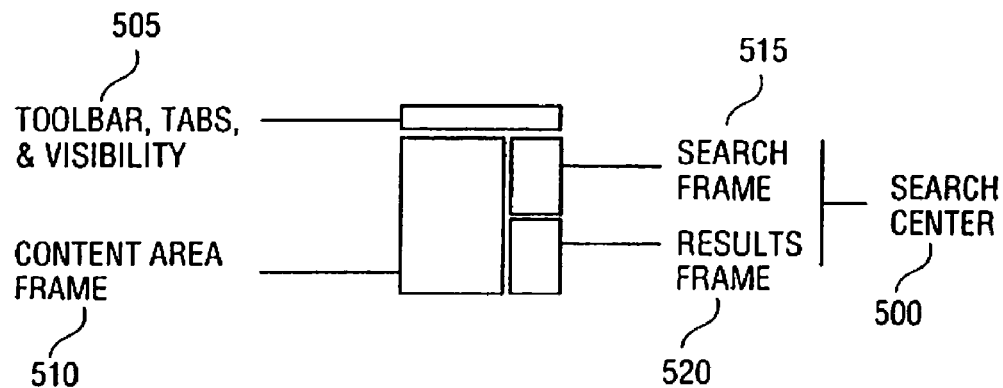
FIG. 5 illustrates an exemplary Search Center Frame or Pane in accordance with one embodiment of the present invention.

FIG. 5 illustrates an exemplary Search Center Frame or Pane 500 in accordance with one embodiment of the present invention. Search Center Frame or Pane 500 includes a Tool Bar section 505, a Content Area Frame 510, a Search Frame 515, and a Results Frame 520. Search Tool Bar 400 (shown in FIG. 4) remains in the Tool Bar section 505. Content Area Frame 510 is generally used to display the content of a selected search result available from the search. Search Frame 515 will be explained in more details below in FIGS. 24 and 25 and the text describing the figures. Results Frame 520 is typically used to display a list of search results available from the search.

Search Objects

Figure 6:
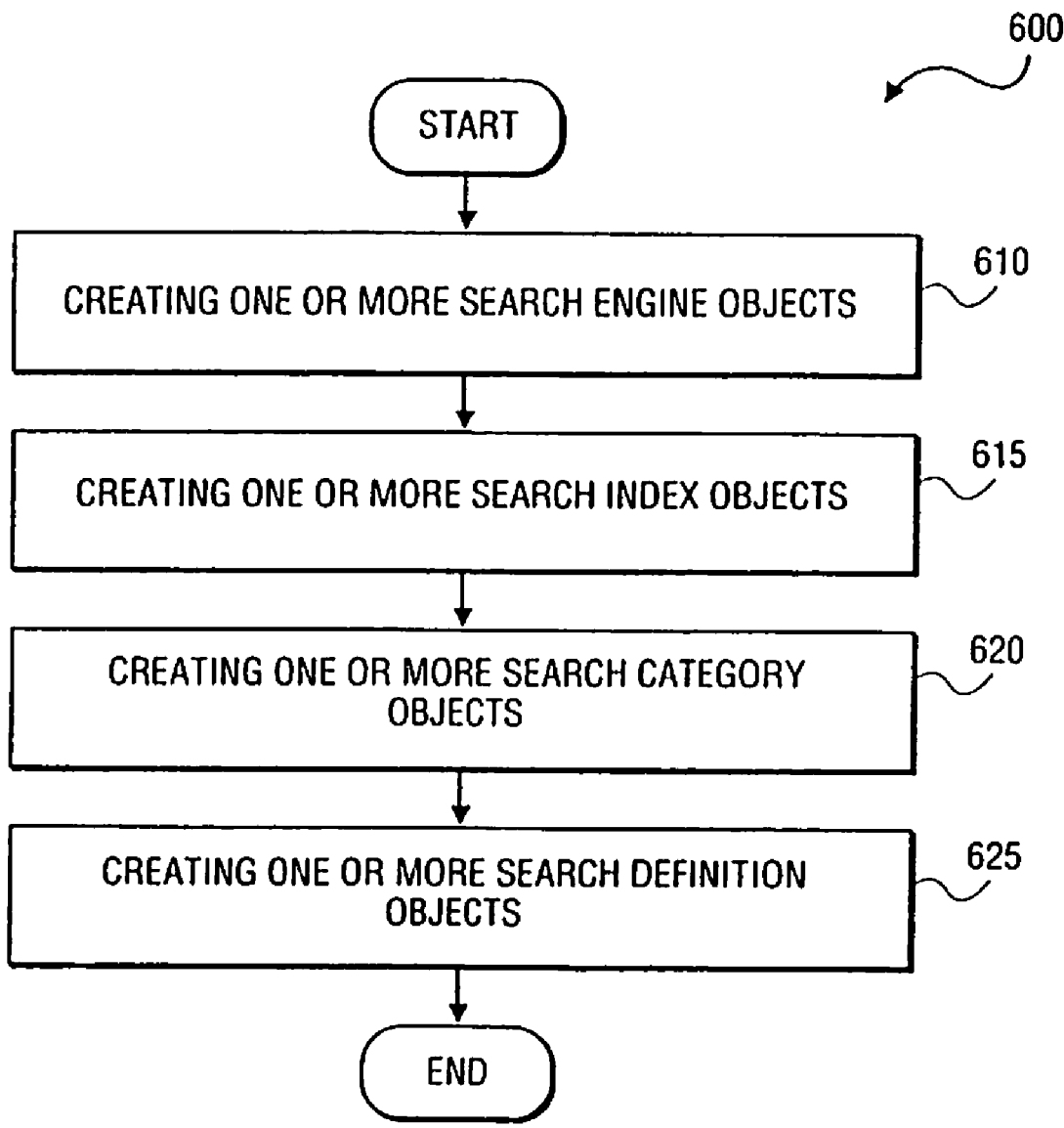
FIG. 6 is a flow chart generally outlining an exemplary process of creating various Search objects.

Prior to performing a search, certain Search objects may need to be configured or created. FIG. 6 is a flow chart generally outlining an exemplary process 600 of creating various Search objects. The exemplary process can include the following actions:

Creating one or more Search Engine objects if a Search Engine object does not already exist (block 610);

Creating one or more Search Index objects and associate the created Search Index objects to one or more Business Component objects (block 615);

Creating one or more Search Category objects and associate the created Search Category objects to a Search Index object (block 620); and Creating one or more Search Definition objects (block 625). It should be noted each Search Definition object represents a group of one or more Search Category objects created in block 629.

Each of the aforementioned actions will be described below in more details.

Search Engine

Figure 7:
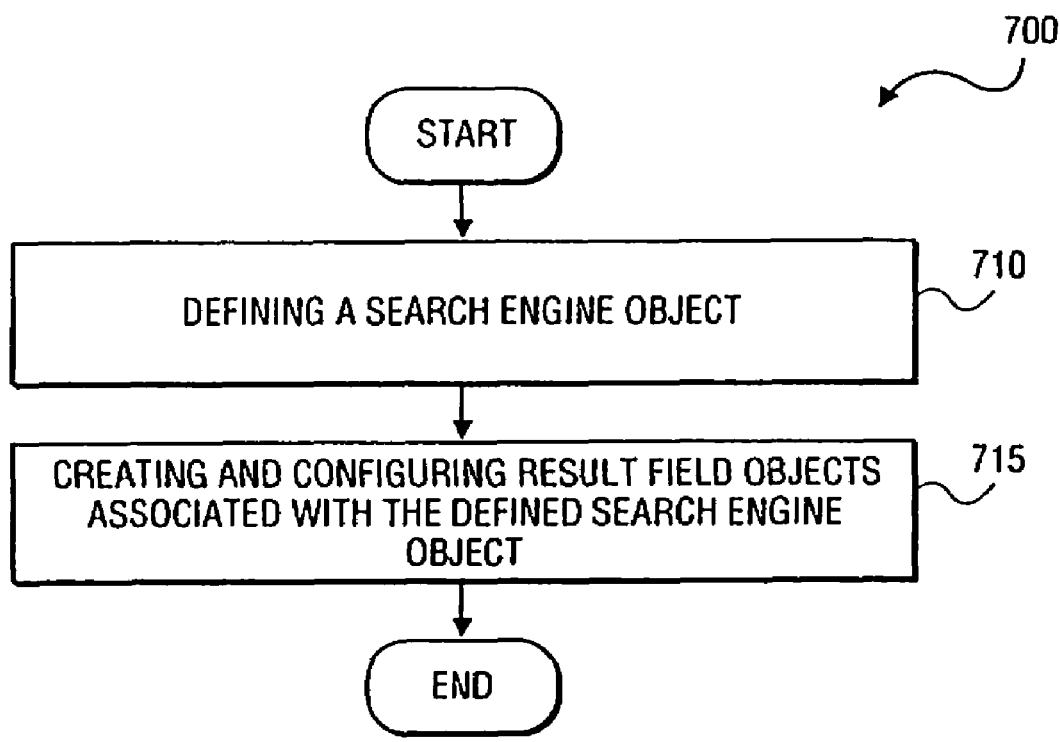
FIG. 7 is a flow chart generally outlining an exemplary process of creating a Search Engine object in accordance with one embodiment of the present invention.

FIG. 7 is a flow chart generally outlining an exemplary process 700 of creating a Search Engine object in accordance with one embodiment of the present invention. Creating each Search Engine object can generally include defining a Search Engine object (block 710) and creating or configuring Result Fields associated with the defined Search Engine object (block 715).

Figure 8:
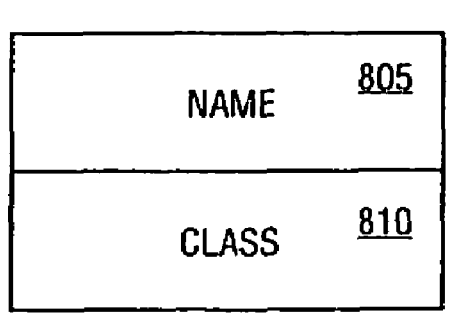
FIG. 8 generally illustrates properties of a Search Engine object in accordance with one embodiment of the present invention.

FIG. 8 generally illustrates properties of a Search Engine object 800 in accordance with one embodiment of the present invention. In this embodiment, the Search Engine object 800 generally represents a Search Engine and can include two properties: Name 805 and Class 810. Name 805 generally refers to the name of a Search Engine, e.g., "Fulcrum". Class 810 generally refers to the class name of a Search Adapter associated with the named Search Engine.

Each Search Engine has a default set of Result Fields related to it. Additional Result Fields may be created and added to the default set of Result Fields. A Result Field object is generally used to associate a Result Field with each Search Engine. In one embodiment, each Result Field object operates under the following rules and assumptions. First, the defined Result Field is generally created for the Search Tables belonging to the parent Search Engine object or the Search Engine to which the Result Field relates. Second, some of the defined Result Field can be customized per search definition. A description of Custom Result Fields, which are used to customize Result Fields per search definition, will be provided below.

FIG. 9 generally illustrates properties of an exemplary Result Field object 900 in accordance with one embodiment of the present invention. In this embodiment, the Result Field object 900 can include the following properties: Column Name 905, Create Column Flag 910, Data Type 915, Index Mode 920, Name 925, Text Length 930, and Type 935. Accordingly, creating a Result Field object 900 involves defining some or all of the aforementioned properties. Of the aforementioned properties of the Result Field object 900, Column Name 905, Name 925, and Type 935 are required properties; and Create Column Flag 910, Data Type 915, Index Mode 920, and Text Length 930 are optional properties.

Column Name 905 is generally the name of the physical column in a Search Index. Column Name 905 may differ for different types of database software. Name 925 is generally a logical name of the Result Field. Type 935 represents a pick list displaying valid values. Create Column Flag 910 denotes whether a column needs to be explicitly created by the user. Data Type 915 specifies a data type of a column. Exemplary values for a Data Type 915 may include "varchar", "character", and "apvarchar". Index Mode 920 specifies the index mode of a column. Exemplary values for an Index Mode 920 may include "literal", "none", and "normal". Text Length 930 specifies the amount of storage bytes that should be allocated for the Result Field.

Search Index

Figure 10:
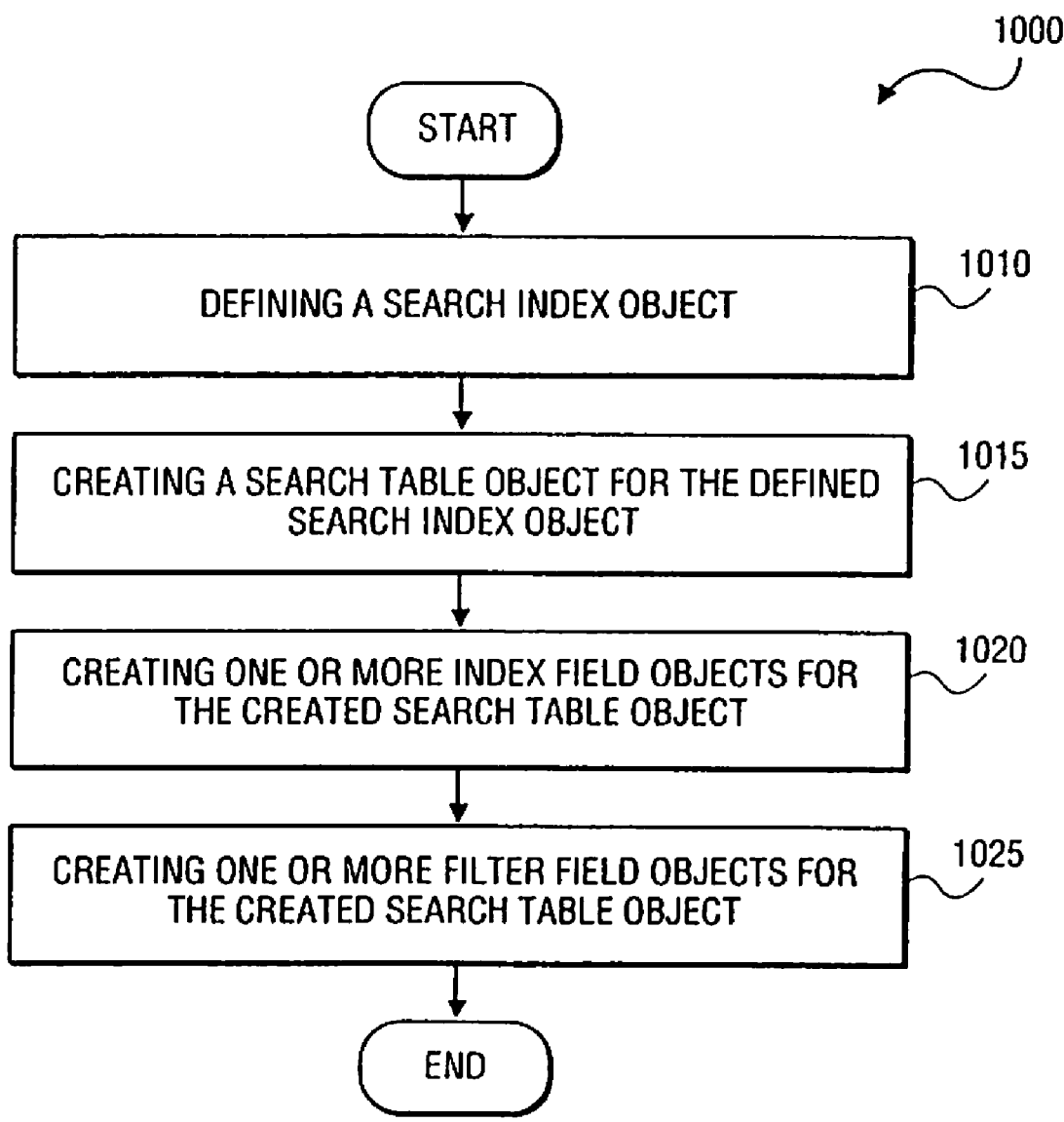
FIG. 10 is a flow chart generally outlining an exemplary process of creating a Search Index object in accordance with one embodiment of the present invention.

FIG. 10 is a flow chart generally outlining an exemplary process 1000 of creating a Search Index object in accordance with one embodiment of the present invention. Creating each Search Index object can include defining a Search Index object (block 1010), creating a Search Table object for the defined Search Index object (block 1015), creating one or more Index Field objects for the created Search Table object (block 1020), and creating one or more Filter Field objects for the created Search Table object (block 1025). Defining each Search Index object (block 1010) can include identifying or more Business Components that need to be indexed by a selected Search Engine and creating a Search Index object and associate the created Search Index object to each identified Business Component.

Figure 11:
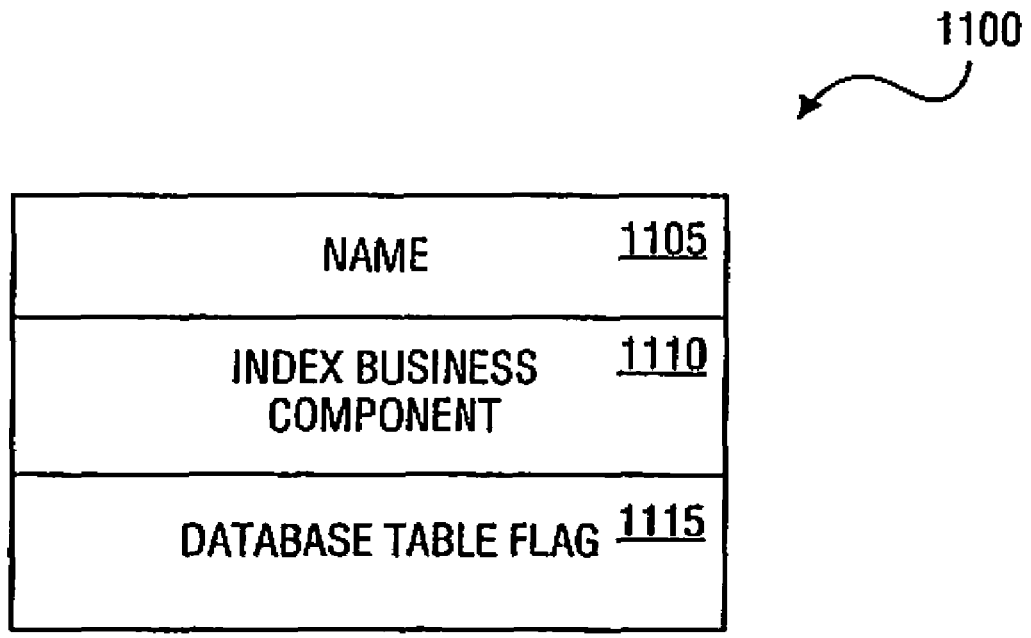
FIG. 11 generally illustrates properties of an exemplary Search Index object 1100 in accordance with one embodiment of the present invention.

FIG. 11 generally illustrates properties of an exemplary Search Index object 1100 in accordance with one embodiment of the present invention. As shown in the figure, each Search Index object 1100 can have the following properties: Name 1105, Index Business Component 1110, and Database Table Flag 1115. Name 1105 includes the logical name of the Search Index object 1100, and is a required property. Index Business Component 1110 and Database Table Flag 1115 are optional fields. Index Business Component 1110 is generally a Business Component to which the Search Index object 1100 maps. It should be noted that the Index Business Component 1110 can be null if the Business Component is based on an external directory. Database Table Flag 1115 generally indicates whether the Search Index object 1100 maps to a physical database table.

Figure 12:
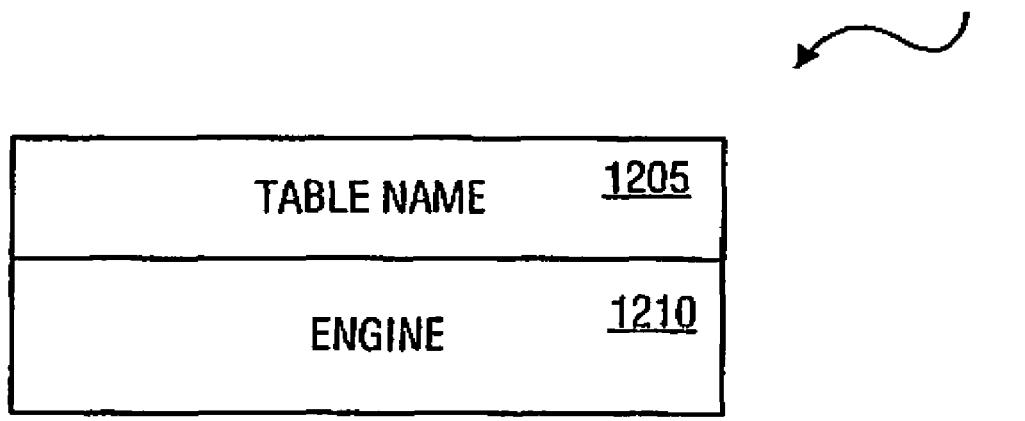
FIG. 12 generally illustrates properties of an exemplary Search Table object 1200 in accordance with one embodiment of the present invention.

Creating and configuring each Search Table object for each defined Search Index object (block 1015 of FIG. 10) generally involves associating the Search Index to a physical index table or collection that is in a selected Search Engine and that physically represents the Search Index. FIG. 12 generally illustrates properties of an exemplary Search Table object 1200 in accordance with one embodiment of the present invention. In one embodiment, the Search Table object 1200 can have the following required properties: Table Name 1205 and Engine 1210. Table Name 1205 generally specifies the actual name of the physical index table or collection that physically represents the Search Index. Engine 1210 includes the name of the selected Search Engine, e.g. "Fulcrum".

Figure 13:
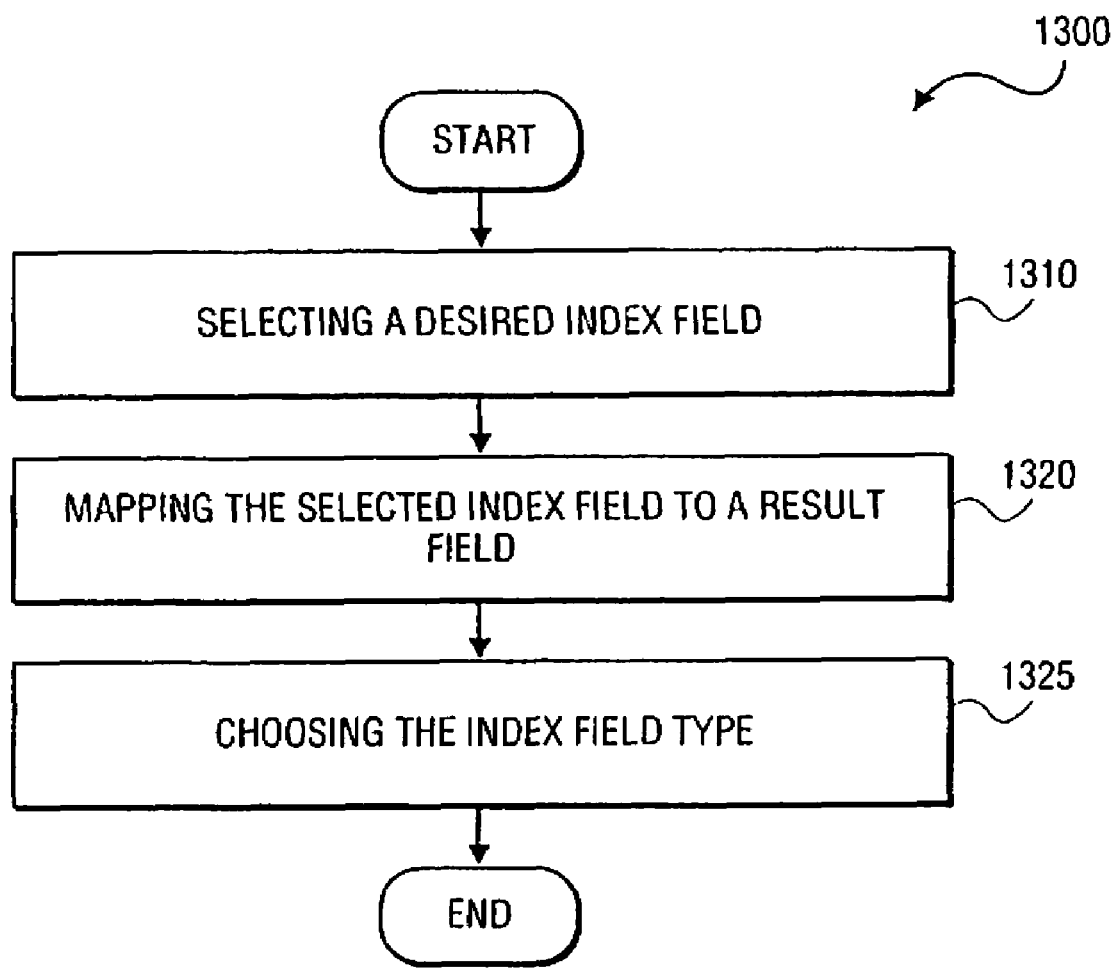
FIG. 13 is a flow chart generally outlining an exemplary process of creating an Index Field Map object for each created Search Table in accordance with one embodiment of the present invention.

FIG. 13 is a flow chart generally outlining an exemplary process 1300 of creating an Index Field Map object for each created Search Table in accordance with one embodiment of the present invention. Index Field Map object generally denotes the Business Component Fields that need to be indexed into the Search Index. In one embodiment, Index Field Map object can be generally used to map the Business Component Fields to Result Fields associated to the Search Engine, which is created as described in FIG. 7. The process 1300 of creating and configuring each Index Field Map object for each created Search Table object generally involves selecting a desired Business Component (block 1310), mapping the selected Business Component to a Result Field (block 1320), and choosing the Index Field Type 1325.

It should be noted that Index Field Type 1325 can specify a file attachment denoting that a full-text search is to be performed on one or more attached documents or files. In other words, if Index Field Type 1325 specifies a file attachment, a full-text search will be performed on the one or more attached files denoted by the file attachment.

Figure 14A:
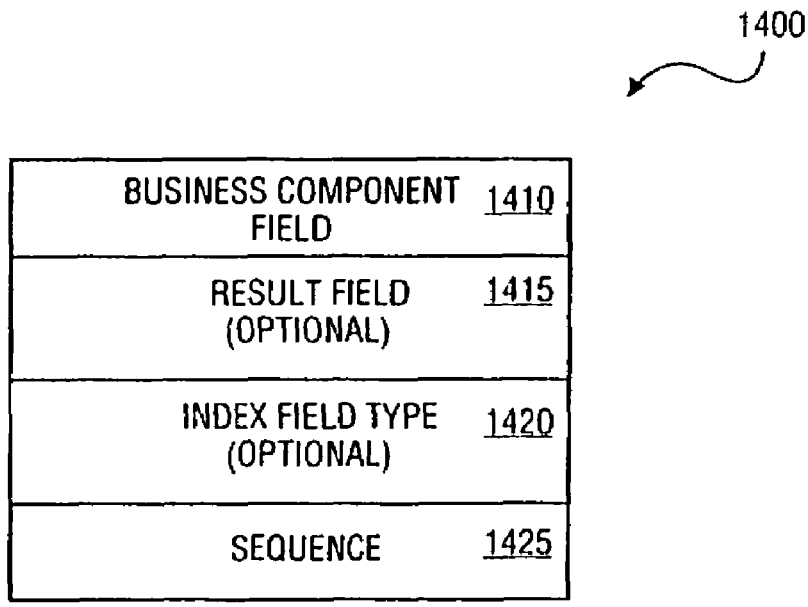
FIG. 14A generally illustrates properties of an exemplary Index Field object in accordance with one embodiment of the present invention.

FIG. 14A generally illustrates properties of an exemplary Index Field object 1400 in accordance with one embodiment of the present invention. In this embodiment, the Index Field object 1400 can include the following properties: Business Component Field 1410, Result Field 1415, Index Field Type 1420, and Sequence 1425. Of the aforementioned properties, Name 1405, Business Component Field 1410, and Sequence 1425 are required; and Result Field 1415 and Index Field Type 1420 are optional. Business Component Field 1410 generally represents the active fields of the applet or Business Component associated with the parent Search Index object. It should be noted that the active field will be included in a selected Search action. Sequence 1425 is generally the sequence in which Business Component Fields are read from the database table. Result Field 1415 represents the result to which the Index Field maps. Index Field Type 1420 specifies the type of the Business Component identified in the Business Component Field 1410. Exemplary values of Index Field Type 1420 can include "Row Id", "Group", "Attachment", "Revision Number", "Organizational Visibility", and "Group Visibility". The information provided in Index Field Type 1420 will be used at runtime to do some special processing. For example, the Business Component Field Id usually holds the Row Id for each row in the database table. Therefore, specifying an Index Field Type of "Row Id" would identify the values in the indexed column as being identifications of rows and hence can be used for easy retrieval and processing.

Creating or configuring a Filter Field object generally involves identifying and defining the fields of the Business Component that are to be indexed into the parent Search Table separately and in addition to the Result Fields. In other words, each Search Table will inherit the mandatory set of Result Fields defined for a selected Search Engine plus Filter Fields defined for the Search Table. In general, Filter Field objects generally define Filter Fields which are used to constrain results of searches. These Filter Fields typically are indexed into the Search Table as defined by the Search Table object.

Figure 14B:
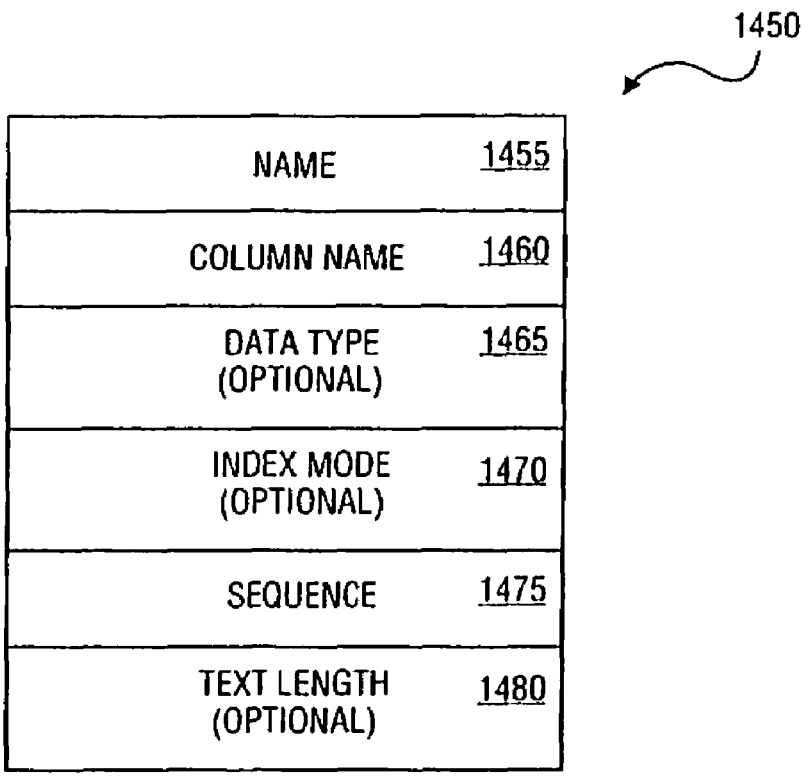
FIG. 14B generally illustrates properties of an exemplary Filter Field object in accordance with one embodiment of the present invention.

FIG. 14B generally illustrates properties of an exemplary Filter Field object 1450 in accordance with one embodiment of the present invention. In this embodiment, a Filter Field object 1450 can include the following properties: Name 1455, Column Name 1460, Data Type 1465, Index Mode 1470, Sequence 1475, and Text Length 1480. Of the aforementioned properties, Name 1455, Column Name 1460, and Sequence 1475 are required; and Data Type 1465, Index Mode 1470, and Text Length 1480 are optional. Name 1455 generally represents the active fields of the Business Component associated with the parent Search Index object. Column Name 1460 is the name of the physical column of the parent Search Index. It should be noted that Column Name 1460 can vary with different types of database software. Sequence 1475 generally denotes the sequence in which the Filter Fields are created. Data Type 1465 specifies the data type of the physical column. Exemplary values of Data Type 1465 can include "varchar" and "char". Index Mode 1470 specifies the index mode of the physical column. Examples of values of Index Mode 1470 can include "literal", "none", and "normal". Text Length 1480 represents the amount of storage in bytes allocated to the Filter Field that is being created.

Search Category

Figure 15:
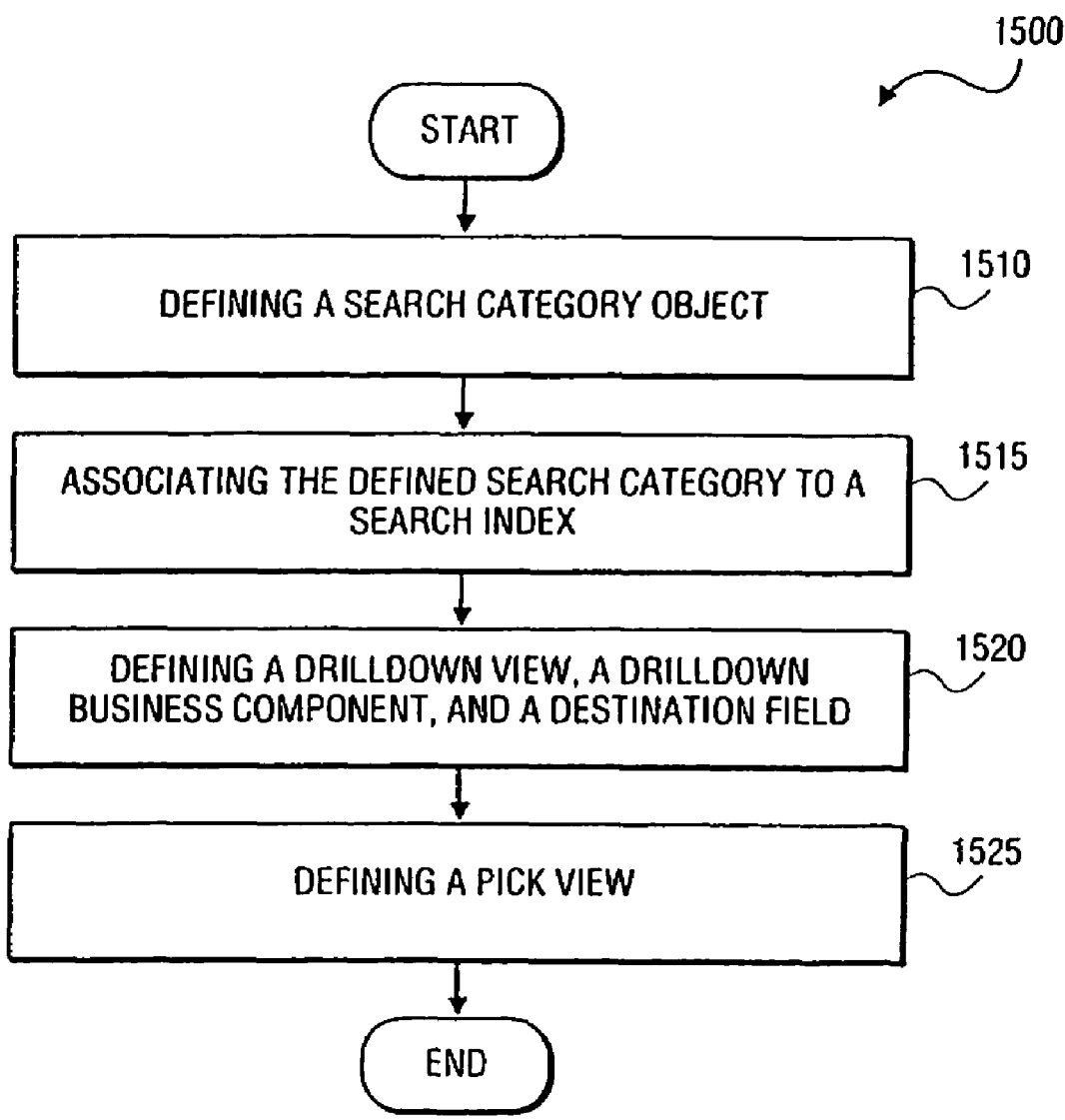
FIG. 15 is a flow chart generally outlining an exemplary process of creating and configuring a Search Category object.

FIG. 15 is a flow chart generally outlining an exemplary process 1500 of creating and configuring a Search Category object. The creating and configuring of a Search Category object can include defining a Search Category (block 1510) and associating the defined Search Category to a Search Index (block 1515). The creating and configuring of a Search Category can further include defining a Drilldown View, a Drilldown Business Component, and a Destination Field to be used when navigating search results pertaining to the defined Search Category (block 1520). The creating and configuring of a Search Category can also include defining a Pick View capable of receiving search results as an attachment (block 1525).

Each Search Category object generally represents a Search Category against which a search can be performed. It should be noted that each Search Category object generally maps to a Search Index object. It should also be noted that a particular Search Index object can be associated or can relate to one or more Search Category objects.

Figure 16:
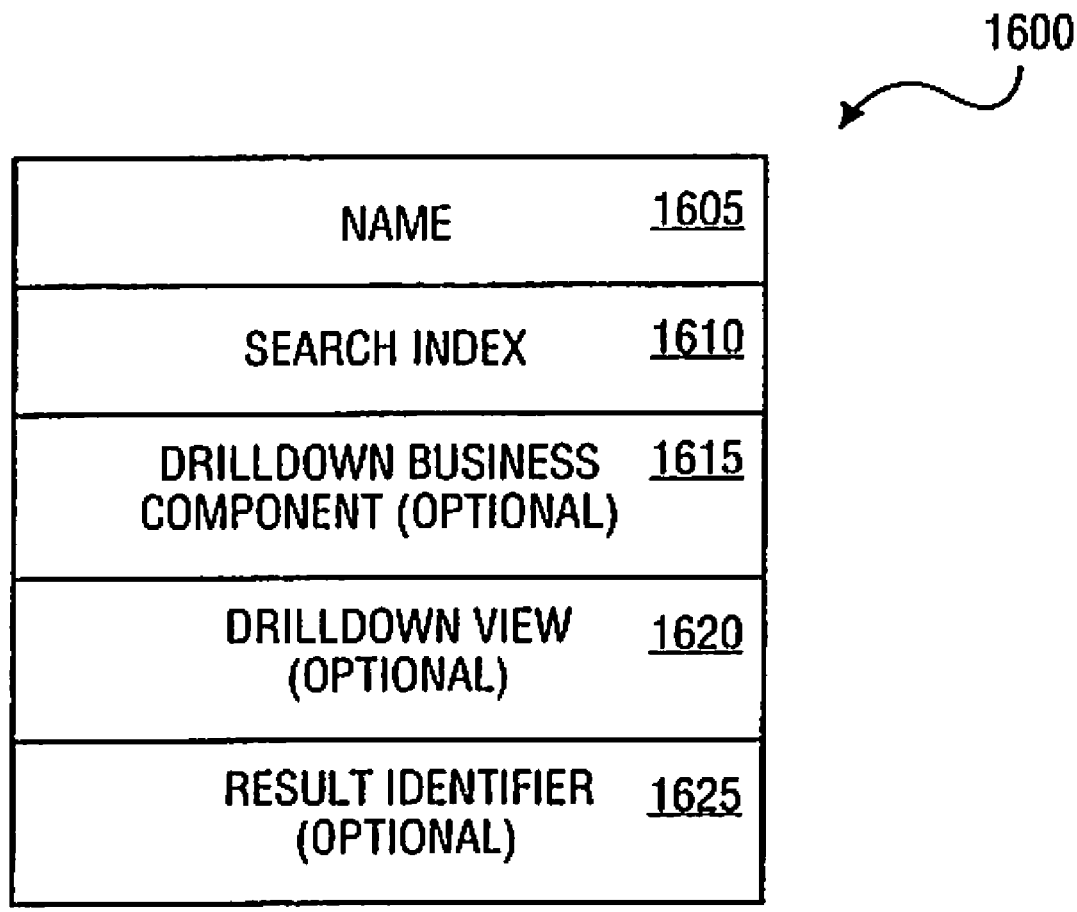
FIG. 16 generally illustrates properties of an exemplary Search Category object in accordance with one embodiment of the present invention.

FIG. 16 generally illustrates properties of an exemplary Search Category object 1600 in accordance with one embodiment of the present invention. In this embodiment, each Search Category object 1600 includes the following properties: Name 1605, Search Index 1610, Drilldown Business Component 1615, Drilldown View 1620, and Result Identifier 1625. Of the aforementioned properties, Name 1605 and Search Index 1610 are required; and Drilldown Business Component 1615, Drilldown View 1620, and Result Identifier 1625 are optional. Name 1605 generally represents the logical name for the Search Category. Search Index 1610 is generally the identity of the Search Index object to which the Search Category associates. Drilldown Business Component 1615 represents the destination business component into which the user is drilling. Drilldown View 1620 is generally the view that appears when the user drills down. Result Identifier 1625 generally represents an acronym that is used in the Summary column in a Search Result.

Using Search Category objects, users can define several Search Categories based on the same Search Index so that different Drilldown Views and Pick Views can be defined. As examples, a Solution Call Center category can drill down to a Solution Resolution Documents View, and the Solution eService Category can drill down to a Solution Resolution eService View. Furthermore, Pick Views can be defined differently for different Search Categories.

Figure 17:
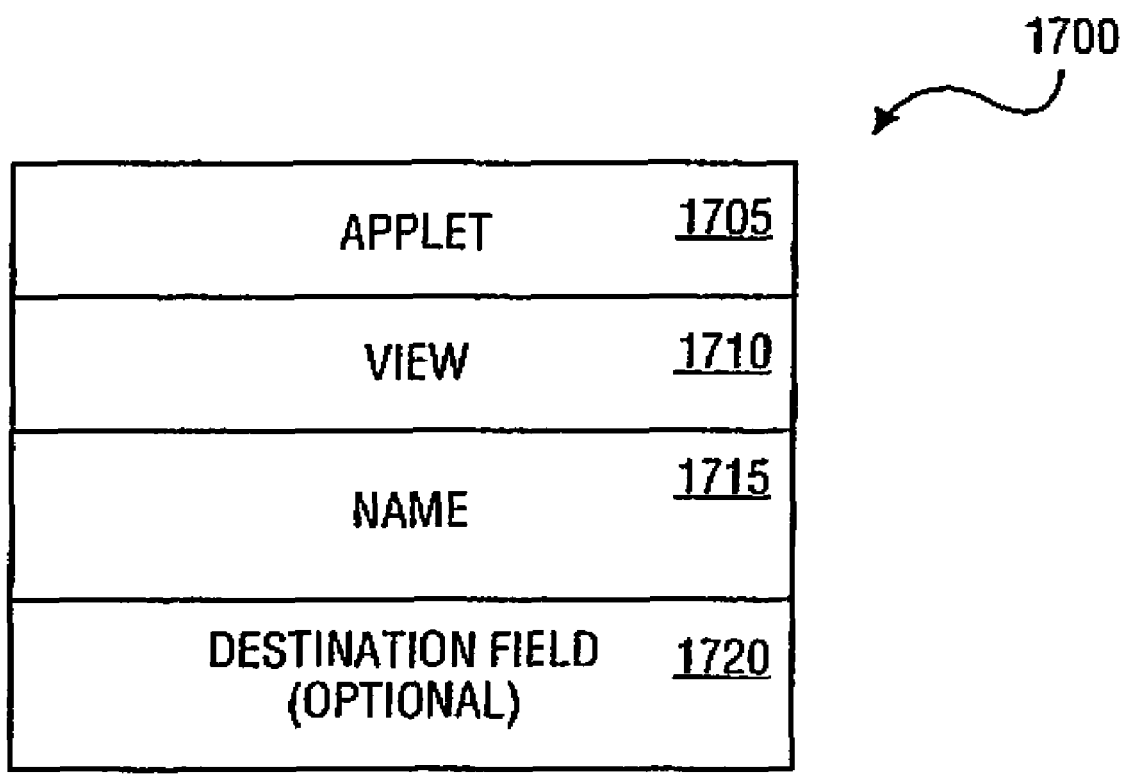
FIG. 17 generally illustrates properties of an exemplary Pick View object in accordance with one embodiment of the present invention.

Creating one or more Pick View objects for a parent Search Category object generally includes identifying applets to which the Search Results can be associated. FIG. 17 generally illustrates properties of an exemplary Pick View object 1700 in accordance with one embodiment of the present invention. In this embodiment, each Pick View object 1700 can include the following properties: Applet 1705, View 1710, Name 1715, and Destination Field 1720. Of the aforementioned properties, Applet 1705, View 1710, and Name 1715 are required; and Destination Field 1720 is optional. Applet 1705 generally represents the name of an applet that can receive selected Search Results. View 1710 is generally the name of the view containing the Applet 1705. Name 1715 generally represents the logical name the Pick View. Destination Field 1720 is generally the name of a field designated to receive the selected Search Results.

Search Definition

Figure 18A:
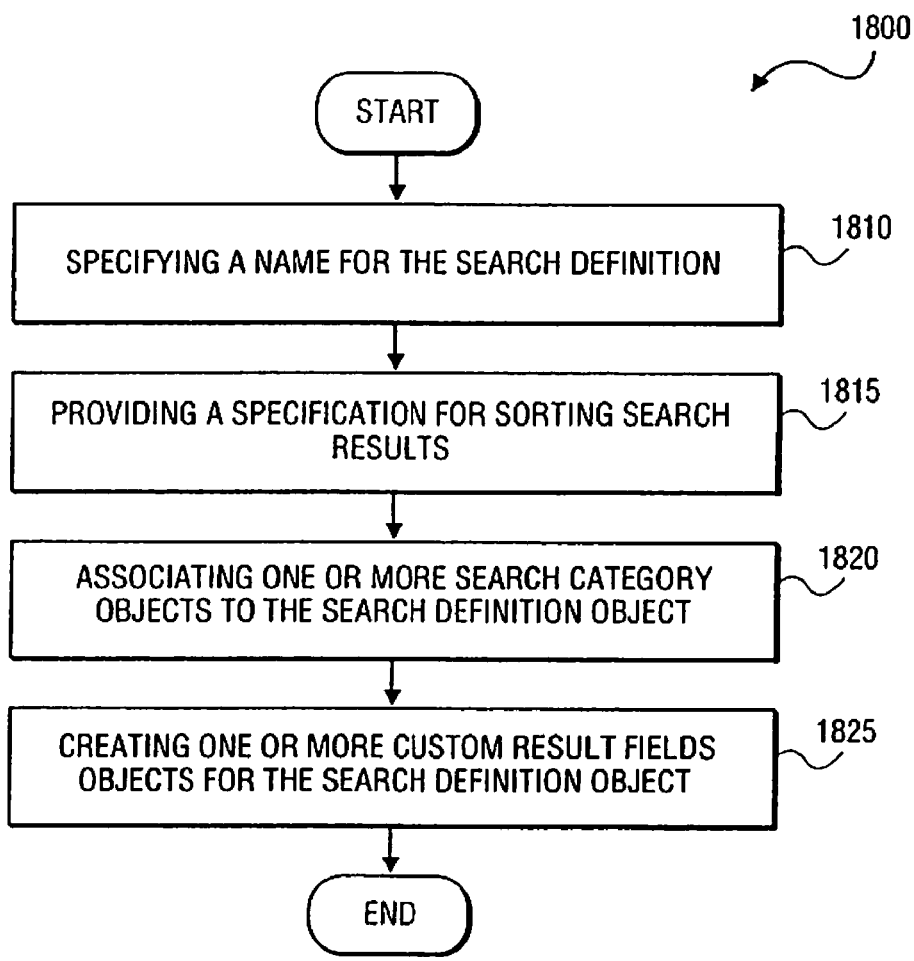
FIG. 18A is a flow chart generally outlining an exemplary process of creating and configuring a Search Definition object.

FIG. 18A is a flow chart generally outlining an exemplary process 1800 of creating and configuring a Search Definition object. Creating a Search Definition object generally includes specifying a name for the Search Definition (block 1810), and providing a specification for sorting Search Results (block 1815). A Search Definition is generally a grouping of Search Categories. Users can typically define one or more Search Definitions for an application. After the Search Definition object is created, one or more Search Category objects can be associated with the Search Definition object (block 1820). In one embodiment, a Search Category object associated with a parent Search Definition includes different properties than a Search Category associated with a Search Index. In addition, one or more Custom Result Fields objects can be created for the Search Definition object (block 1825).

Figure 18B:
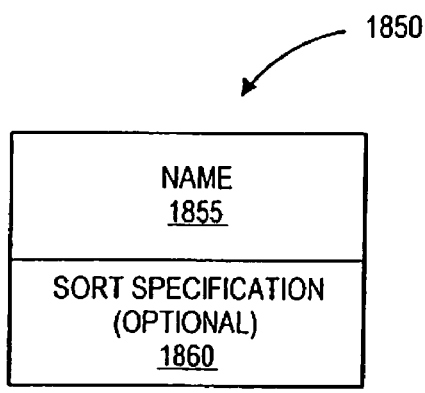
FIG. 18B generally illustrates properties of a Search Definition object in accordance with one embodiment of the present invention.

FIG. 18B generally illustrates properties of a Search Definition object 1850 in accordance with one embodiment of the present invention. In this embodiment, Search Definition object 1850 can include the following properties: Name 1855 and Sort Specification 1860. Name 1855 is a required property, while Sort Specification 1860 is an optional property. Name 1855 generally represents a logical name of the Search Definition. Sort Specification 1860 is generally a sort expression used to order returned records. Exemplary values for Sort Specification 1860 can include "SCORE DESC" and "FILENAME ASC".

FIG. 19 generally illustrates properties of an exemplary Search Category object 1900 associated with a Search Definition in accordance with one embodiment of the present invention. In this embodiment, Search Category object 1900 associated with the Search Definition can include the following properties: Name 1905, Display Name 1910, Filter Search Specification 1915, Use Filtered Search 1920, and Sequence 1925. Of the aforementioned properties, Name 1905 and Display Name 1910 are required; and Filter Search Specification 1915, Use Filtered Search 1920, and Sequence 1925 are optional. Name 1905 generally identifies the Search Category. Display Name 1910 generally represents the actual display name of the Search Category. In one embodiment, Display Name 1910 appears in the category dropdown field in the Basic Search applet or the Advanced Search applet. Filter Search Specification 1915 applies to filter fields. Use Filtered Search 1920 should be set to TRUE if filtered search is to be applied on the Search Category. Sequence 1925 generally specifies the order in which Search Categories are listed in the search applet for the parent application.

Creating one or more Custom Result Field objects for a parent Search Definition object generally includes specifying the search execution or display properties for the result fields. FIG. 20 generally illustrates properties of an exemplary Custom Result Field object 2000 in accordance with one embodiment of the present invention. In this embodiment, Custom Result Field object 2000 can include the following properties: Display Name 2005, Display Format 2010, Name 2015, Scaling Factor 2020, Sequence 2025, Text Alignment 2030, Use in Search 2035, Visible 2040, and Width 2045. Of the aforementioned properties, Name 2015 and Sequence 2025 are required. Name 2015 generally represents the logical name of the Custom Result Field. Sequence 2025 generally specifies the order in which columns should appear. Display Name 2005, Display Format 2010, Scaling Factor 2020, Text Alignment 2030, Use in Search 2035, Visible 2040, and Width 2045 are optional properties. Display Name 2005 is the name to display in the user interface. Display Format 2010 generally indicates a format mask to apply to data. Scaling Factor 2020 generally represents a multiplication factor for numeric columns. Text Alignment 2030 generally specifies the alignment of the text in the column. Use in Search 2035 generally indicates whether the column is to be included in a search. Visible 2040 can be set to TRUE if the Custom Result Field is to be displayed. Width 2045 generally specifies the width of the display column in pixels.

Figure 21:
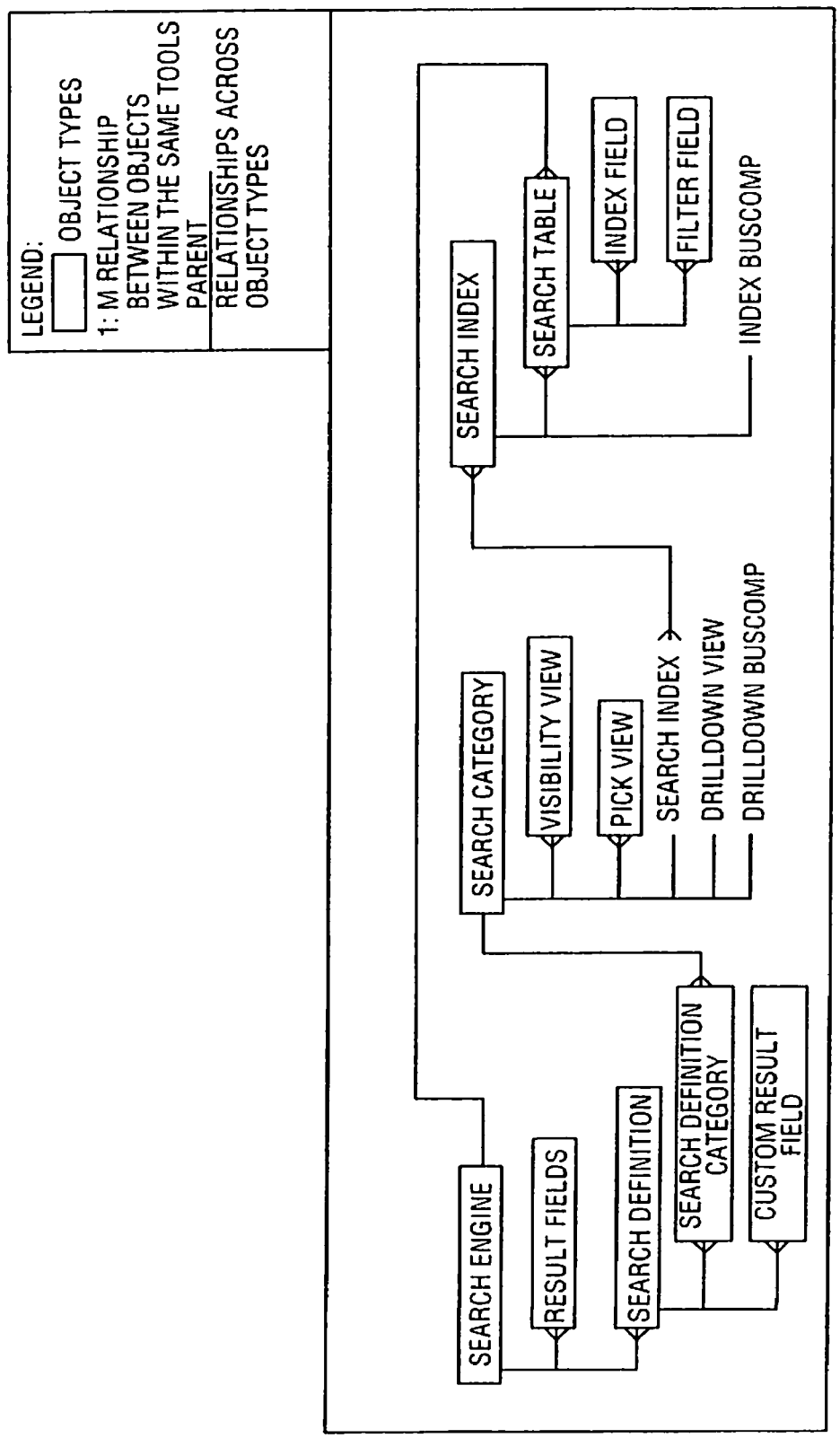
FIG. 21 shows a summary of the relationship between these exemplary Search objects described above.

FIG. 21 shows a summary of the relationship between these exemplary Search objects described above. As shown in the figure, an object can have a 1:1 relationship to another object. For example, there is a 1:1 relationship between a Search Category object and a Drilldown View object. In addition, an object can have a 1:M relationship to another object. For example, there can be many Search Definition objects that are related or associated to a Search Engine object.

Search Administration

Search Administration is generally a common tool for creating and administrating Search Indices for a selected search engine (e.g., Fulcrum). In one embodiment, the creating and administrating Search Indices encompasses two main areas, including Search Indices Administration for administrating table and indices (e.g., creation, indexing, refreshing, etc.) and Search Settings Administration for setting search properties that are used throughout the search process.

Search Indices Administration

To begin the process of administrating Search Indices, the user or administrator navigates to the Search Indices View. FIG. 30 illustrates an exemplary Search Indices View 3000 in accordance with one embodiment of the present invention. The user or administrator can generally use the Search Indices View to create new indices, refresh selected existing indices, and refresh all existing indices. Search Indices View 3000 includes two applets, Search Administration Settings List Applet 3005 and Search Index List Applet 3010. Search Administration Settings List Applet 3005 is displayed at the top of the Search Indices View 3000. Search Administration Settings List Applet 3005 can generally be used to display and manipulate existing administrative settings, or create new administrative settings.

Search Index List Applet 3010 is displayed at the bottom of the Search Indices View 3000. In one embodiment, Search Index List Applet 3010 is implemented as a read-only applet. Search Index List Applet 3010 generally displays a list of all available Search Index objects. A description of a Search Index object is provided above in the Search Objects section. In one embodiment, Search Index List Applet supports a number of methods, including Index, Refresh, and Refresh-All. Index can generally be used to create a new search index. Refresh can generally be used to re-index a selected search index. Refresh-All can generally be used to re-index all valid and existing search indices.

Search Settings Administration

The administration of search settings can be divided into two main areas, including Search Execution Settings to configure run-time properties and Search Administration Settings to configure properties used during the administration or creation of Search Indices.

Figure 31:
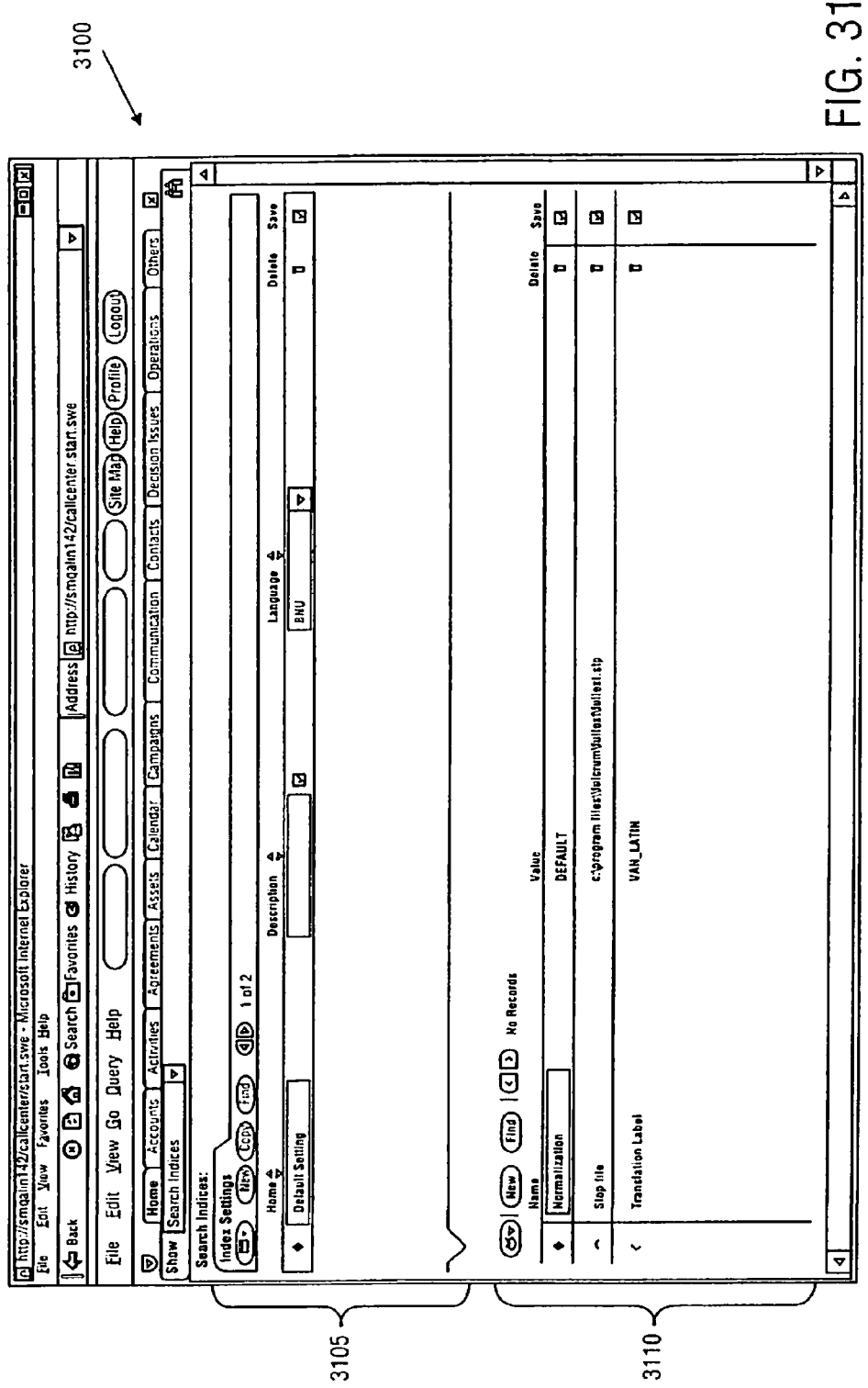
FIG. 31 shows an exemplary Search Execution Settings View in accordance with one embodiment of the present invention.

FIG. 31 shows an exemplary Search Execution Settings View 3100 in accordance with one embodiment of the present invention. Search Execution Settings View 3100 includes two applets, Search Settings List Applet 3105 and Search Settings Properties List Applet 3110. The user or administrator generally utilizes the Search Execution Settings View 3100 to define properties for a selected search engine (e.g., Fulcrum). The properties are listed as name-value pairs and are applied to searches done against a given database using the selected search engine.

Search Settings List Applet 3105 is displayed at the top of the Search Execution Settings View 3100. Search Settings List Applet 3105 generally shows a list of available settings. Search Settings Properties List Applet 3105 is displayed at the bottom of the Search Execution Settings View 3100. Search Settings Properties List Applet 3105 generally shows a list of basic and advanced search execution properties. Exemplary properties can include values for synonym searching, word stemming, spell checking, and relevance ranking.

Figure 32:
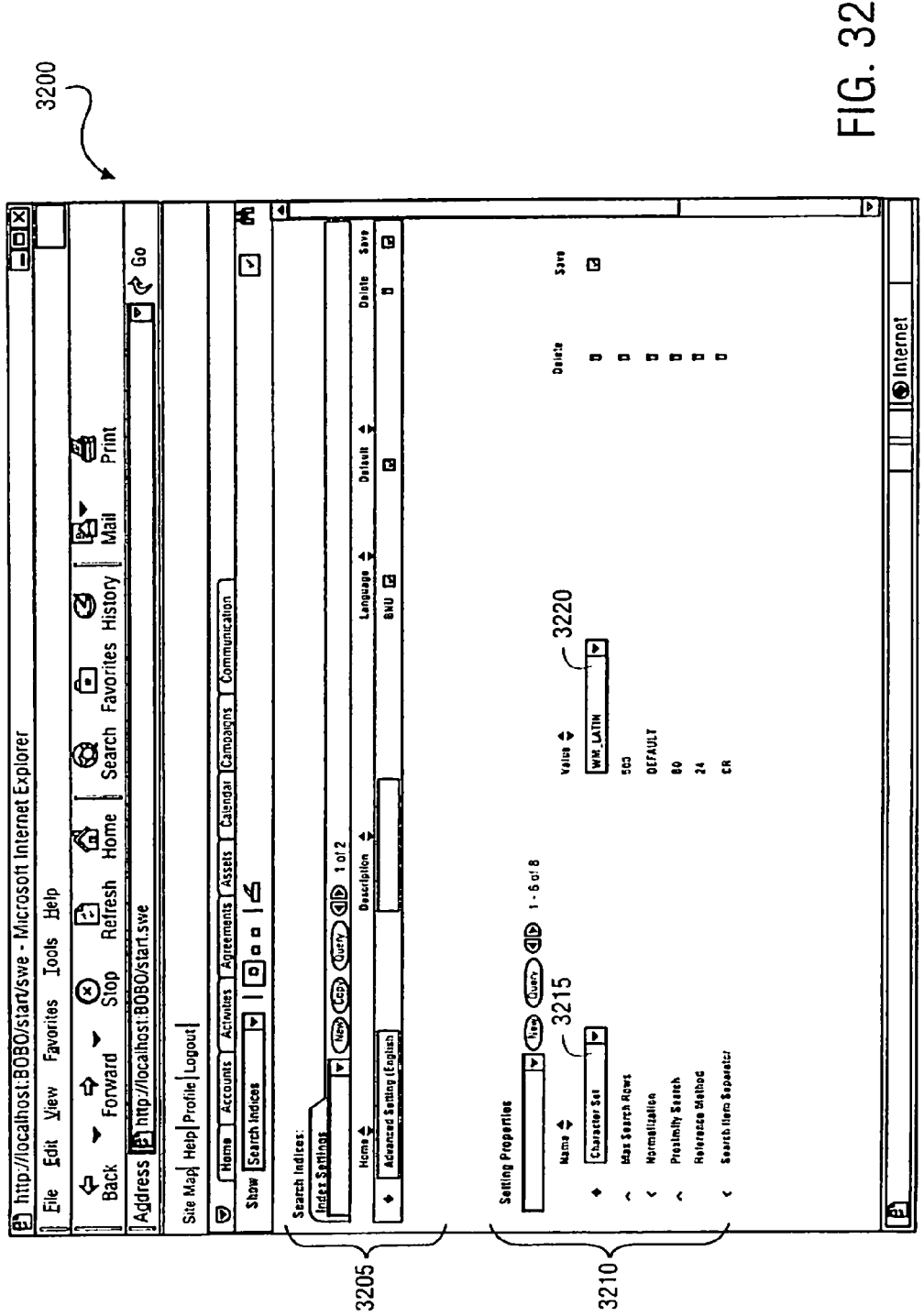
FIG. 32 shows an exemplary Search Administration Settings View in accordance with one embodiment of the present invention.

FIG. 32 shows an exemplary Search Administration Settings View 3200 in accordance with one embodiment of the present invention. Search Administration Settings View includes two applets, Search Admin Settings List Applet 3205 and Search Admin Settings Properties List Applet 3210. The user or administrator generally uses Search Administration Settings View 3200 to define search administration settings and properties. Search Admin Settings List Applet 3205 is displayed at the top of the Search Administration Settings View 3200. Search Admin Settings List Applet 3205 generally shows a list of available settings. Search Admin Settings Properties List Applet 3210 is displayed at the bottom of the Search Administration Settings View 3200. Search Admin Settings Properties List Applet 3210 generally shows a list of search administration properties. An exemplary search administration property is "Character Set" 3215, which can be set to "WIN_LATIN1" 3220. "WIN_LATIN1" 3220 denotes that while creating an index, the selected search engine could expect characters of type Latin1.

Search Execution

Figure 22:
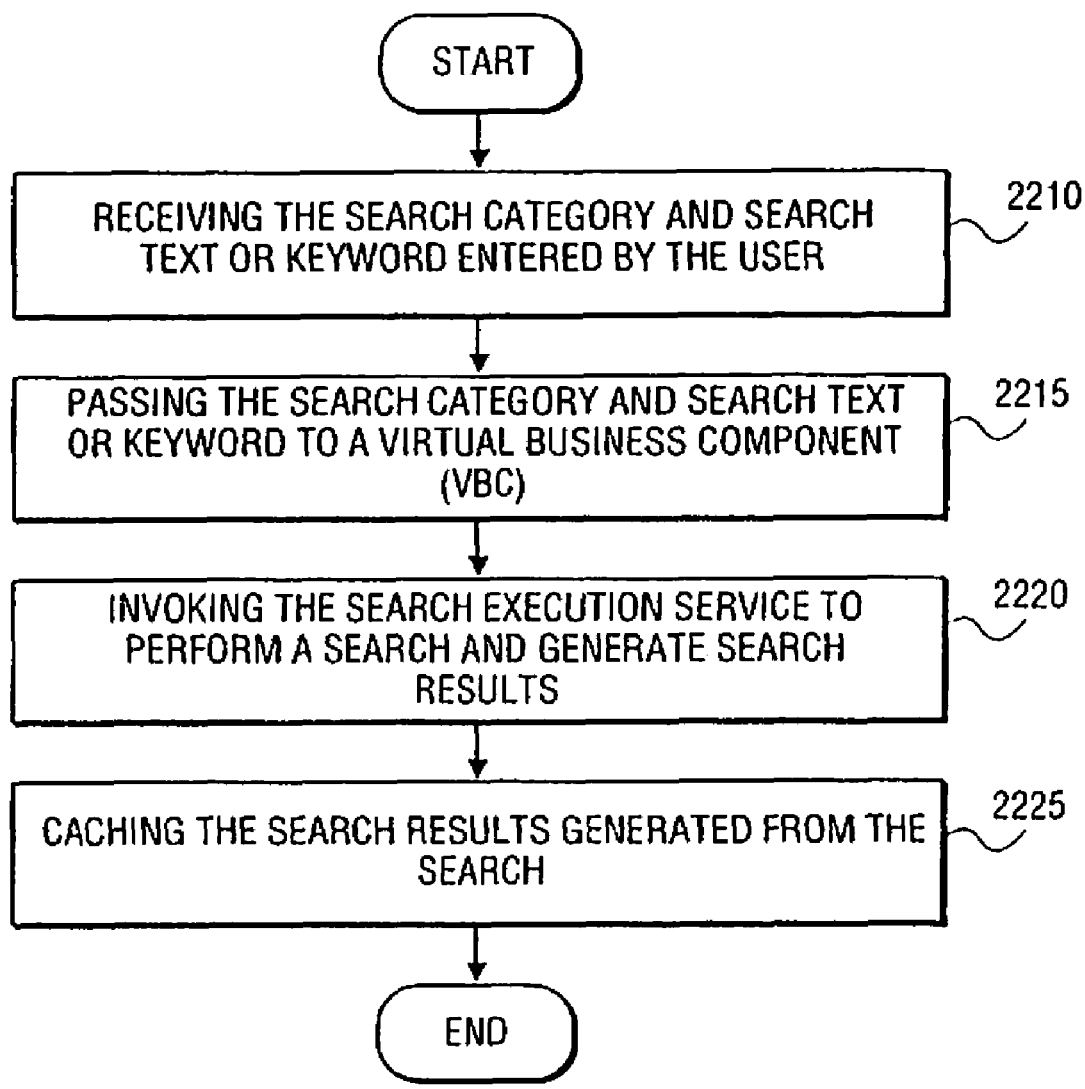
FIG. 22 is a flow chart generally outlining an exemplary process of how a search is executed in accordance with one embodiment of the present invention.
Figure 23:
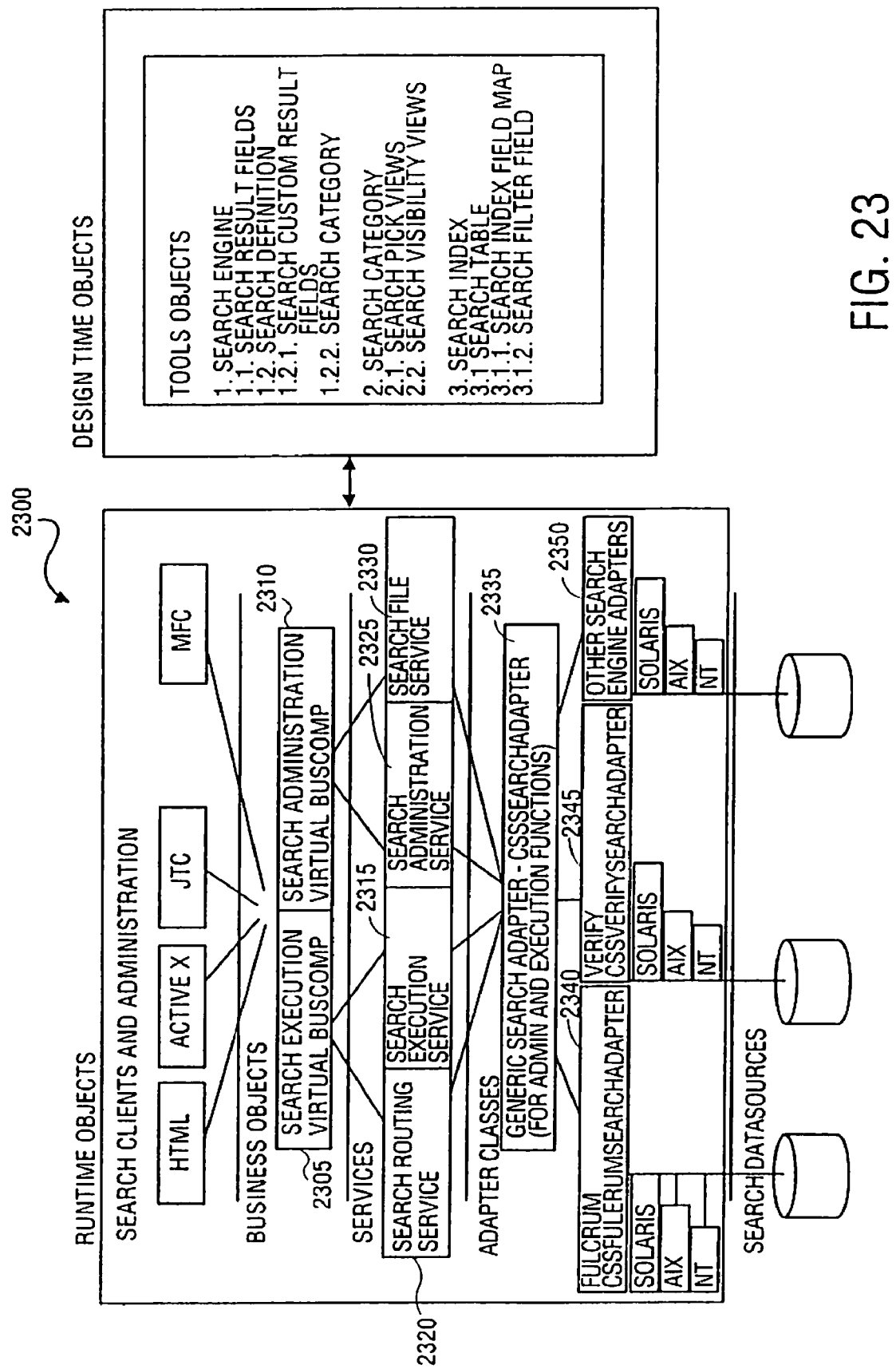
FIG. 23 illustrates a block diagram of a system in accordance with one embodiment of the present invention.

FIG. 22 is a flow chart generally outlining an exemplary process 2200 of how a search is executed in accordance with one embodiment of the present invention. FIG. 23 illustrates a block diagram of a system 2300 in accordance with one embodiment of the present invention. As stated above, the system will be described below with references to various databases, tables, file systems, etc. as illustrating examples. However, it should be understood by one skilled in the art that the teachings of the invention should be applicable to other types of databases, tables, file systems, etc. It should further be noted that the description of the process below will be done with references to FIGS. 22 and 23.

To perform a search, a user generally selects or specifies search criteria through the Search Center User Interface. In one embodiment, the search criteria may include a Search Category and a search text or keyword. It should be noted that the user can select multiple Search Categories at the same time. Search Category objects representing Search Categories can be created and associated with Search Indices or Search Definitions, as described above in the Search Objects section. After the user selects a Search Category (or Search Categories) and enters a search text or keyword, the user would then select the Search button to execute the search. In block 2210 of FIG. 22, the user-selected Search Category and the user-entered search text or keyword are received.

In block 2215 of FIG. 22, the selected Search Category and the search text or keyword are passed to a Search Execution Virtual Business Component (VBC) 2305 (shown in FIG. 23). A Virtual Business Component 2305,2310 (shown in FIG. 23) generally represents external data as a business component, which generally provides a layer of wrapping over database tables. By using Virtual Business Components 2305,2310, external data (e.g., data in an Oracle database or a SAP R/3 database) can be represented. Furthermore, business services can be used to transfer data. As a result, duplication of data can be avoided, and a unified presentation of legacy and non-legacy data can be achieved.

Once the Search Category or Categories and the search text or keyword are passed to the Search Execution VBC 2305 (shown in FIG. 23), the VBC 2305 invokes a registered business service called the Search Execution Service 2315 and passes along the Search Category or Categories and the search text or keyword as parameters (block 2220 of FIG. 22). A business service 2315,2320,2325,2330 (shown in FIG. 23) is generally an object encapsulating and simplifying the use of a set of functionalities. Business component objects are typically tied to specific data and tables. On the other hand, business services 2315,2320,2325,2330 are not tied to specific data and tables. Rather, business services 2315,2320, 2325,2330 operate or act upon objects to achieve a particular goal. Business services 2315,2320,2325,2330 are generally used to simplify the task of moving data and converting data formats between applications.

Business services 2315,2320,2325,2330 use property sets for input and output. A property set is generally a hierarchical data structure that can include name-value pairs. An example of a name-value pair can be (FontColor=Green), where Font-Color is a property and the name-value pair sets the value of the FontColor property to the value of Green. A property set can also include one or more child property sets. Each child property set can in turn include one or more grandchildren property sets.

Once the user performs a search to generate Search Results, these Search Results are persistent for a user session. In other words, the content of the Search Results are cached and saved until the user session is terminated (block 2225 of FIG. 22). Accordingly, the user can retrieve and use the generated Search Results within a user session.

The persistency of the Search Results allows the user to perform certain actions on the Search Results. As an example, the user can further refine a search. For example, assuming that the user performs a search on the keyword "modem" and receives Search Results relating to "modem". The user then realizes that she was really looking for "58K modems". The user could perform a refined search on the Search Results for "58K modems." Additional details on refining a search will be provided below.

As another example of the usefulness of the persistency of Search Results, the user can preview the Search Results. When the user receives Search Results generated from a search, the user could select the "Preview" button to view a selected Search Result record in a popup view. By previewing the Search Result record in the popup view, the user does not have to use the current window generated by the client. The user essentially has and can look at two separate views, including a window generated by the client and a popup view displaying the preview of a Search Result record. Additional details on previewing Search Results will be provided below.

As an additional example of the usefulness of the Search Results persistency, the user can attach Search Results to another object. A typical scenario in which attaching Search Results is useful would be a user trying to resolve a current service request. In this scenario, the user would begin by performing a search for existing "Solutions". After the prior solutions resulting from the search are available, the user can then go through the solutions to find an appropriate solution for the current service request. Once the appropriate solution is found, the user can select the "Attach" button to attach the appropriate solution to the current service request. Additional details on attaching Search Results will be provided below.

In one embodiment, a cached Business Service is employed to support persistent Search Results. The cached Business Service employed to execute searches is called the Search Execution Business Service. Once the search center is opened or a search is started from the search toolbar, an instance of a cached Business Service in general (and Search Execution Business in particular) is invoked. The invoked Business Service instance will generally remain in existence until the user session is terminated. In other words, the invoked Business Service instance maintains information about the executed search (e.g., Search Categories and search text or keyword) until the user session terminates. As examples, the user session can terminate when the user signs off or times out.

In one embodiment, the component that determines the begin or end of a user session is the Application Object Manager 120 (shown in FIG. 1). From a system management point of view, a session begins when the client connects to the Application Object Manager 120, and ends when the connection is terminated. In an embodiment where multi-tasking is supported, a task is started on the Application Object Manager to support a user session. In an embodiment where multi-threading is supported, a thread is started on the Application Object Manager to support a user session.

As stated above, the Business Service used to perform searches is called the Search Execution Service 2315 (shown in FIG. 23). In one embodiment, the Search Execution Service 2315 supports the following external interfaces: ::SetSearchParameters,:: ExecuteSearch, ::IsSearchExecuted, :: GetNumberOfResults, ::GetResultFields, and ::GetResultFieldValues. In one embodiment, ::SetSearchParameters generally receives search parameters such as Search Categories and the search text or keyword and saves the received search parameters in data structures internal to the Search Execution Service 2315. It should be noted that external interfaces supported by the Search Execution Service 2315 are invoked by objects that are external to the Search Execution Service 2315, e.g., the Search Execution Virtual Business Component 2305.

::ExecuteSearch generally performs the search using the selected search adapter. For example, if the Fulcrum Search Engine 2340 is selected, ::ExecuteSearch would start the search adapter for Fulcrum and would use the Fulcrum search adapter to perform the search. ::IsSearchExecuted generally checks whether the search was executed or performed. ::GetNumberOfResults generally returns the number of results available from executing or performing the search. ::GetResultFields generally returns the result fields that need to be displayed on a particular search result row. In one embodiment, the result fields are generated dynamically during runtime. ::GetResultFieldValues is generally used to retrieve the values of the result fields.

In one embodiment, the Search Execution Service 2315 also support some internal interfaces, including ::CreateSearchAdapter and ::InitializeSearchAdapter. It should be noted that external interfaces supported by the Search Execution Service 2315 can only be invoked by components that are internal to the Search Execution Service. ::CreateSearchAdapter generally selects the search engine to be used by examining configuration information and dynamically invokes the search adapter appropriate for the search engine. ::InitializeSearchAdapter is generally used to initialize the invoked search adapter.

In one embodiment, search adapter classes can be derived from the generic base class CSSSearchAdapter 2335. CSSSearchAdapter 2335 supports interfaces that are common to search engines 2340,2345,2350. In this embodiment, the interfaces supported by CSSSearchAdapter 2335 can be grouped in the following categories: interfaces for initializing the search engine, interfaces for executing or performing the search, interfaces for allocating buffers to store results of the search if the search is successful, interfaces for filling the allocated buffers with results of the search, and interfaces for error handling. Interfaces for executing or performing the search can include methods for parsing search keywords, methods for parsing filter search specifications, and methods for constructing Visibility queries. Additional details on Visibility will be provided below.

Interfaces for initializing the search engine can include methods for initializing results buffers, methods for initializing Search Categories buffers, and methods for initializing Filter Field buffers. A results buffer generally holds results that the search engine generates for a search. In one embodiment, the results buffer includes an array of search result rows. Each search result row is stored in a Result Row. Accordingly, the Result Row contains values for one search result row. These values are stored in a hash table of name-value pairs. For example, a Result Row can include the following fields: RowId, Summary, Relevance, and File Size. Exemplary values for the aforementioned fields can be "10-2344A", "How to create a Service Request", "90%", and "150 KB" respectively.

Result Field Information is generally a data structure that is used for caching definitions of the result fields for the currently selected search engine. In one embodiment, these definitions of the result fields are cached once every user session. Each result field is generally an abstraction of the actual physical column in the table pertaining to the currently selected search engine (e.g., Fulcrum).

Each Result Field Information data structure can generally include fields that store information that can be used while constructing queries to be executed by the currently selected search engine or while displaying results available for the search. Accordingly, each Result Field Information data structure can contain fields pertaining to user interface (UI) functions or non-UI functions.

In one embodiment, fields in the Result Field Information data structure that can be used while constructing queries (i.e., non UI functions) can include Name, Column Name, Data Type, Index Mode, and Text Length. Name generally represents the name of the result field. Column Name generally holds the name of the physical column in the table pertaining to the currently selected search engine (e.g., Fulcrum). Data Type generally specifies the data type of the result field. Exemplary values for Data Type can include "varchar", "character", and "apvarchar". Index Mode specifies the index mode of a column. Exemplary values for Index Mode can include "normal", "literal", or "none".

In one embodiment, fields in the Result Field Information data structure that can be used while displaying results (i.e., UI functions) can include Display Name, Text Alignment, and Visible. Display Name generally contains a label that is to be displayed on the user interface (UI). Text Alignment generally represents the alignment that is to be employed when displaying the value of the result. Exemplary values for Text Alignment can include "left", "center", and "right". Visible is generally a boolean flag which should be set to TRUE if the result field should be displayed and FALSE if the result field should not be displayed.

Search Categories buffers are generally used to hold Search Category Information data structures. Each Search Category Information data structure is generally used to cache all the information pertaining to a Search Category on which a search can be performed for the current application.

Each Search Category Information data structure can generally include fields that store information that can be used while constructing queries to be executed by the currently selected search engine or while displaying results available for the search. Accordingly, each Result Field Information data structure can contain fields pertaining to user interface (UI) functions or non-UI functions.

In one embodiment, fields in the Search Category Information data structure that can be used while constructing queries (i.e., non UI functions) can include Name, Index Name, Table Name, Filter Field Object Array. Name generally represents the name of a Search Category. Index Name is generally the name of the underlying Search Index. It should be noted that many Search Categories can be associated to the same Search Index. As a result, users of various applications can customize Search Categories to fit the users' needs based on their application. Table Name generally represents the name of the underlying table corresponding to the Search Index. Filter Field Object Array generally holds one or more Filter Field objects. Each Filter Field object represents a Filter Field, which is generally used to constrain or restrict a search.

In one embodiment, fields in the Search Category information data structure that can be used while displaying results (i.e., UI functions) can include Display Name, Drilldown View, and Drilldown Business Component. Display Name is generally a label that is to be displayed on the UI. Drilldown View generally represents a view to which the user will be navigated when the results available from the search are displayed. When the view specified in Drilldown View is displayed, the view typically includes various Business Components. Drilldown Business Component generally represents the Business Component to which the user should be navigated when results available from the search are displayed within the view specified in Drilldown View.

Filter Field Information is generally a data structure used to cache the definition of a Filter Field defined for a particular Search Index. Each Filter Field Information data structure can include the following fields: Name, Column Name, Data Type, Index Mode, and Text Length. Name generally represents the name of the result field. Column Name generally holds the name of the physical column in the table pertaining to the currently selected search engine (e.g., Fulcrum). Data Type generally specifies the data type of the result field. Exemplary values for Data Type can include "varchar", "character", and "apvarchar". Index Mode specifies the index mode of a column. Exemplary values for Index Mode can include "normal", "literal", or "none".

Once the appropriate search adapter is invoked or started, default basic and advanced search settings for the selected search engine (e.g., Fulcrum) would be set. It should be noted that the search settings are defined by an administrator. Furthermore, data buffers are initialized and primed for searching.

The search category and search text are then extracted from input parameters. The search text are parsed for special keywords such as AND, OR, NEAR or the like. Search SQL statements are then constructed by combining Visibility rules query, Filter Field Specification query, and actual keyword query. These constructed SQL statements are executed to perform the search. After the search has been performed or executed, results available from the search are retrieved from the selected search engine (e.g., Fulcrum) and cached in the search adapter.

After results available from the executed or performed search have been retrieved from the selected search engine and cached in the search adapter, a notification is sent to the Search Center Frame 500 (shown in FIG. 5) generated by the client. After it receives the notification, the Search Center Frame 500 calls the Search Execution Virtual Business Component 2305 (shown in FIG. 23) to invoke the search and obtain the results available from the search.

The Search Execution Virtual Business Component 2305 calls the Search Execution Business Service 2315 (shown in FIG. 23) to retrieve the search results. If the Search Execution Service 2315 has previously cached the search results, the Service 2315 would transmit the search result rows to the Search Execution Virtual Business Component 2305. However if the Search Execution Service 2315 has not cached the search results, the Service 2315 would request that the adapter 2335 sends the search results to the Service 2315 from the adapter's cache. The Search Execution Service 2315 would then cache the search results and transmit the search results to the Search Execution Virtual Business Component 2305. Once the search results have been internally cached in the Search Execution Service 2315, the connection to the search engine can be closed.

Upon receiving the search results from the Search Execution Service 2315, the Search Execution Virtual Business Component 2305 sends the search results to the Search Center Frame 500 (shown in FIG. 5). The search results can then be displayed within the Search Center Frame 500. Users can drilldown, preview, or attach these search results, as will be described below in more details.

It should be noted that even if the user closes the Search Center, the results available from the search are still cached and can be used the next time the user opens the Search Center since the Search Execution Service 2315 have cached the search results. The last cached search results would be retained until the user terminates the user session.

Search Center User Interface

Turning back to FIGS. 4 and 5, FIG. 4 illustrates an exemplary Search Tool Bar Icon 405 in accordance with one embodiment of the present invention. To open the Search Center, the user click on the Search Tool Bar Icon 405. FIG. 5 illustrates an exemplary Search Center Frame or Pane 500 in accordance with one embodiment of the present invention. Search Center Frame or Pane 500 includes a Tool Bar section 505, a Content Area Frame 510, a Search Frame 515, and a Results Frame 520.

Figure 24:
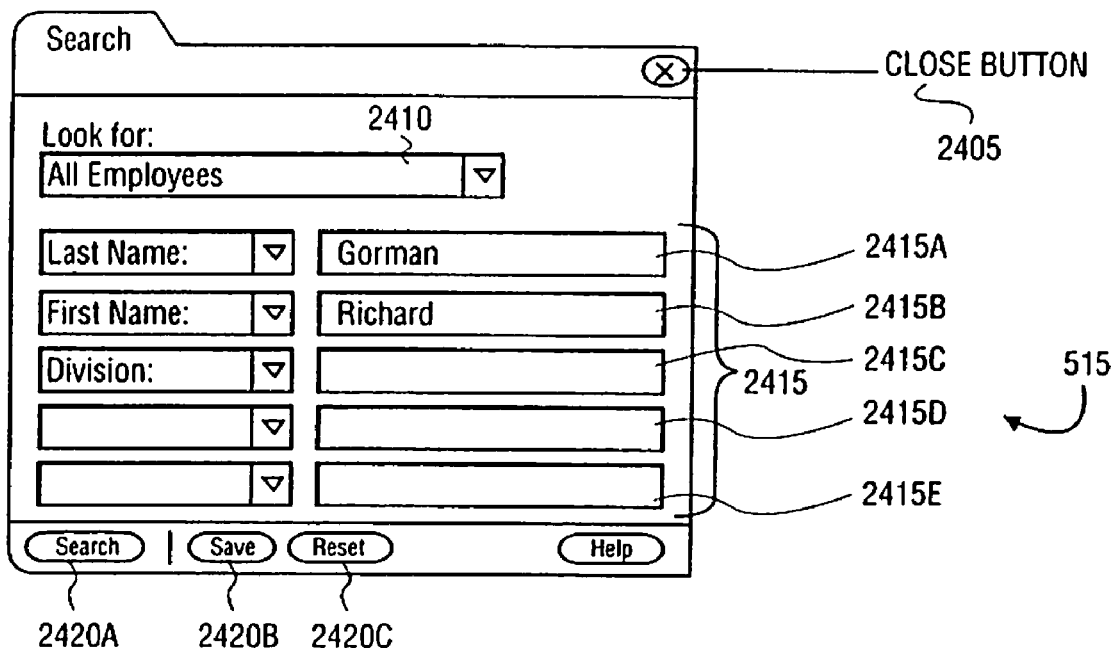
FIG. 24 illustrates an exemplary Search Frame in accordance with one embodiment of the present invention.

FIG. 24 illustrates an exemplary Search Frame 515 in accordance with one embodiment of the present invention. Search Frame 515 includes a Close button 2405, which the user can choose to exit the Search Center. In addition, Search Frame 515 includes a "Look For" box 2410 where a dropdown list of search categories and find categories will appear. Additional details about the dropdown list of search categories and find categories will be provided below in FIG. 25 and the text describing the figure.

Search Frame 515 further includes an update region 2415. Depending on what the user select from the "Look For" box, a set of controls is displayed in boxes 2415A, 2415B, 2415C, and 2415D.

In one embodiment, Search Frame 515 also includes the following action buttons: Search 2420A, Save 2420B, and Reset 2420C. Search button 2420A can be used to go forward with the search. Save button 2420B is generally used to save the current search to the dropdown list. Reset button 2420C is typically used to clear the content of boxes 2415A, 2415B, 2415C, and 2415D.

Figure 25:
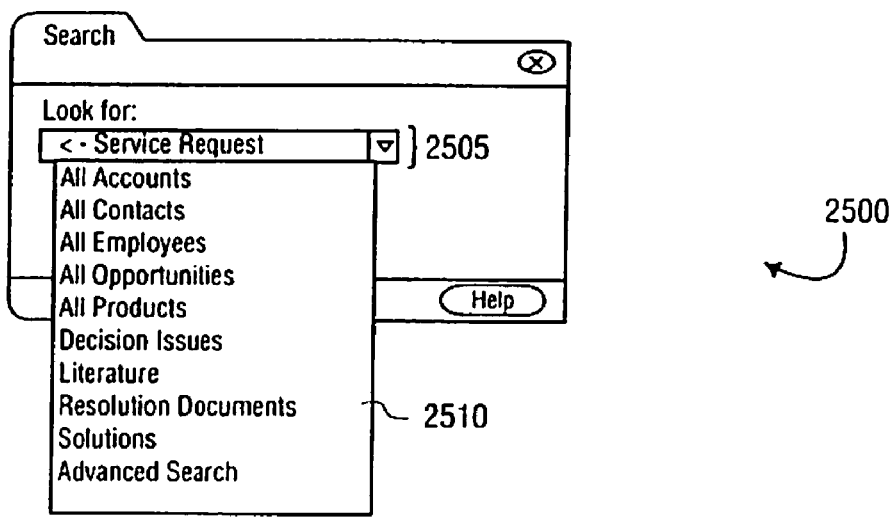
FIG. 25 shows an exemplary Search Selection View in accordance with one embodiment of the present invention.

FIG. 25 shows an exemplary Search Selection View 2500 in accordance with one embodiment of the present invention. Search Selection View 2500 includes a Search Selection Applet 2505. Search Section Applet 2505 supports a dropdown list 2510 of search categories and find categories. When user selects a search option from the dropdown list 2510, the selected search option is saved. The selected search option can be saved in the Search Execution Service by invoking the SetSearchOption method. The saving of the search option in the Search Execution Service will clear any existing Search Categories and search text or keyword. Furthermore, Search Categories corresponding to the selected search option is saved in the Search Selection Service. In addition, a new view corresponding to the selected search option is built. As an example, if the user selects a search option that refers to a Search object described above in the Search Objects section, a Basic Search View will be built. A description of an exemplary Basic Search View is provided below in FIG. 26 and the text describing the figure. As another example, if the user selects "Advanced Search", an Advanced Search View will be built. A description of an exemplary Advanced Search View is provided below in FIG. 27 and the text describing the figure.

Figure 26:
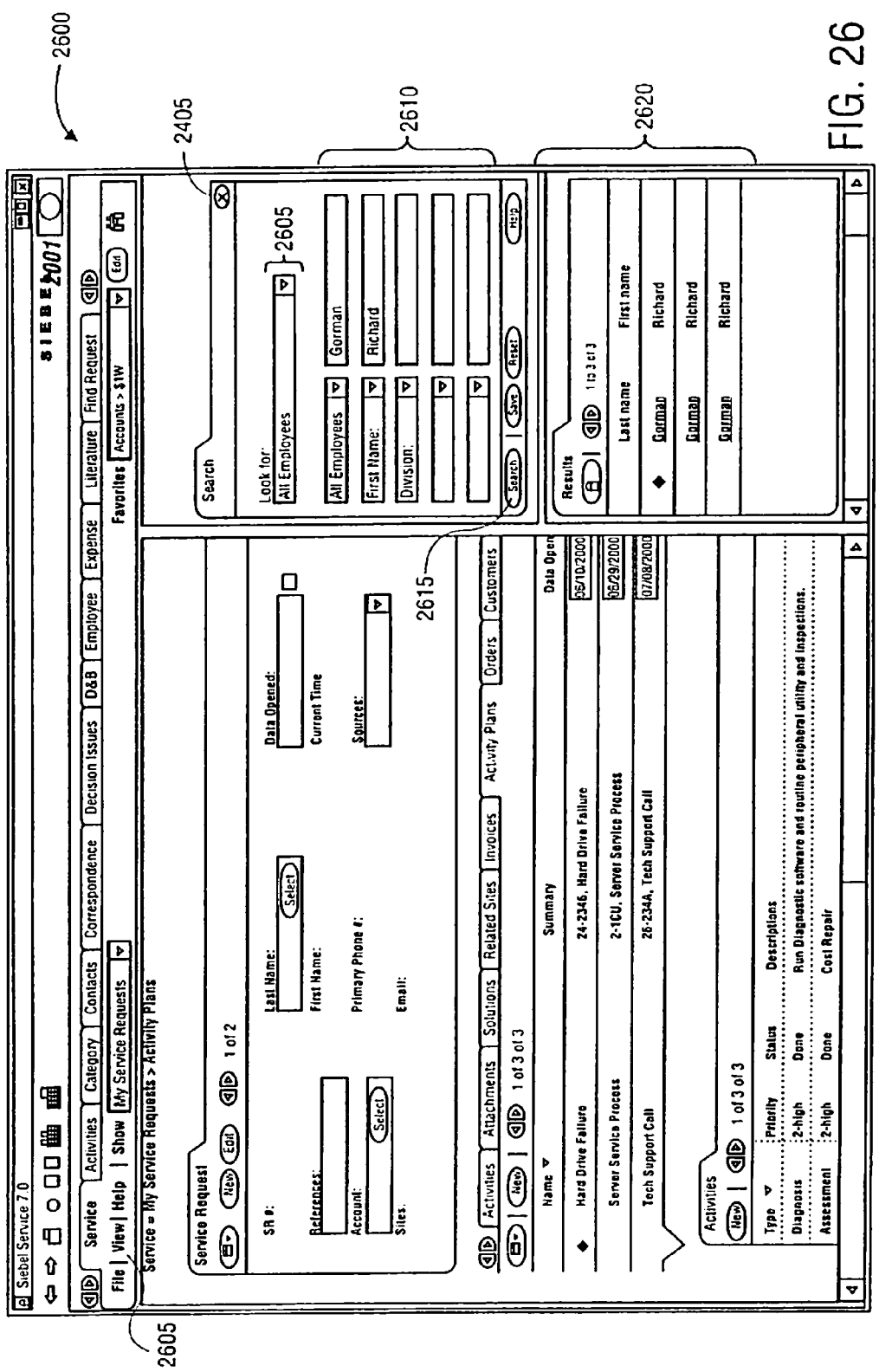
FIG. 26 shows an exemplary Basic Search View and Basic Search Results View in accordance with one embodiment of the present invention.

FIG. 26 shows an exemplary Basic Search View and Basic Search Results View in accordance with one embodiment of the present invention. Basic Search View includes Search Selection Applet 2605 and Basic Search Applet 2610. Through the Search Selection Applet 2605, the user can clear the current Search Category from the Search Execution Service and the Search Selection Service. Furthermore, the user can select a new search category and navigate to the appropriate view corresponding to the newly selected search category. In addition, the user can click on the Close button 2405 to close all applets and rebuild the master view.

Through the Basic Search Applet 2610, the user can enter search text or keyword and select the Search button 2615. Once the user selects the Search button 2615, the entered search text or keyword is saved in the Search Selection Service. Then the Search Execution Business Service starts or invokes a search adapter corresponding to the currently chosen search engine. The search adapter then executes the search and retrieves search results available from the executed search. The Basic Search Results View will then be built.

Basic Search Results View includes Search Selection Applet 2605 and Basic Search Applet 2610, which are described above. Basic Search Results View also includes a Search Results List Applet 2620. Search Results List Applet 2620 retrieves the search results from the Search Execution Service. Search Results List Applet 2620 then creates dynamic fields on the business components and sets these dynamic fields with values from the search results.

Figure 27:
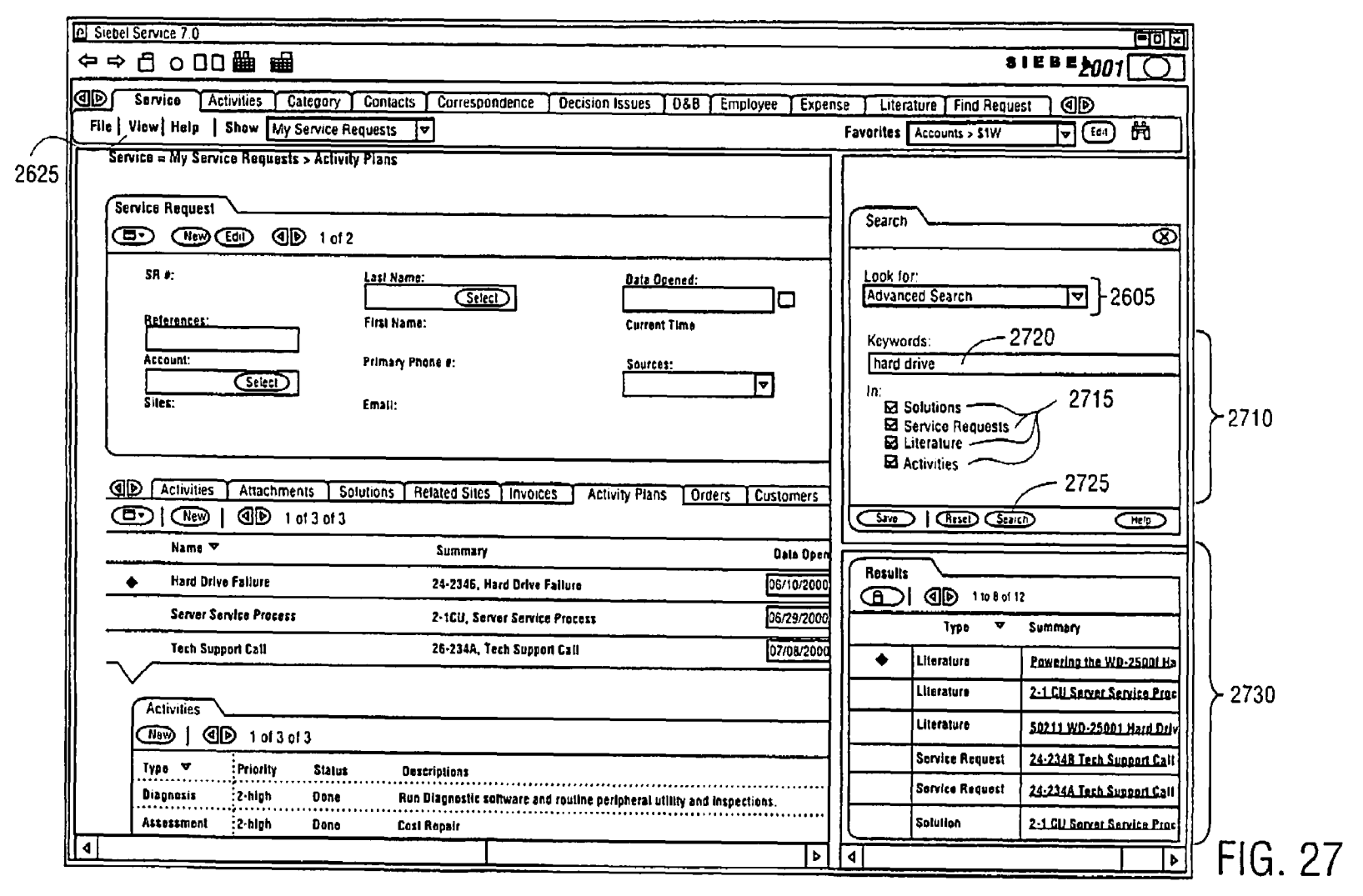

FIG. 27 shows an exemplary Advanced Search View and Advanced Search Results View in accordance with one embodiment of the present invention. Advanced Search View includes Search Selection Applet 2605 and Advanced Search Entry Applet 2710. A description of Search Selection Applet 2605 is provided above. Through Advanced Search View, the user can specify parameters for the search by selecting one or more Search Index sources 2715 and entering search text or keyword in the Keyword box 2720. Once the user selected one or more Search Index sources 2715, entered the search text or keyword, and selected the Search button 2725, the search is executed. Search results available for selected Search Categories 2715 are retrieved. The retrieved search results are sorted based on the Sort Specification criteria.

An Advanced Search Results View is then built to list the search results. Advanced Search Results View includes Search Selection Applet 2605 and Advanced Search Entry Applet 2710, which are described above. Advanced Search Results View also include Advanced Search Results Applet 2730. Advanced Search Results Applet 2730 retrieves the search results from the Search Execution Service, creates dynamic fields for business component based on the current search definition, and displays these dynamic fields on the user interface.

Each of the Advanced Search View and the Basic Search View includes a View Options Search Tab 2625. View Options Search Tab 2625 enables the user to override a search setting or certain properties of the search setting. View Options Search Tab 2625 includes the following controls, including Search Setting, Search Term Separator, and Search Refining. In one embodiment, Search Setting is a dropdown list. Users with advanced status can utilize the Search Setting control to override the default search setting created in the Search Settings View.

It should be noted that Search Execution settings are usually created by the administrator. One of the Search Execution settings is marked as a default for each language. View Options Search Tab 2625 allows administrators or users to override the default Search Execution setting or certain properties of the setting.

Figure 28:
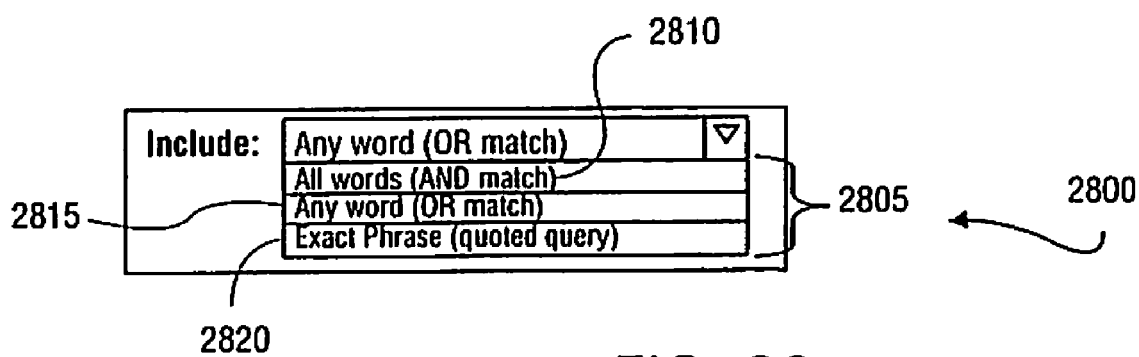
FIG. 28 shows an exemplary Search Term Separator control in accordance with one embodiment of the present invention

FIG. 28 shows an exemplary Search Term Separator control 2800 in accordance with one embodiment of the present invention. In one embodiment, Search Term Separator control 2800 includes a picklist 2805 with the following options: "All words (AND match)" 2810, "Any word (OR match) 2815, and "Exact Phrase" 2820. "All words (AND match)" option 2810 specifies a search to find records or documents containing every search keyword entered by the user. "Any word (OR match)" option 2815 specifies a search to find records or documents containing one of the search keywords entered by the user. "Exact Phrase" option 2820 specifies a search to find records or documents containing all search keywords in the order that the user had entered.

Figure 29:
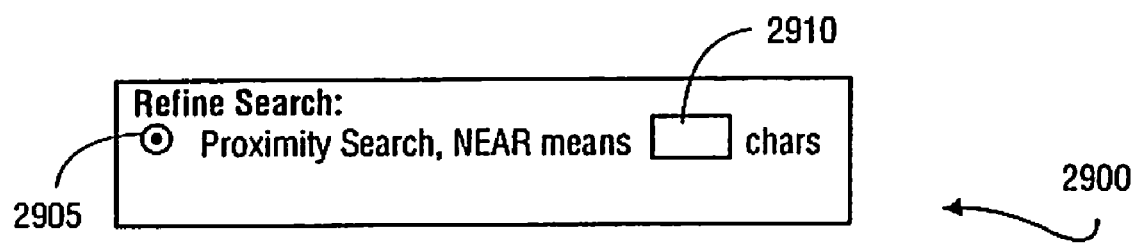

FIG. 29 shows an exemplary Search Refining control 2900 in accordance with one embodiment of the present invention. Search Refining control 2900 generally lists advanced features that can be controlled on the user interface. In one embodiment, the user can specify a proximity search by selecting the Proximity Search button 2905 and entering a number in the character box 2910 of the Search Refining control 2900.

III. Search Visibility:

Single/Multi Org Visibility on Search Results

In one embodiment, a business enterprise or a customer organization that spans multiple user groups, both internal and external to their enterprise, may have a need for controlling access and/or visibility to application data within and between those groups. In one embodiment, the search system described herein uses a mechanism or method referred to as multiple organizational (multi-org) visibility to provides the business enterprise or the customer organization with an ability to manage and control access to application within and between the various groups. In one embodiment, visibility to data can be controlled or limited at the individual level within a single organization or group. For example, visibility of various types of data (e.g., records) such as accounts, contacts, and opportunities, etc. can be controlled or limited at the individual level within a single organization or group. In one embodiment, access to those kinds of records can be limited to those individuals whose positions have been placed on virtual teams for each record. In one embodiment, access to additional data or information such as products and price lists can also be limited. In one embodiment, these limitations of visibility are implemented and controlled at the level of business organizations or groups rather than at the level of individual users.

In one embodiment, multi-org visibility provides a logical layer above the visibility controls at the enterprise, limited, and personal levels. In one embodiment, the multi-org visibility method described herein provides the ability to limit visibility to data based on the organization or organizations to which user positions are assigned. In one embodiment, multi-org visibility can be applied to user data within various applications, including transactional data (e.g., accounts, contacts, and opportunities, etc.), reference data (e.g., price lists, etc.), and run-time configuration data (e.g., assignment manager rules and product configurator models, etc.).

As described herein, the multi-org visibility method/mechanism can be used to support the following functions or tasks:

Data sharing across the extended enterprise, for example, distributing sales opportunities among multiple channel partners or resellers Applying appropriate business logic to different and diverse internal organizations Limiting visibility to each user's specific business context, for example, limiting a software salesperson's visibility to software product prices rather than all product prices, including prices for hardware Improving application performance for mobile users and executives with broad responsibilities and many direct reports by providing more ways to limit the number of records they retrieve from a database in a given query In one embodiment, multi-org visibility is one of the ways in which data access is restricted to different users. If "organizational visibility" is turned on then a user, through his pre-assigned positions, can only see records or data that pertain to his organization. In one embodiment, when directly accessing data stored in database tables through views in an application, organizational visibility rules can be applied as part of a database query (e.g., part of an SQL query). For example, if a business component called "Opportunity" is enabled for multi-org visibility control (multi-org enabled), then a user who chooses a view called "All Opportunities View" will see all opportunities that belong to his/her organization. Since the "All Opportunities View" view is a lookup on a corresponding database table called "Opportunity" table in the database, the SQL query used to populate the data for the view includes the multi-org query. These visibility rules are used to ensure that users belonging to different organizations or groups only see the records or data that they are allowed to see (e.g., records or data to which they have visibility).

In one embodiment, as described herein, to support full-text search, the various database tables in the system are indexed using a third party search engine, for example "Fulcrum" search engine. In one embodiment, records in the database are indexed into search indices, irrespective of whether a particular record can be viewed by a user or not. This type of indexing poses a problem for searching because if visibility rules are not applied on the search indices, then users will be able to see records that they don't have access to. In one embodiment, to overcome this problem, visibility rules need to be enforced during searching.

Figure 33:
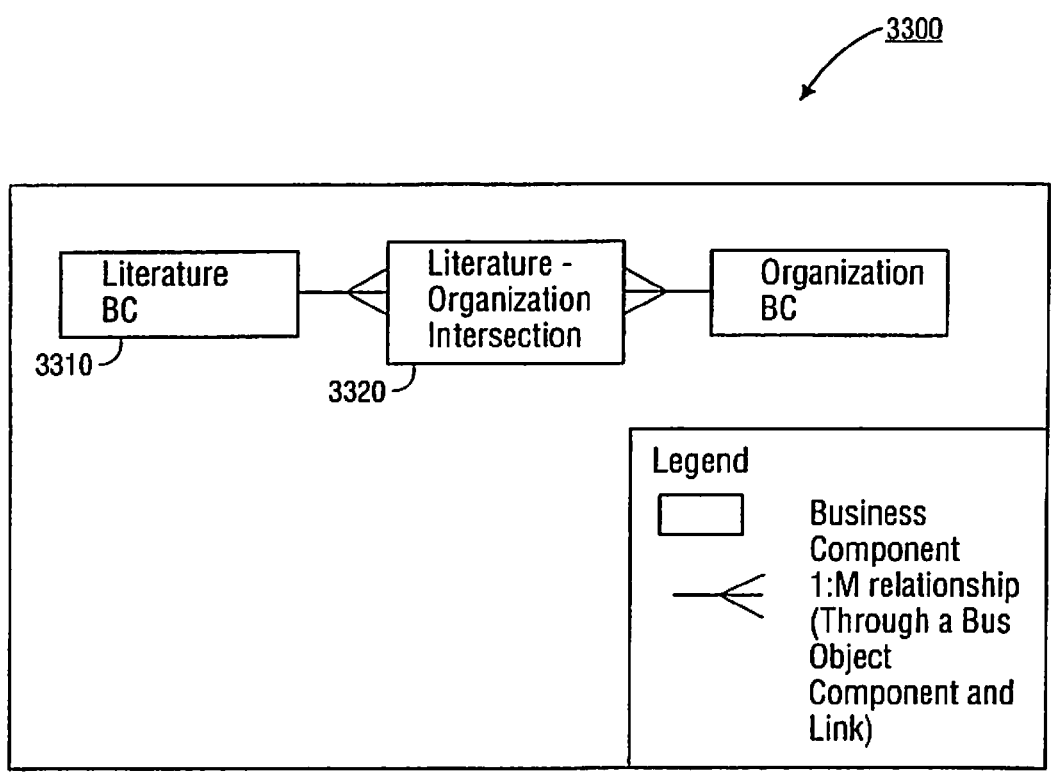
FIG. 33 illustrates a de-normalization of records using an intersection table.

The discussion below illustrates, in one embodiment, how visibility rules can be implemented and enforced for searching. It should be understood and appreciated by one skilled in the art that the specific examples discussed herein are for illustration and explanation purposes and should not be construed to limit the scope of the present invention. The following example uses a business component called "Literature" to illustrate how search visibility is implemented. In this example, it is assumed that the "Literature" business component needs to be indexed for searching and is enabled for multi-org visibility. FIG. 33 shows a relationship diagram between the "Literature" business component and a business component called "Organization". In this example, many organizations can share each literature record and many literature records can be accessed by a single organization. This example illustrates a typical many-to-many relationship.

In one embodiment, the solution for search visibility can be implemented at various levels, for example during search administration time, when the admin creates the search indices and during search execution time when the corresponding visibility rules are applied on the search results.

Search Configuration and Administration Time:

In one embodiment, during search configuration time the search index is configured by the admin based on the following specifications:
- the business component (which is based on a database table)
- the fields in the respective business component to be indexed
- the type of visibility to be applied on this index (in this case organization visibility)

In one embodiment, the search index configuration can be performed using a set of search configuration and administration tools as described herein.

After configuring the search index, the admin can use the Search Administration screens to create search indices based on the configuration defined above. In one embodiment, if the table being indexed is multi-org enabled then the records can be de-normalized by also including all organizations that are associated to each record. In one embodiment, the de-normalization of records can be done by using an intersection table, as shown in FIG. 33.

In the example of Literature business component, while indexing the required fields pertaining to the Literature table, for example Name, Description, etc., indexing is also done for all the Organization IDs that are associated to each literature record. Thus, de-normalization can be done by using the Literature-Organization Intersection table, as shown in FIG. 33.

Figure 34:
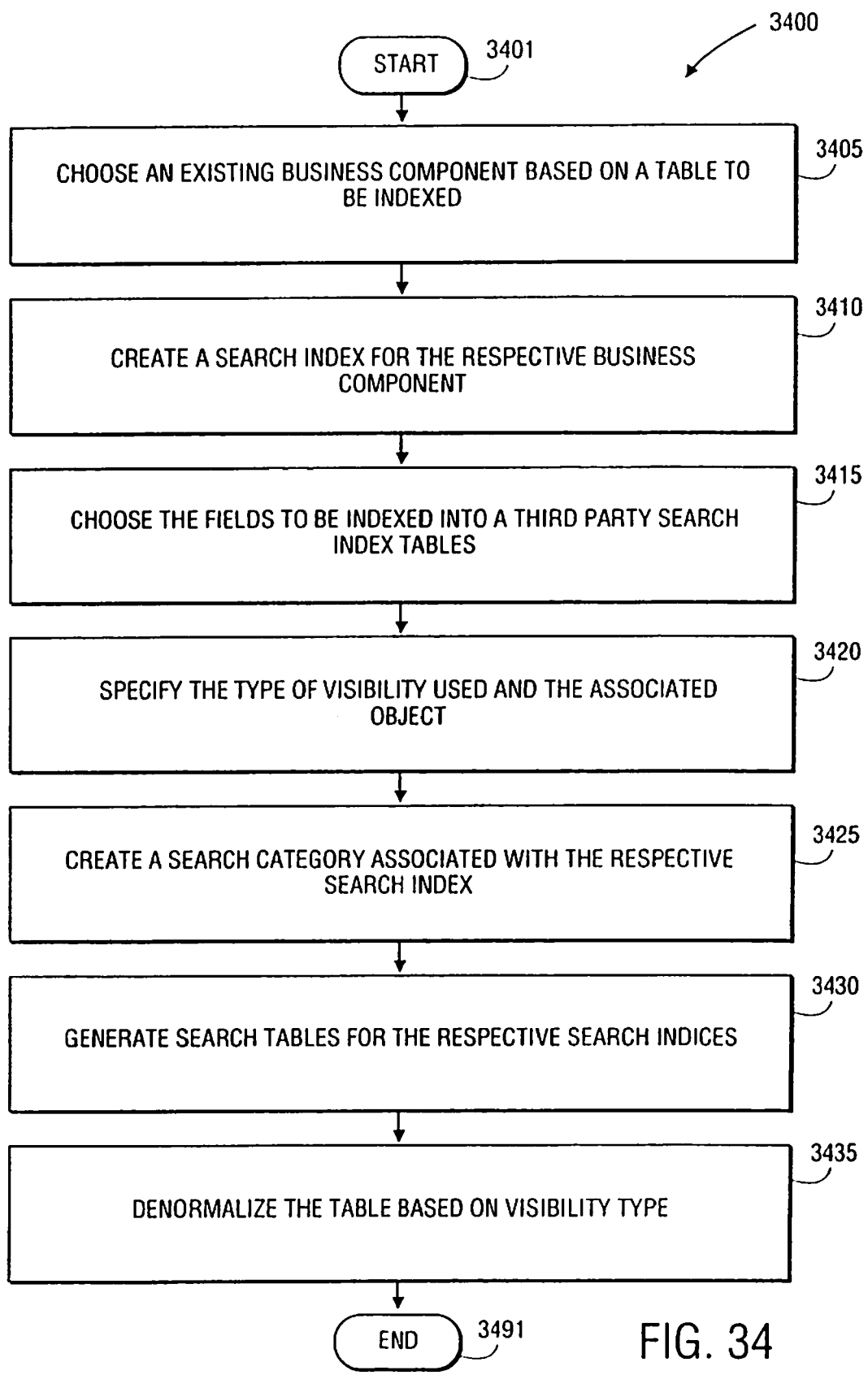
FIG. 34 shows a flow diagram of one embodiment of a method for indexing and de-normalizing records.

FIG. 34 shows a flow diagram of one embodiment of a method for indexing and de-normalizing records.

At block 3405: choose an existing business component based on a table that is to be indexed.

At block 3410: create a corresponding search Index object on the chosen search-specific business component.

At block 3415: choose the fields that are to be indexed into a $3^{rd}$ party search index tables.

At block 3420: the type of visibility used and the associated object (e.g., Literature Organization Link) can be specified as follows:

If the Visibility Field is a Single Value Field (e.g., Organization Id), identify the corresponding column as a Visibility Column, when the Search Index Virtual Bus Comp asks the Fulcrum Search Server to generate the Search Table.

If the Visibility Field is a Multi-Value Field (e.g. Organization, Entitlement), identify the corresponding column as a Visibility Column and insert one record for each value and populate the Filter Column with the value. (i.e. denormalize the multi-value field into separate Search Table records.)

At block 3425: Create a Search Category associated with this Search Index (e.g., Literature search category). This is what appears on the Search Center UI.

At block 3430: Using Search Administration screens, generate Fulcrum Search Tables for each of the Search Indices defined previously.

At block 3435: If the visibility type is set to organization then de-normalize table as follows:

If each record to be indexed is associated with a single organization, then index all records in the base table.

If each record to be indexed is associated with multiple organizations, then de-normalize the base table first by combining with the intersection table, and then index the de-normalized data. For example, if each Literature record is associated with multiple organizations then the base table is "JOIN"ed with the intersection table called Literature-Organization Intersection table as shown in an example below:

| LITERATURE (DB table)==→ | | | FULCRUM_LITERATURE | |
|---|---|---|---|---|
| L1 | O1, O2, O3 | L1 | O1 | |
| L2 | O3, O5 | L1 | O2 | |
| | | L1 | | O3 |
| | | L2 | | O3 |
| | | L2 | | O5 |

Search Execution Time:

In one embodiment, during search execution time, a search is not only performed based on the search specification (e.g., the keyword(s) entered by the user) but also based on the visibility rules associated with the users. For example, when a user enters a search text containing keyword(s) for searching, a search is performed based on the keyword(s) entered by the user but is restricted to only those rows/records that pertain to the current user's organization. In one embodiment, since a user can only belong to one organization at a time, there will not be duplicate search results.

Figure 35:
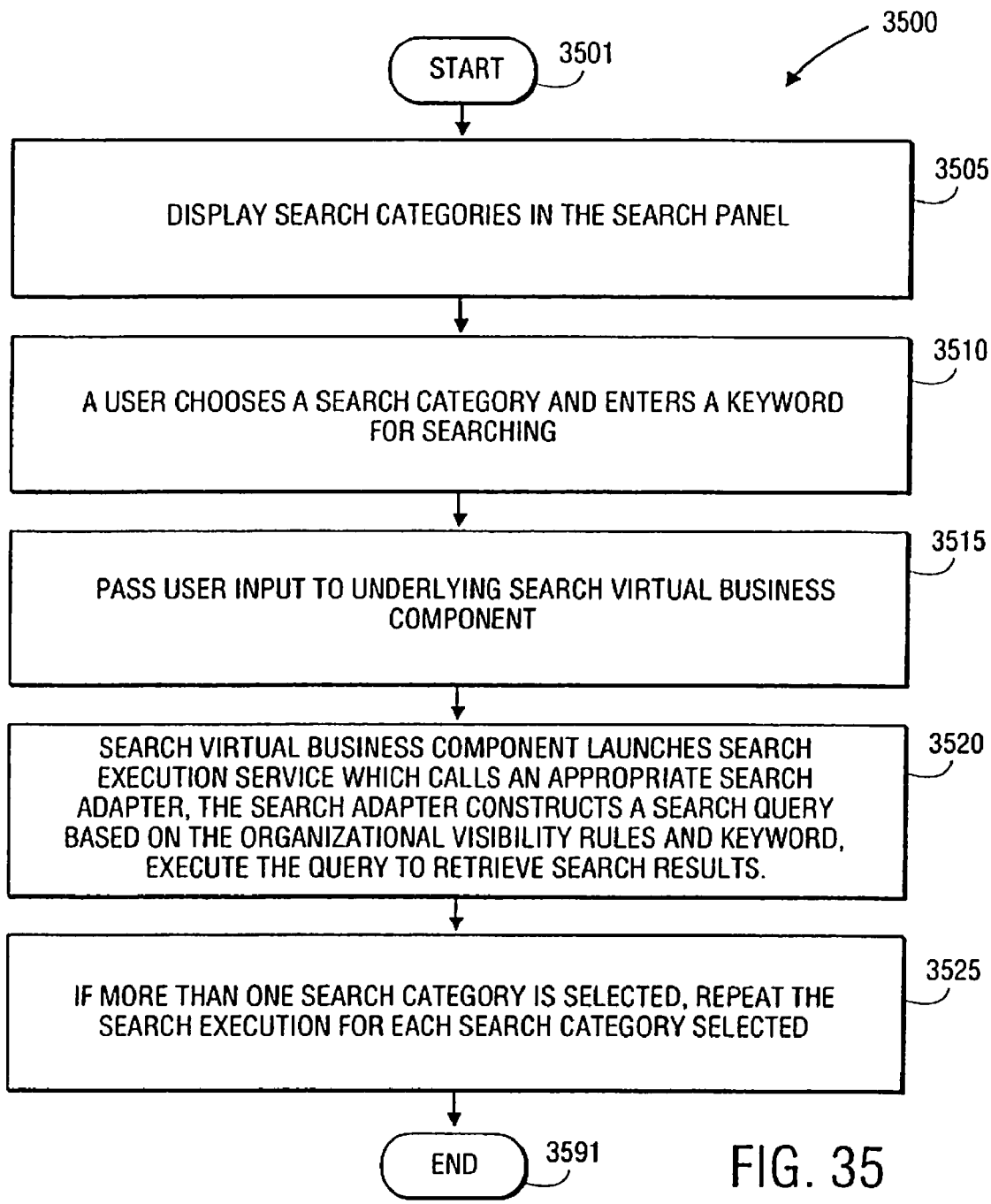
FIG. 35 illustrates a flow diagram of a method according to the teachings of the present invention.

FIG. 35 shows one embodiment of a method according to the teachings of the present invention.

At block 3505: search categories for which indices have been generated are displayed in the search center panel/UI At block 3510: a user chooses a search category and enters a keyword for searching. For example, the user chooses or selects a search category called "Literature" and enters the keyword "sales brochure" for searching.

At block 3515: the search frame receives the input and passes it on to the underlying search virtual business component.

At block 3520: the "Search Execution Virtual Bus Comp" will then launch a service called the "Search Execution Service". In one embodiment, there is a single instance of the service running for each session. The service is used to provide an abstraction between the business component layer and the search adapter layer. In one embodiment, the service then turns around and calls the appropriate search adapter (e.g., the Fulcrum Search Adapter), which then constructs a query (e.g., Fulcrum-SQL query). In one embodiment, this type of query is different from a database query. In one embodiment, the query structure constructed by the search adapter such as the Fulcrum Search Adapter can be defined as follows:

```
SELECT <select-list> FROM <fulcrum table>
WHERE (<organization-column> contains <current user's organization id>) AND
    (<indexed-column> contains <keyword>)
```

In one embodiment, the searching based on keyword and visibility rules (e.g., organizational visibility) includes the following:

prepare the SELECT clause prepare the Fulcrum table list to search on. In one embodiment, multiple tables can be searched using a UNION clause.

retrieve the current user's organization Id. In one embodiment, a user can belong to only one organization. This organization Id is used to restrict the search to only those rows/records where the organization Id matches that of the user.

once the restricted list of all rows/records that the current user can access has been determined, the search is performed to select from those restricted list the records that contain the keyword entered by the user.

after the query executes successfully, the search results are retrieved from the adapter and displayed on the UI search results frame.

At block 3525: If more than one search category is chosen repeat the above process for each category as follows:

UNION the Fulcrum tables, in the FROM clause

For each selected category:
  Apply organization visibility rules (organization filter) first to restrict the search to only those rows/records to which the user has access based on the user's organization Id.
  Prepare one keyword clause.
  Execute the search based on the keyword entered by the user for each selected category.

Category Access Control Visibility on Search Results

For customers with very large volumes of master data such as literature and products, the simple task of searching for an item of master data (or referential data) in a flat list could become a difficult task. In one embodiment, master data are grouped and organized. The introduction of catalog and categories will enable various customers to categorize their data hierarchically and to navigate through the data more easily. In one embodiment, a catalog is the root category and there can be multiple categorizations (also called catalogs). In one embodiment, the same catalog can contain two or more master data objects (e.g., Literature, Solution, etc.). In one embodiment, there can also be several category levels. In one embodiment, the ability to access (e.g., read/update/insert/delete) or restrict access to master data can be done by associating user groups to any category in the hierarchy.

User Groups

In one embodiment, various users of the system are organized into various user groups. This allows people and accounts to be organized into groups that can be assigned to have, or not have, visibility to various categories of master data. In one embodiment, the association of users to various categories of master data is established in various user interfaces called the Catalog Administration screens. For example, when an end user browses through a catalog or invokes a pick list, the user will only see the accessible categories or items in those accessible categories.

Figure 36:
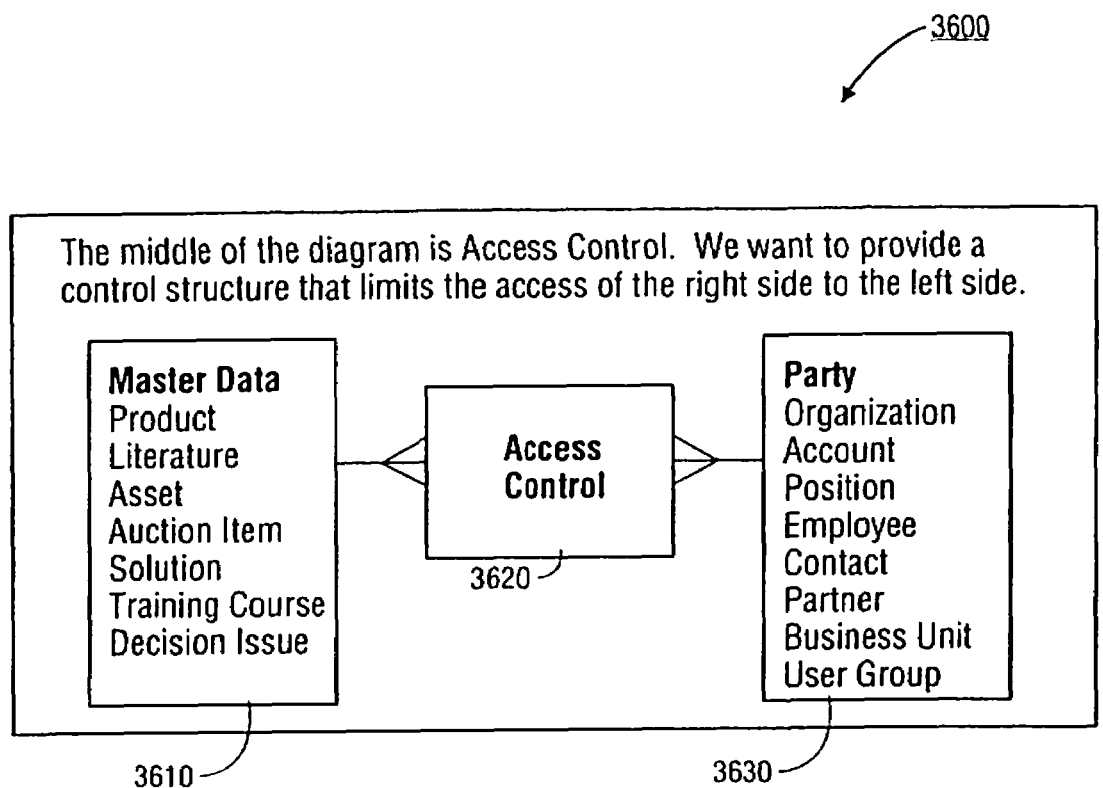
FIG. 36 shows a diagram of one embodiment of a logical data model according to the teachings of the present invention.

FIG. 36 illustrates a diagram of one embodiment of a logical data model according to the teachings of the present invention. At a high level, this is a logical data model that describes the concept of category access control which includes managing users, managing master data, and managing the access of users to master data. As shown in FIG. 36, the logical data model 3600 includes the Master Data block 3610, the Access Control block 3620, and the Party block 3630. According to the teachings of the present invention, a hierarchical mechanism is introduced as described herein for organizing data in a more accessible manner. In one embodiment, the access control block 3620 is used as a control structure to control/limit access of the party block 3630 to the master data block 3610.

Figure 37:
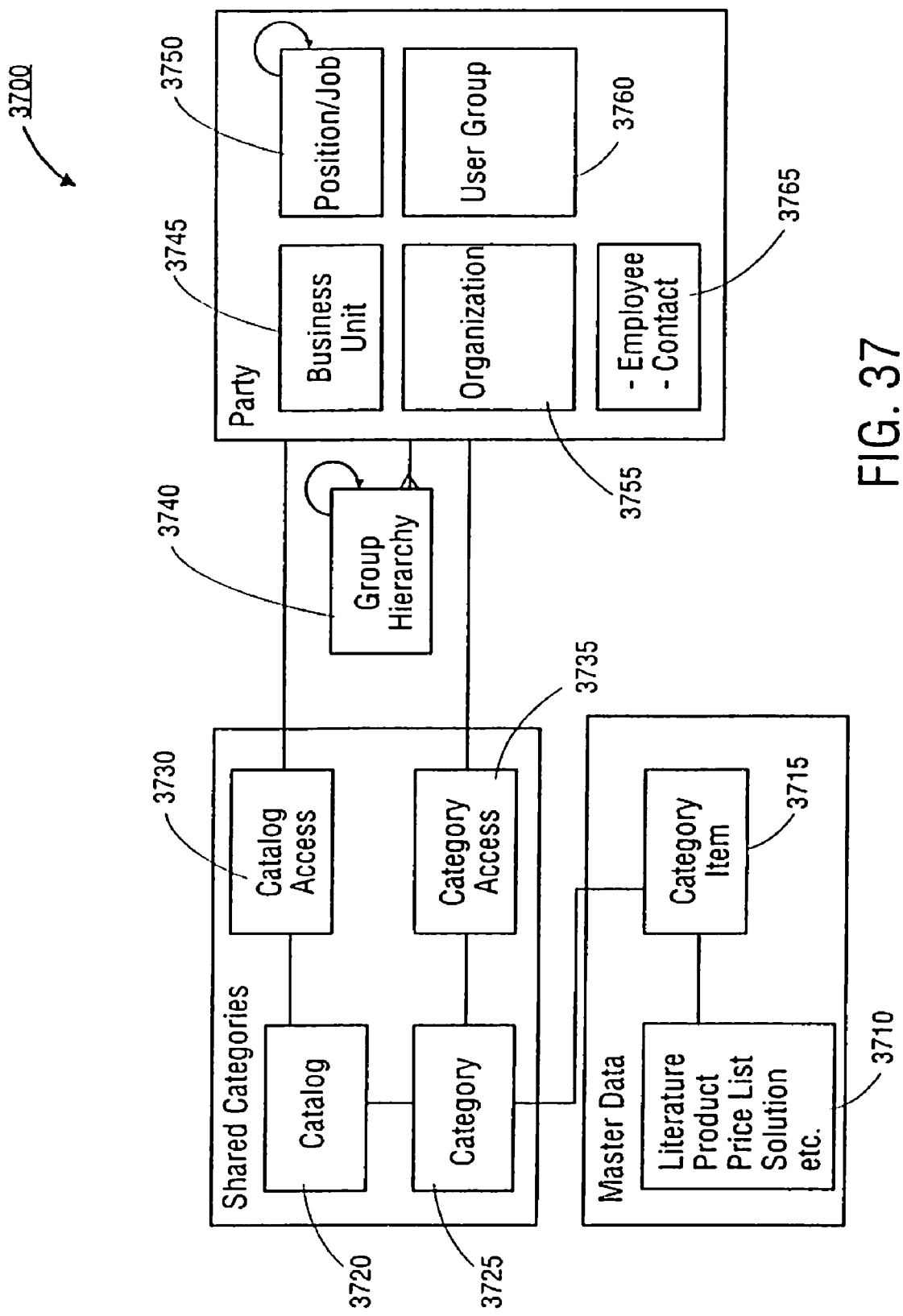
FIG. 37 shows a more detailed block diagram of one embodiment of the logical data model illustrated in FIG. 36.

FIG. 37 shows a more detailed block diagram of one embodiment of the logical data model illustrated in FIG. 36.

In one embodiment, when data (stored in database tables) are being accessed directly through various views in an application, category access control visibility rules are applied as part of the database SQL query. For example, if the business component "Literature" is access control enabled, then a user will only see categories and literature items under categories that he or she has access to. The list of categories that a user has access to is determined at runtime by determining the user groups he belongs to and the access type.

But since full-text searches are performed against the $3^{rd}$ party search indices rather the system or internal database, the access control in this context is implemented slightly differently as described below. As discussed above with respect to the organization visibility rules, records in the database are indexed into search indices of a particular search engine (e.g., Fulcrum search indices), irrespective of whether a particular record can be viewed by a user or not. Access control visibility rules are applied on the search results as described in more details below.

The following example illustrates one embodiment of the access control visibility rules. In this example, assuming that the Literature business component is a business component that needs to be indexed and is access control enabled. This means that all Literature records in the corresponding database table have been assigned to various categories and user groups already have been assigned access to these categories of master data.

The processes described below are similar to the processes described above with respect to the search organizational visibility rules except that "Organization" is now "Content Category". In one embodiment, a difference is that the search results may repeat for the same search. For example, if the same Literature item is associated with two different categories and if the same user has access to these two different categories, then the search results for this Literature item will appear twice with the difference being the categories that they belong to.

Figure 38:
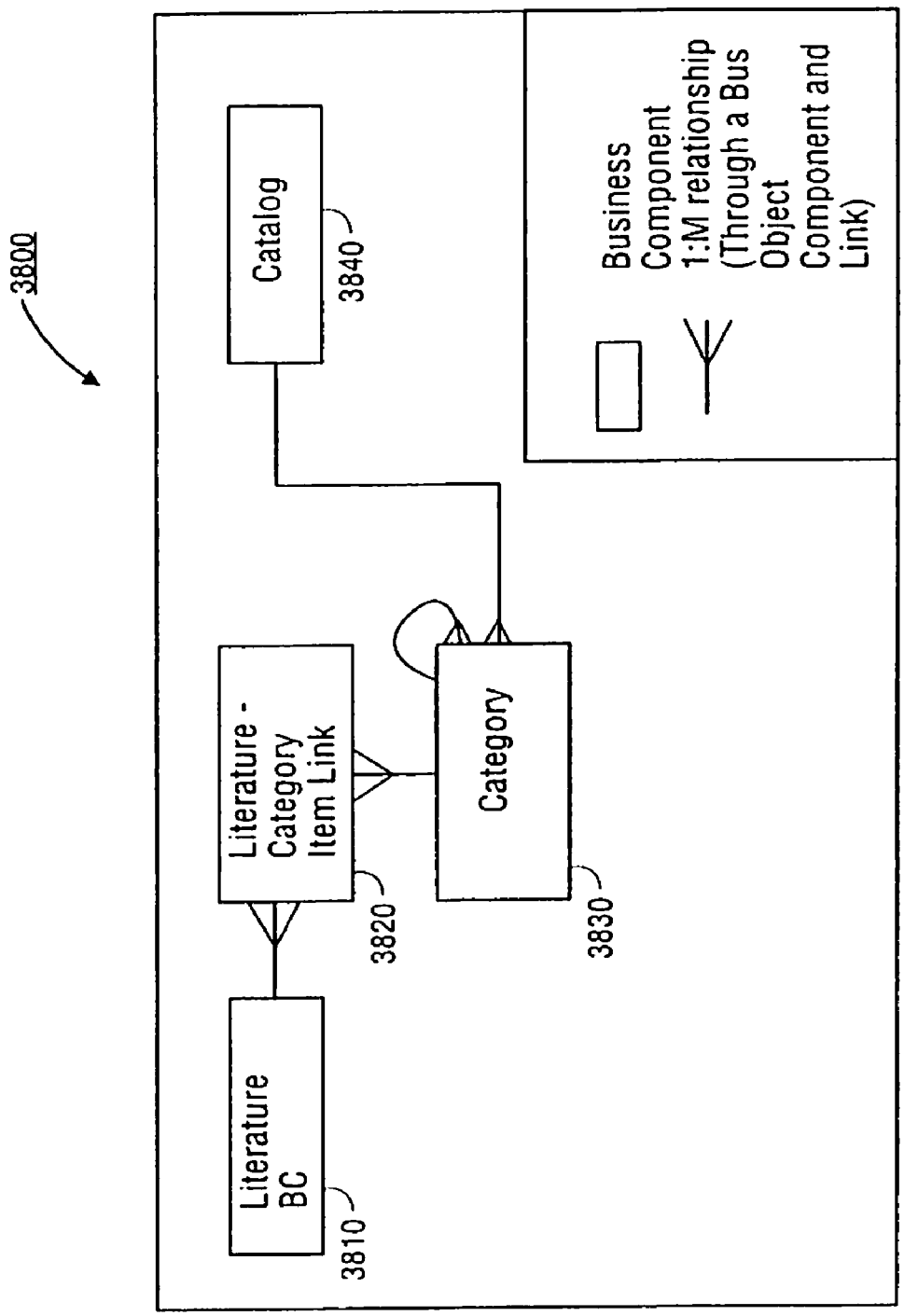
FIG. 38 shows a block diagram of one embodiment of a logical data model illustrating the relationship between various business components.

FIG. 38 shows a block diagram of one embodiment of a logical data model 3800 illustrating the relationship between various business components (e.g., the Literature business component and the Category business component, etc.).

The discussion below illustrates, in one embodiment, how category access control visibility on search can be implemented. It should be understood and appreciated by one skilled in the art that the specific examples discussed herein are for illustration and explanation purposes and should not be construed to limit the scope of the present invention. In one embodiment, category access control visibility can be implemented at various levels, for example during search administration and configuration time when search indices are created and during search execution time when the corresponding access control visibility rules are applied or enforced.

Search Configuration & Administration Time:

In one embodiment, during search configuration time the search index is configured by the admin based on the following specifications:
- the business component (which is based on a database table)
- the fields in the respective business component to be indexed
- the type of visibility to be applied on this index (in this case group/access control visibility)

In one embodiment, the search index configuration can be performed using a set of search configuration and administration tools described herein.

After configuring the search index, the admin can use the Search Administration screens to create search indices based on the configuration as described above. In one embodiment, if the table being indexed is access control enabled then the records can be de-normalized by including all categories that are associated to each record. In one embodiment, the de-normalization of records can be done by using an intersection table (e.g., the Literature-Category intersection table as shown in FIG. 38 above).

In the example of Literature business component, while indexing the required fields pertaining to the Literature table, for example Name, Description, etc., indexing is also done for all the Category IDs that are associated to each literature record. Thus, de-normalization can be done by using the Literature-Category Intersection table, as shown in FIG. 38.

Figure 39:
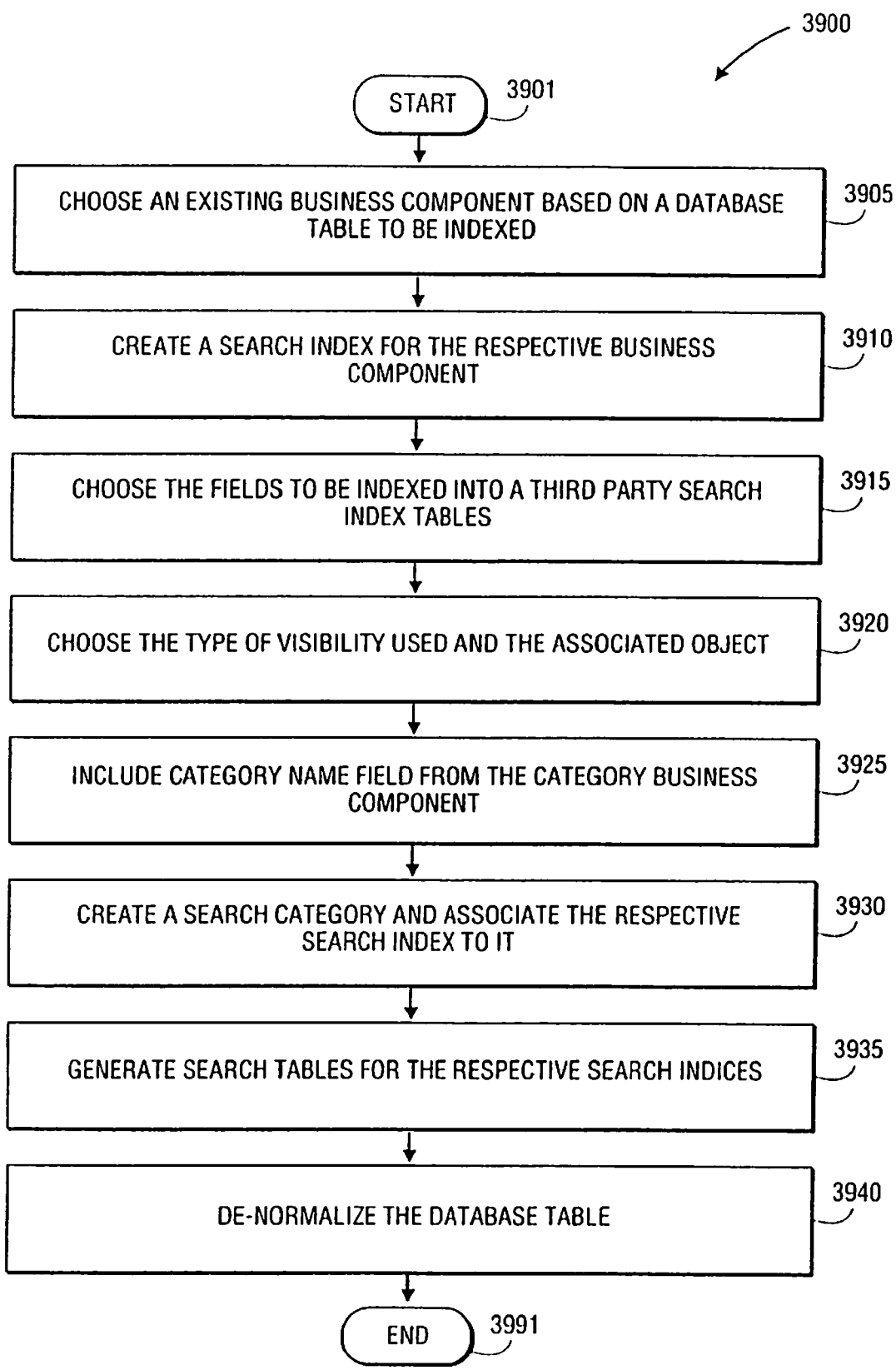
FIG. 39 shows a flow diagram of one embodiment of a method for indexing and de-normalizing records according to the teachings of the present invention.

FIG. 39 shows a flow diagram of one embodiment of a method according to the teachings of the present invention for indexing and de-normalizing records.

At block 3905: choose an existing business component based on a table to be indexed.

At block 3910: create a corresponding search index object on the chosen search-specific business component.

At block 3915: choose the fields to be indexed into a $3^{rd}$ party search index tables.

At block 3920: choose the type of visibility used and the associated object (e.g., Literature Category Link).

At block 3925: include the Category Name field from the Category business component. This can be used for classifying search results as discussed below.

At block 3930: create a search category and associate the search index to it. This is what appears on the Search Center UI.

At block 3935: using Search Administration screens, generate Fulcrum Search Tables for each of Search Indices defined previously.

At block 3940: if the visibility type is set to access control then de-normalize table as follows:

If each record to be indexed is associated to multiple categories, then de-normalize the base table first by combining with the intersection table, and then index the de-normalized data. For example, if each Literature record is associated to multiple categories then the base table is "JOIN"ed with the intersection table Literature-Category Intersection table as shown below:

| LITERATURE (DB Table)==→ | | | FULCRUM_LITERATURE | |
| --- | --- | --- | --- | --- |
| L1 | C1, C2, C3 | L1 | C1 | |
| L2 | C3, C5 | L1 | C2 | |
| | | L1 | | C3 |
| | | L2 | | C3 |
| | | L2 | | C5 |

Search Execution Time:

In one embodiment, at search time, a search is not only performed based on the search specification or criteria (e.g., the keyword(s) entered by a user) but also based on the access control visibility rules associated with that particular user. For example, when a user enters a search text containing keyword(s) for searching, a search is performed based on the keyword(s) entered by the user but is restricted to only those rows/records that are accessible to the user based on the access control visibility rules. In one embodiment, since a user can have access to multiple categories, search results can have duplicate entries (e.g., the same entry can belong to two different categories).

Figure 40:
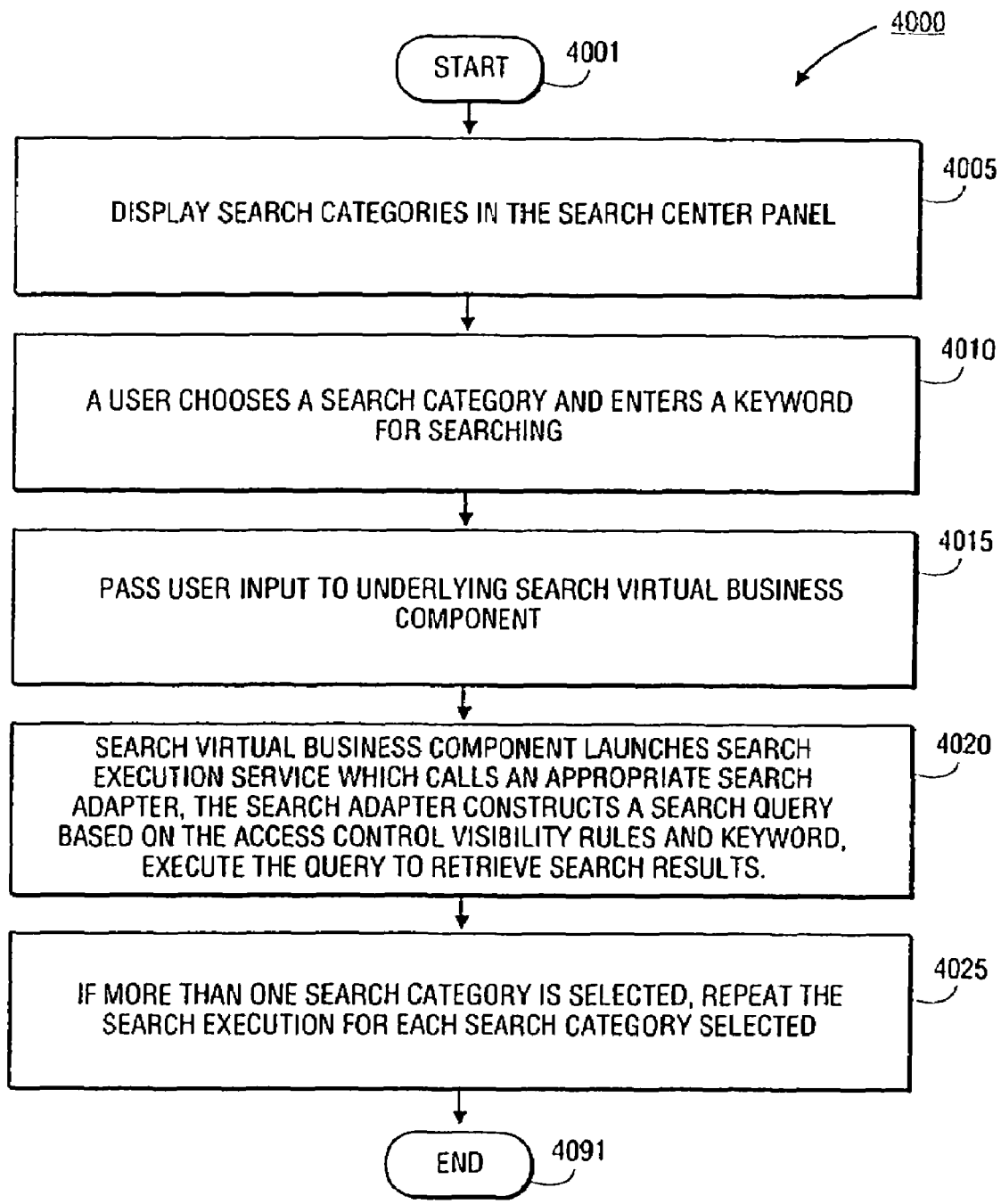
FIG. 40 shows a flow diagram of one embodiment of a process according to the teachings of the present invention.

FIG. 40 shows a flow diagram of one embodiment of a process according to the teachings of the present invention.

At block 4005: the search center displays search categories for which indices have been generated as described above.

At block 4010: a user chooses a search category and enters a keyword for searching. For example, the user chooses or selects a search category called "Literature" and enters the keyword "sales brochure".

At block 4015: the search frame receives the input from the user and passes it on to the underlying search virtual business component.

At block 4020: the "Search Execution Virtual Bus Comp" will then launch a service called the "Search Execution Service". In one embodiment, there is a single instance of the service running for each session. The service is used to provide an abstraction between the business component layer and the search adapter layer. In one embodiment, the service then turns around and calls the appropriate search adapter (e.g., the Fulcrum Search Adapter), which then constructs a query (e.g., Fulcrum-SQL query). In one embodiment, this type of query is different from a database query. In one embodiment, the query structure constructed by the search adapter such as the Fulcrum Search Adapter can be defined as follows:

```
SELECT <select-list> FROM <fulcrum table>
WHERE (<category-column> contains <all valid access control
categories>) AND
       (<indexed-column> contains <keyword>)
```

In one embodiment, the process of searching based on keyword and access control visibility rules includes the following:

Prepare the SELECT clause

Prepare the Fulcrum table list to search on. In one embodiment, multiple tables can be searched by using a UNION clause.

Retrieve all the categories that the user has access to. In one embodiment, this is done by determining all the user groups that the user belongs to and determine the categories that these user groups are associated to. This query returns all the valid access control categories that the current user has access to. Using these category Ids, an OR clause is constructed to restrict the search to only those rows/records whose Category Id matches this list.

Once the restricted list of all rows/records that the current user can access has been determined, the search is performed for the rows/records which contain the keyword entered by the user.

After the query executes successfully, retrieve search results from the adapter and display the search results on the UI search results frame.

At block 4025: if more than one search category is chosen repeat the above process for each category as follows:

UNION the Fulcrum tables in the FROM clause

For each selected category

Apply category visibility rules (category filter) first to restrict the search to only those rows/records to which the user has access, based on the corresponding user groups and the categories associated with these user groups.

Prepare one keyword clause.

Execute the search in Fulcrum based on the keyword entered by the user for each selected category Invisible/Implicit Filtered Searches In one embodiment, "invisible" or "implicit" search filters are built so that search results will be automatically filtered out based on the invisible/implicit query.

Invisible Search Filters:

In one embodiment, for each search index (and more specifically a search table) object, users can define filter fields. These filter fields are used specifically for the purpose of filtering search results. In the case of using a search engine such as Fulcrum, these business component fields map directly to a Fulcrum column (e.g., in the Fulcrum search table) and are indexed as part of the regular indexing process as described herein. In one embodiment, the indexing is done directly at the database level and not at the business component level.

The concept of invisible/implicit filtering is introduced to solve a problem explained in the following example. In one embodiment of the system configuration, different types of documents may be stored in the same table. For example, Solutions and Resolution documents may be saved in the same table called S_RESITEM. Currently, records of different types of documents are distinguished using a flag field or flag column (e.g., a flag called SOLUTION_ITEM_FLG). For example, a "Y" value in this flag column indicates a solution record. In order to filter search results that pertain only to solutions, at runtime, some filter search specifications need to be used. In one embodiment, filter search specifications are similar to business component search specifications and work similarly. The process of creating and using filter fields for filtering of search results are discussed in more details below.

Search Configuration Time

Figure 41:
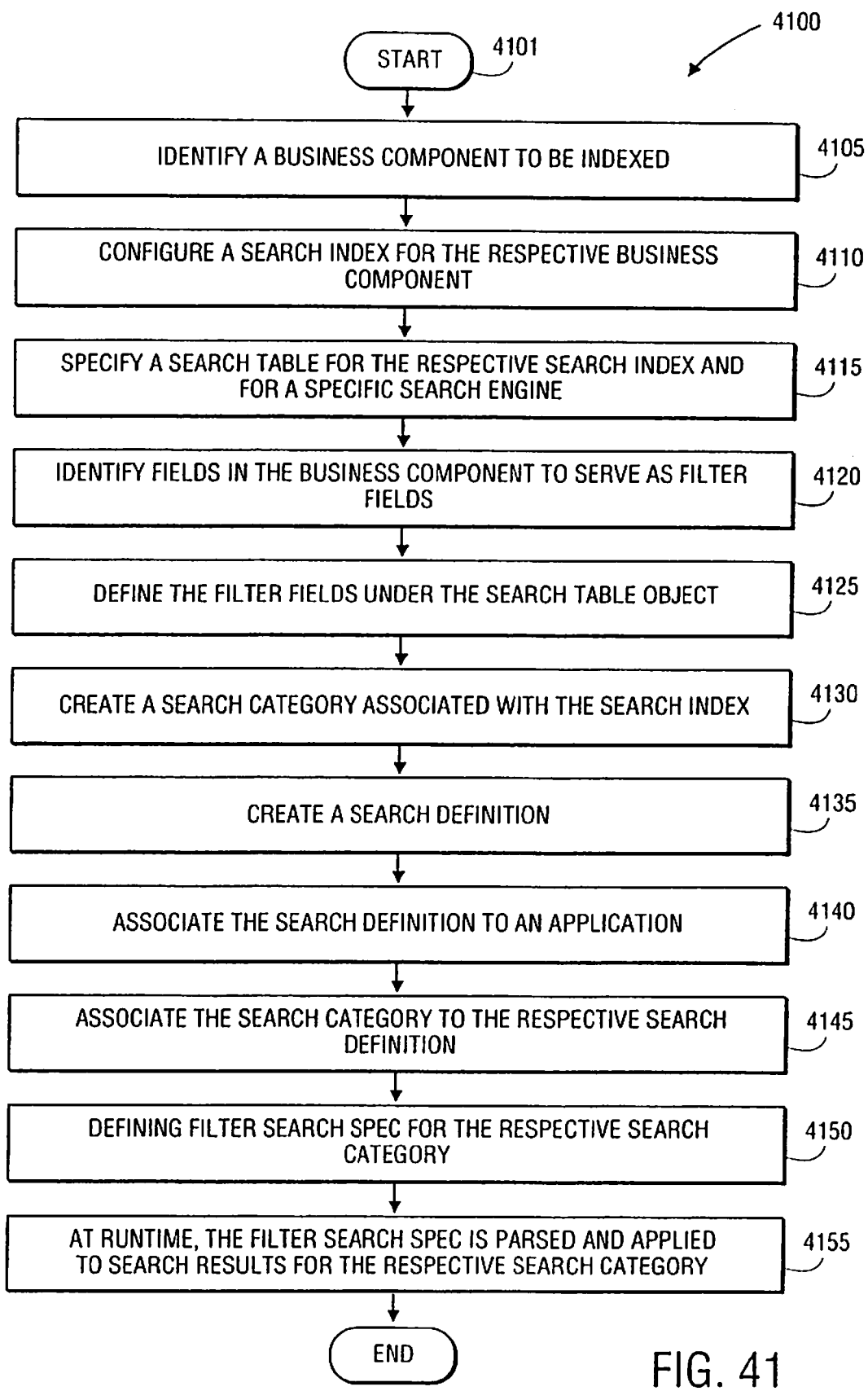
FIG. 41 illustrates a flow diagram of one embodiment of a method for creating filter search specifications in accordance with the teachings of the present invention.

FIG. 41 illustrates a flow diagram of one embodiment of a method according to the teachings of the present invention for creating filter search specifications.

At block 4105: identify the business component to be indexed (e.g., Solution business component)

At block 4110: configure a search index for the above business component (e.g., Solution business component)

At block 4115: specify a search table for the search index and for a particular search engine (e.g., FUL_SOLN for Fulcrum search engine)

At block 4120: identify the fields in the business component that will serve as filter fields. In one embodiment, the field types that are supported are Varchars or Char fields.

At block 4125: define the filter fields under the Search Table object. Specify the column name in the Fulcrum search table for instance, along with other attributes, such as Data Type, Index Mode, etc.

At block 4130: create a search category associated to this Search Index. For example, create a search called All Solutions At block 4135: create a search definition under the search engine (e.g., search engine Fulcrum). For example, create a search definition called "Call Center Search Definition". As described above, a search definition is a group of search categories At block 4140: a search definition is associated to an application. When an application is launched, categories that belong to the search definition are displayed in the UI of the Search Center.

At block 4145: associate the search category "All Solutions" to this search definition At block 4150: define a filter search specification for this category to filter only one type of records (e.g., solution records). For example, the filter specification in this case may be specified as [Solution Item]='Y'. In one embodiment, supported filtered search specification syntax are described below.

At block 4155: at runtime or execution time the filter search specification is parsed and applied to the search results pertaining to the corresponding category. Supported filtered search specification syntax are described below.

Search Execution Time:

In one embodiment, at search execution time, a search is not only performed based on keyword entered by a user but also the filter search specification. For example, when the user enters a search text containing the keyword(s), a search is performed based on the keyword entered by the user but is restricted to only those rows/records that satisfy the filter search specification clause. In one embodiment, the filter search specification can co-exist with the visibility search specification described above (e.g., organizational visibility search specification or category access control visibility search specification)

Figure 42:
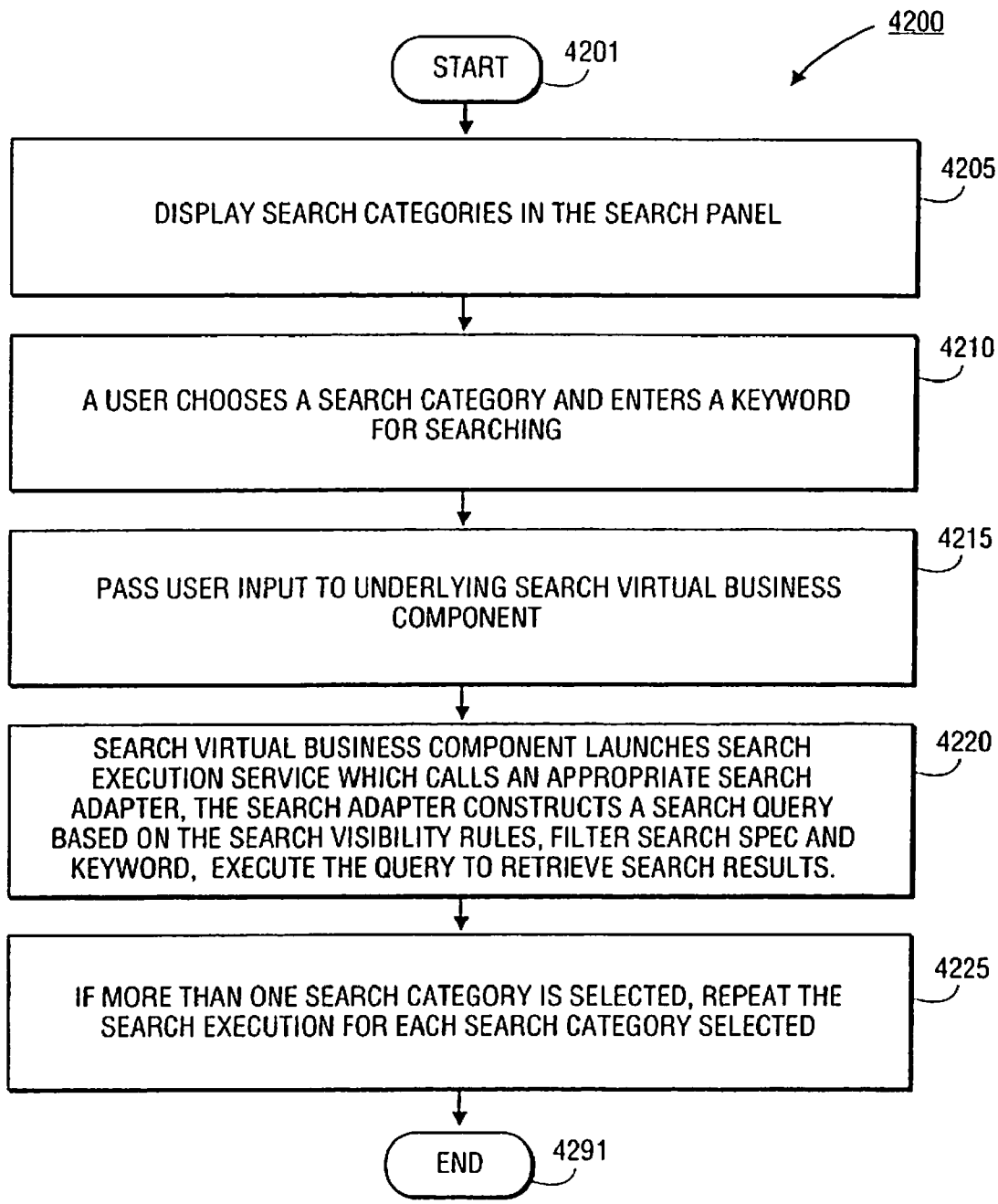
FIG. 42 shows a flow diagram of one embodiment of a method according to the teachings of the present invention.

FIG. 42 shows a flow diagram of one embodiment of a method according to the teachings of the present invention. As illustrated in this example, search is performed based on keyword and filter search specification.

At block 4205: search center displays search categories for which indices have been generated as described above At block 4210: a user chooses a search category and enters a search keyword. For example, the user chooses a search category called "Solution" and enters the keyword "Sales brochure".

At block 4215: the search frame receives the input and passes it on to the underlying search virtual business component.

At block 4220: the "Search Execution Virtual Bus Comp" will then launch a service called "Search Execution Service". In one embodiment, there is a single instance of the service running for each session. The service is used to provide an abstraction between the business component layer and the search adapter layer. In one embodiment, the service then turns around and calls the appropriate search adapter (e.g., the Fulcrum Search Adapter), which then constructs a query (e.g., Fulcrum-SQL query). In one embodiment, this type of query is different from a database query. In one embodiment, the query structure constructed by the search adapter such as the Fulcrum Search Adapter can be defined as follows:

```
SELECT <select-list> FROM <fulcrum table>
WHERE ((<visibility constraint>) AND (<filter column> = <filter
search spec>))
AND
    (<indexed-column> contains <keyword>)
```

In one embodiment, the searching based on keyword and invisible/implicit search filters includes the following:

Prepare the SELECT clause

Prepare the Fulcrum table list to search on. In one embodiment, multiple tables can be searched by using a UNION clause.

Prepare the visibility clause based on multi-org visibility rules and/or access control visibility rules as described above.

Parse the search specification to conform to Fulcrum SQL syntax.

Append the filter search specification along with the visibility constraint (based on multi-org visibility and/or access control visibility)

Prepare the actual keyword constraint

After the query executes successfully, retrieve search results from the search adapter and display the search results on the UI search results frame.

At block 4225: If more than one search category is chosen repeat the above process for each category as follows:

UNION the Fulcrum tables, in the FROM clause

For each selected category:
  Apply visibility clause
  Apply filter field clause
  Prepare one keyword clause.
  Execute the search in the search adapter (e.g., Fulcrum) based on visibility rules, search filer specification, and keyword.

Supported Filter Search Spec Syntax

In one embodiment, the filter search specification syntax that are supported are shown below:

```
[filter expression] {<Boolean operator> [filter expression] ...}
    [filter expression] :: [Filter Field Name] [operator] [Value]
        [filter field name] : name of the filter field belonging to
        the search category
        [operator]: =, <>, LIKE, NOT LIKE
            LIKE and NOT LIKE support the wildcards * and &
        [value]: the value of the field. For e.g., 'Y'.
            or it could be a function "LookupValue (<LOV Name>,
            <Independent LOV code>)"
<Boolean Operator> :: OR,AND
Examples:
([Type] = LookupValue ("SALES_TOOL_TYPE", "Sales Tool" ) OR
[Type] = LookupValue ("SALES_TOOL_TYPE", "Sales Tool
Brochure") ) AND
[Flag] = 'Y'
```

Search Results Attachment/Preview

Attachment

In one embodiment, a record in the search results list applet or find results list applet can be attached or associated to an active parent object in the content area. In one embodiment, in order to attach a record in the search results list applet or find results list applet to an active parent object in the content Area, the relationship between them is required to be M-to-M relationship. In one embodiment, this relationship is implemented by creating a link between the two business components with an intersection table. In one embodiment, if a search category or find object is one of the business components of a business object and there is an M-to-M link between them, the search result record or row can be attached to the respective object.

In one embodiment, the attachment (also called association) is created in the business object layer in the multiple-layered system architecture. In one embodiment, to provide the user with the ability to go to a view directly to verify the association or attachment, a feature called "Pick View" is added to a corresponding search category or find object. The pick view defines the view that user can go to after association happens, as well as the candidate association. Accordingly, new Pick Views can be added to search category or find object using search tools that are described above.

As described above, in search tools, pick view can be accessed under Search Category and Find Object. These pick views' business objects are able to accept the association as described above. In one embodiment, the applet name defined in a pick view is the applet where users add a search result record.

In one embodiment, the association of external documents to a pick view is supported. Generally, this pick view is called "XXX Attachment." The restriction of this association is different from the association of database record. In one embodiment, this applet should be based on CSSSWEFrameListFile and its business component should be based on CSSBCFile. This applet may contain optional fields, such as description. In one embodiment, these fields will not be filled when the attachment is created.

As described herein, each search category has an attribute called search index. In one embodiment, an attribute called "DB Table" of search index is used to determine if search result row/record is an external document or database record. For example, if this attribute is set to a particular value such as false, then the corresponding search category is assumed to be an external document.

Preview

In one embodiment, preview of a result record is included as a feature of the search system described herein. In one embodiment, in order to preview a result record, a drilldown view is required. In one embodiment, the drilldown view, drilldown business component and destination field are defined using search tools in search category or find object. In one embodiment, the drilldown view will show up in a popup browser. As mentioned above, in one embodiment, preview of external documents is also supported.

User Procedures

Figure 43:
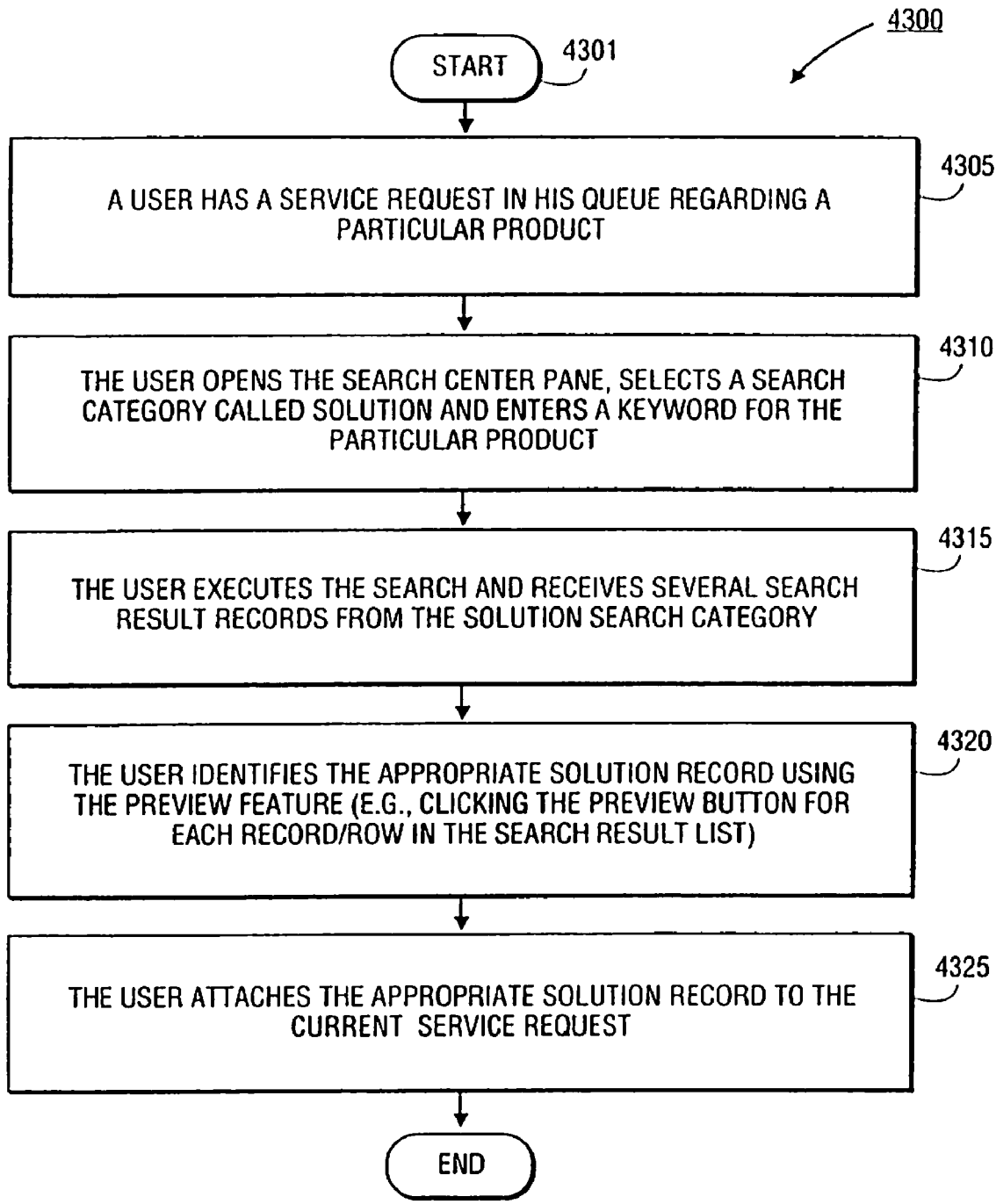
FIG. 43 shows a flow diagram of one embodiment of a method according to the teachings of the present invention.

The following illustrates an example of how customer support personnel uses the preview and attachment features included in the search system described herein. In this example, a customer support personnel in "XYZ" company runs the system call center web client and goes to a screen called the service screen. Assuming that he has a service request in his queue regarding networks card product. He reads the description of the problem. He notices that it might be a known problem and there is already a solution for it. He then opens the search center pane, selects solution, and types in keyword "Networks Card". He then executes the search and gets a lot of solution items. He identifies an appropriate solution for the current problem by clicking the Preview button for each row/record in the result list. After he identifies the appropriate solution, he then clicks the Attach button. This operation attaches the result row/record to the current service request, and then brings him to the correct view to review the association. He then writes to his customer (e.g., via an email) with the solution he found and updates the status of the service request. FIG. 43 shows a flow diagram of one embodiment of a process described in the above example.

Administrator Procedures

As described above, new pick views for an existing search category or a new search category can be configured using search tools as described above. In one embodiment, the following pick views are implemented in the search system described herein:

Solution
　Service Request Solution View. Applet: SR Solution List Applet
　Resolution Documents Administration View. Applet: Solution List Applet w/Publish Internal For Resolution Document Product
　Activity Product View. Applet: Product List Id Drilldown Applet Document
　Admin Sales Tools List. Applet: Literature List Administration Applet
　Agreement Attachments View. Applet: Agreement New Attachment List Applet
　Asset Mgmt—Asset Attachment. Applet: Asset Mgmt—Asset Attachment List Applet
　Defects Detail w/attachments. Applet: PD Attachment List Applet
　Resolution Documents Administration View. Applet: SR Resolution Item List Frame In one embodiment, the following Find Object Pick Views are also implemented in the search system described herein:

Account
　Opportunity Detail—Indirect Accounts View. Applet: Indirect Accounts List Applet Corporate Contact
　Account Detail—Contacts View. Applet: Account Contact List Applet
　Activity Contacts View. Applet: Contact (All) List Applet
　Channel Partner Detail—Contacts View. Applet: Partner Contact List Applet
　Opportunity Detail—Contacts View. Applet: Oppty Contact List Applet Opportunity
　Contact Detail—Opportunities View. Applet: Opportunity List Applet—Basic Product Defect
　Asset Mgmt—Asset Related Defects List View. Applet: Product Defect List Applet—Other Service Request
　Related Service Requests. Applet: Service Request List Applet In one embodiment, to configure a new pick view for a search category or find object, the requirements are as follows:

The view contains the applet in View Web Template Item,
　The applet is based on the same business component as the search category,
　The business object that the pick view belongs to contains the search category or find object as one of its sub business components. A link is required between the primary business component and the search category or find object. The link is required to be an M-to-M relationship (e.g., an intersection table exists in the link).

In one embodiment, the data model specification is as follows:

| S_SRCH_PICKVIEW |
| --- |
| 1. "VIEW_NAME" as VARCHAR2 (75) |
| 2. "APPLET_NAME" as VARCHAR2 (75) |

In one embodiment, this table will be compiled into a repository file and is configurable using search tools as described above. The parent object for Search Pick View is search category. Accordingly, a Search Category can have multiple Pick Views.

In one embodiment, VIEW_NAME maps to attribute View Name. It is used to compare the view in the Content Area in Web client. In one embodiment, APPLET_NAME maps to attribute Applet Name. It is used to specify the applet to which a search result record can be added.

Figure 44:
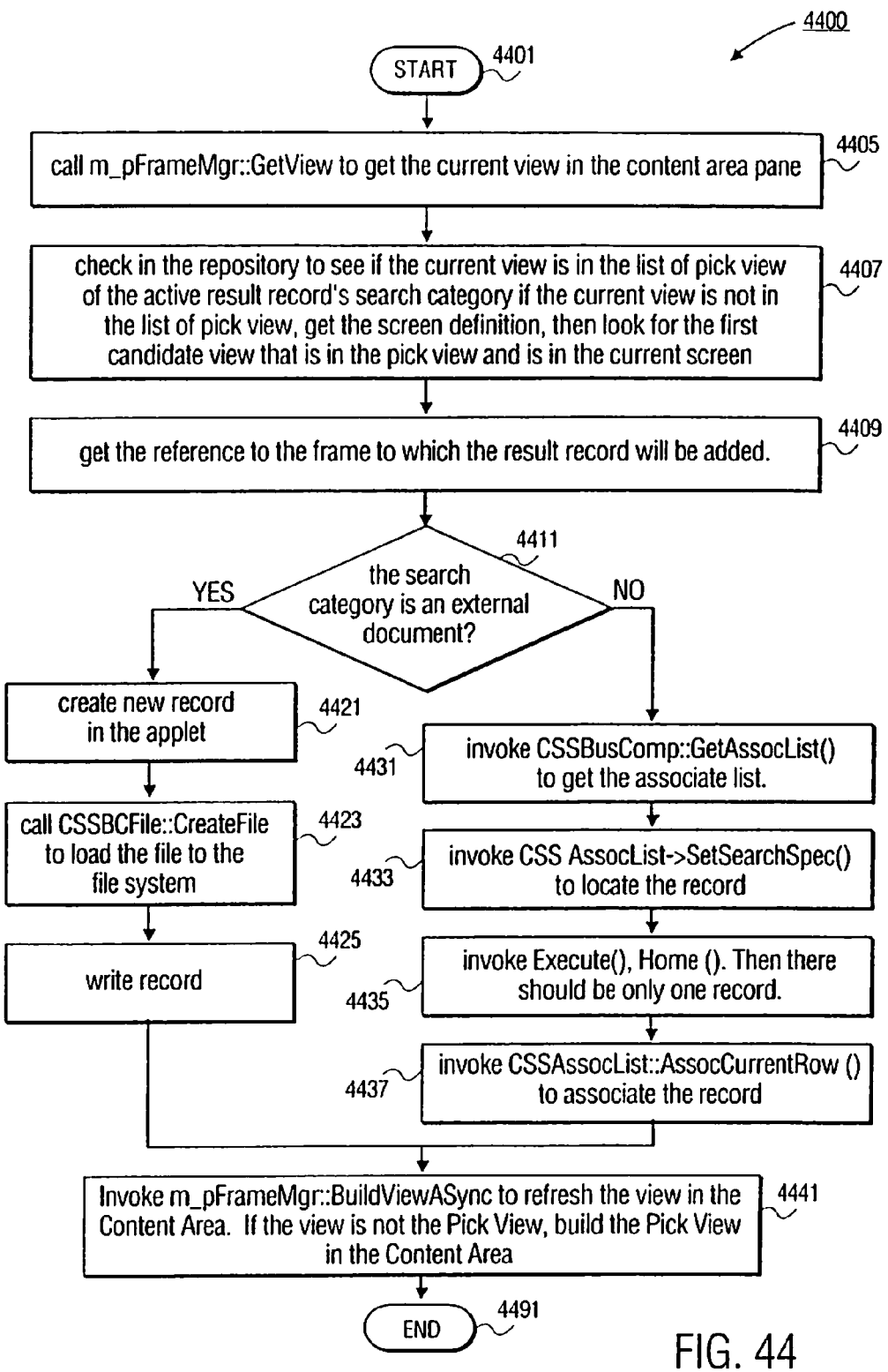
FIG. 44 shows a flow diagram of one embodiment of an attachment/association process according to the teachings of the present invention.

FIG. 44 shows a flow diagram of one embodiment of an attachment/association process according to the teachings of the present invention.

At block 4405: call a method named m_pFrameMgr::GetView to get the current view in the content area pane.

At block 4407: check in the repository to see if the current view is in the list of pick view of the active result record's search category. If the current view is not in the list of pick view, get the screen definition, then look for the first candidate view that is in the pick view and is in the current screen.

At block 4409: get the reference to the frame to which the result record will be added.

At decision block 4411: check if the search category is an external document. If it is an external document, proceed to block 4421, otherwise proceed to block 4431

If the search category is an external document:

```
        At block 4421: create new record in the applet.
        At block 4423: call a method named CSSBCFile::CreateFile to
        load the file to the file system.
     At block 4425: write record.
else
        At block 4431: invoke a method named
        CSSBusComp::GetAssocList ( ) to get the associate list.
        At block 4433: invoke a method named
        CSSAssocList->SetSearchSpec ( ) to locate the record
        At block 4435: invoke Execute( ), Home ( ). Then there should
        be only one record.
        At block 4437: invoke a method named
        CSSAssocList::AssocCurrentRow ( ) to associate the record
end
```

At block 4441: invoke a method named m_pFrameMgr::BuildViewAsync to refresh the view in the Content Area. If the view is not the Pick View, build the Pick View in the Content Area.

Figure 45:
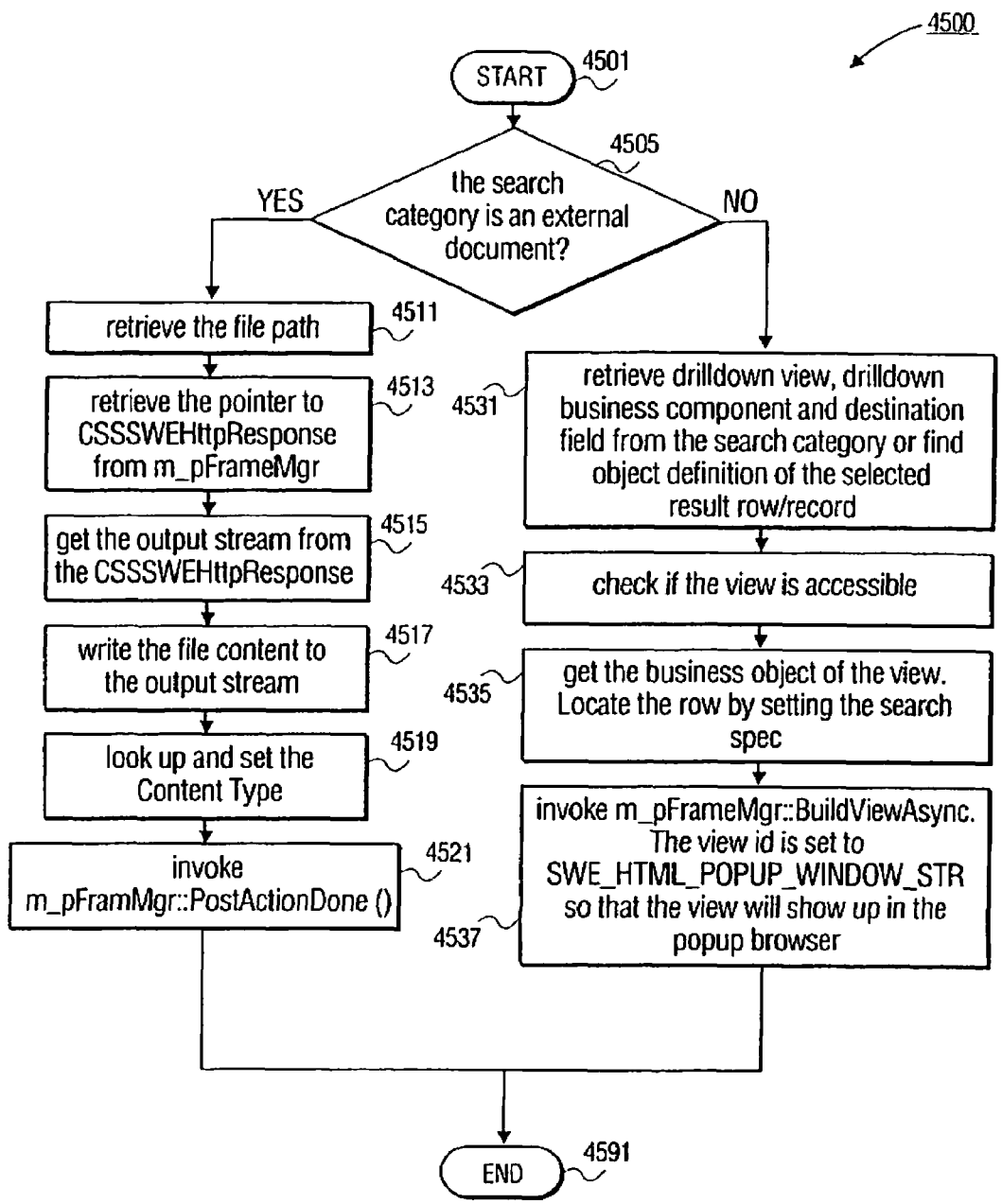
FIG. 45 shows a flow diagram of one embodiment of a preview process according to the teachings of the present invention.

FIG. 45 shows a flow diagram of one embodiment of a preview process according to the teachings of the present invention.

At block 4505: check if the search category is an external document. If the search category is an external document, proceed to block 4511. Otherwise proceed to block 4531.

If the search category is an external document
  At block 4511: retrieve the file path

```
        At block 4513: retrieve the pointer to CSSSWEHttpResponse from
        m_pFrameMgr
        At block 4515: get the output stream from the
        CSSSWEHttpResponse
        At block 4517: write the file content to the output stream
        At block 4519: look up and set the Content Type
        At block 4521: invoke a method named
        m_pFrameMgr::PostActionDone ( )
else
        At block 4531: retrieve drilldown view, drilldown business
        component and destination field from the search category
        or find object definition of the selected result row/record.
        At block 4533: check if the view is accessible
        At block 4535: get the business object of the view. Locate
        the row by setting the search spec.
        At block 4537: invoke a method named
        m_pFrameMgr::BuildViewAsync. The view id is set to
        SWE_HTML_POPUP_WINDOW_STR so that the view will
        show up in the popup browser
end
```

V. Remote Client Search

Overview

In one embodiment, the system described herein also includes a feature or mechanism to enable downloads of search index files to a remote client. The system currently provides the capability for creating search indices through a search administration screen for both mobile as well as connected clients.

Currently mobile users need to use the search administration screen to create indices locally on their machines. Since creating search indices is a time-consuming task, the present invention provides a new mechanism so that the mobile users can create search indices more efficiently. In one embodiment, search indices will be created on the server and saved as file attachments in the database. During synchronization time these files can be downloaded to the mobile client's machine.

In one embodiment, at least a new table is required to support the new functionality. The schema for the new table is described in the Data Model section below.

In one embodiment, before actually executing a search, it is necessary to make sure that the indices are copied to the correct search directories on the local machine. In one embodiment, a view called the Search Index Request View is used to get the search indices to the correct directory.

Figure 46:
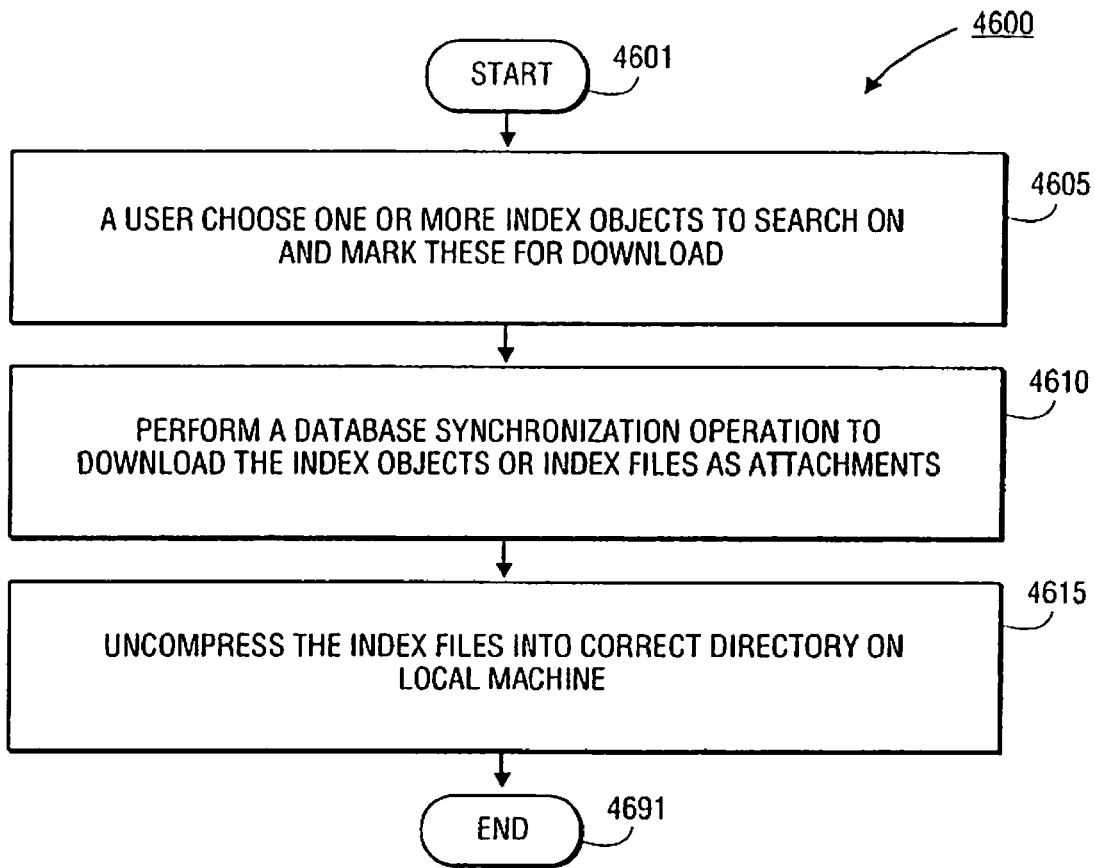
FIG. 46 illustrates a high level flow diagram of one embodiment of a process for performing remote search indexing.

FIG. 46 illustrates a high level flow diagram of one embodiment of a process for performing remote search indexing. In one embodiment, the user is required to choose which index objects he wish to search on and mark them for download. Next, a database sync operation is performed to download the index files as attachments. The user then clicks the uncompress button on the Search Index Request View to uncompress the index files into the correct directory.

Figure 47:
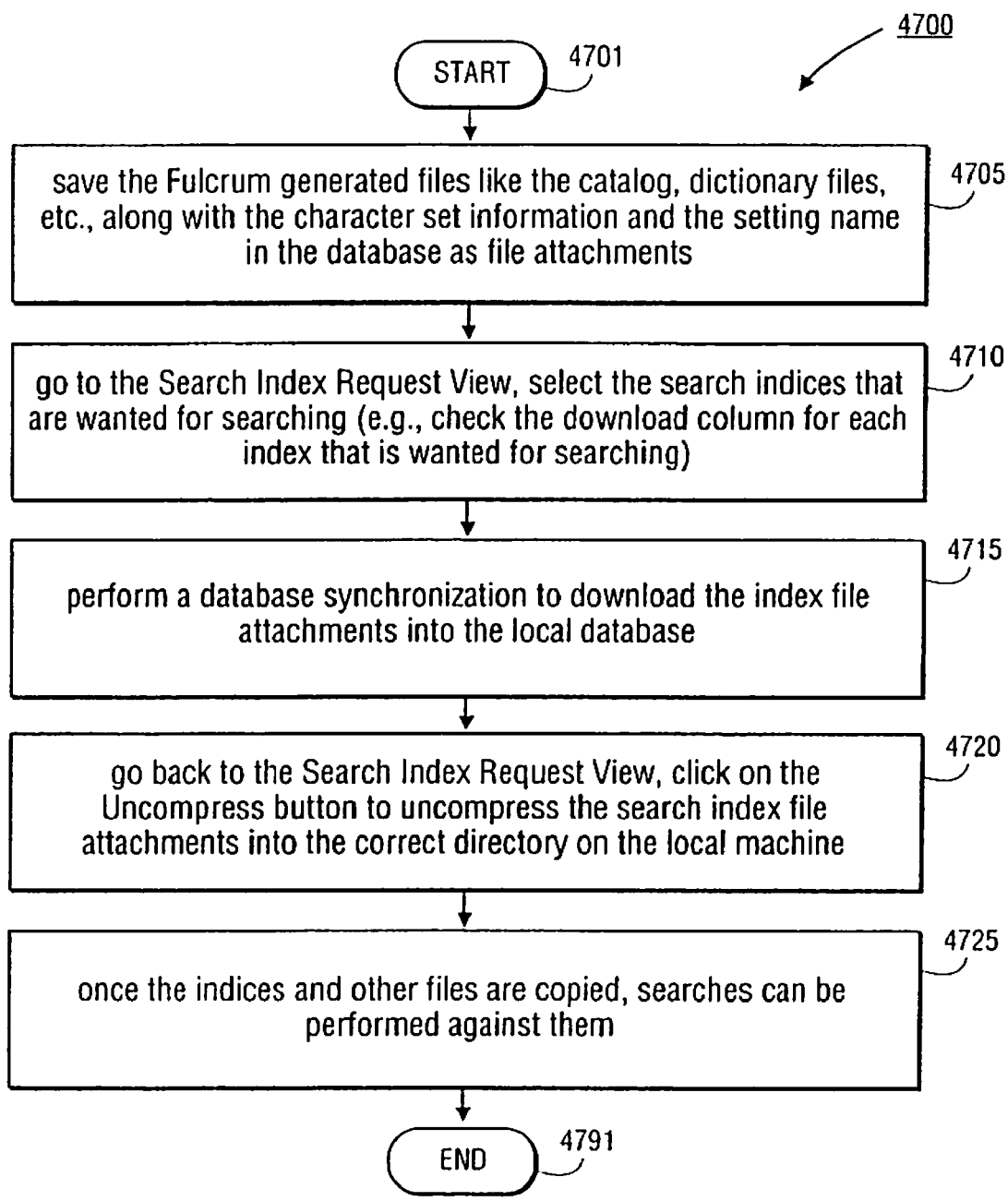
FIG. 47 shows a flow diagram of one embodiment of a process according to the teachings of the present invention.

FIG. 47 shows a flow diagram of one embodiment of a process for uploading indices to DB and file server and for downloading indices to a remote client.

Upload Indices to DB and File Server:
  At block 4705: save the Fulcrum generated files like the catalog, dictionary files, etc., along with the character set information and the setting name in the database as file attachments. In one embodiment, this is done every time an index file is created or refreshed. Accordingly, the most current index files are stored as attachments in the database Download Indices to a Remote Client:
  At block 4710: go to the Search Index Request View, select the search indices that are wanted for searching (e.g., check the download column for each search index that is wanted for searching).
  At block 4715: perform a database synchronization to download the index file attachments into the local database
  At block 4720: go back to the Search Index Request View, click on the Uncompress button to uncompress the search index file attachments into the correct directory on the local machine.
  At block 4725: once the indices and other files are copied, searches can be performed against them.

In one embodiment, subsequent downloads from the server to the DB table will only happen if the Revision Number has changed on the Search Index Files. In this case, the user will have to once again uncompress the index files as described above.

Figure 48:
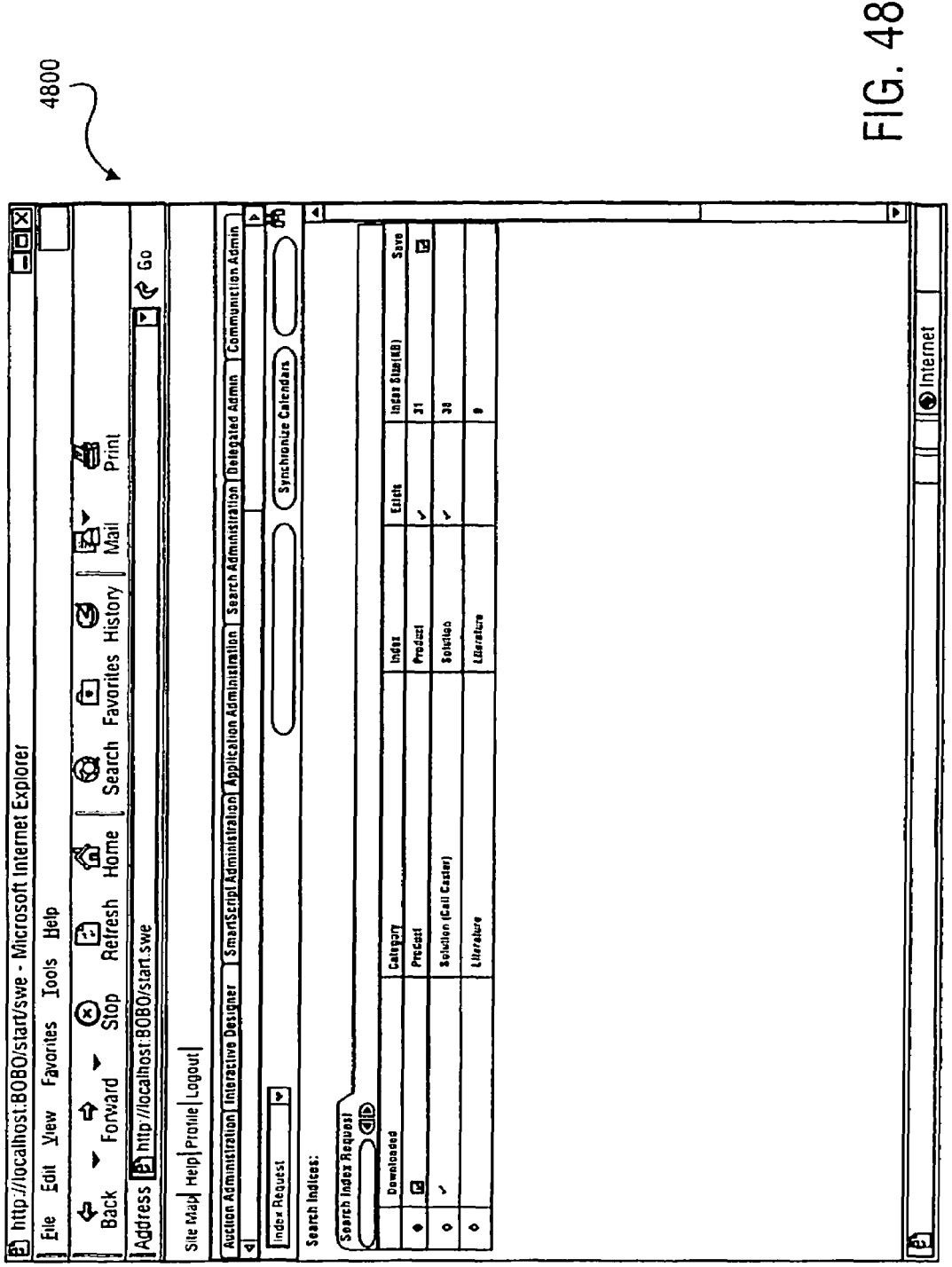
FIG. 48 shows an example of one embodiment of a search index request view (UI)

FIG. 48 shows an example of one embodiment of a search index request view (UI). As shown in FIG. 48, the search index request view includes a list of search indices that can be selected (e.g., by checking the corresponding download column) to down load the corresponding index file attachments into the local database. The uncompress button is used to uncompress the search index file attachments into the correct directory on the local machine.

Data Model Specification

In one embodiment, the schema for the tables used according to the teachings of the present invention are illustrated below:

S_SRCH_INDXINFO

In one embodiment, this is a table to hold search index related information. This table may include the index name, engine name and character set (or code page), etc.

```
CREATE TABLE S_SRCH_INDXINFO
(ROW_ID              VARCHAR2(15) not null
,CREATED             DATE         default sysdate not null
,CREATED_BY          VARCHAR2(15) not null
,LAST_UPD            DATE         default sysdate not null
,LAST_UPD_BY         VARCHAR2(15) not null
,MODIFICATION_NUM    NUMBER(10,0) default 0 not null
,CONFLICT_ID         VARCHAR2(15) default '0' not null
,INDEX     VARCHAR2(75) not null - name of the index
,SRCH_ENGINE_CD      VARCHAR2(75) not null - name of
                                  search engine
,CHARACTER_SET       VARCHAR (75) not null - name of the
                                  character set
);
create unique index S_SRCH_INDXINFO_P1 on
S_SRCH_INDXINFO (ROW_ID);
create unique index S_SRCH_INDXINFO_U1 on
S_SRCH_INDXINFO (CHARACTER_SET,
SRCH_ENGINE_CD, INDEX);
```

S_SRCH_INDXINFO_ATT

In one embodiment, this is a table to hold all search index related file attachments for a search engine+search index+character set (or codepage) combination.

```
CREATE TABLE S_SRCH_INDXINFO_ATT
(ROW_ID              VARCHAR2(15) not null
,CREATED             DATE                     default sysdate not null
,CREATED_BY          VARCHAR2(15)             not null
,LAST_UPD            DATE                     default sysdate not null
,LAST_UPD_BY VARCHAR2(15)                     not null
,MODIFICATION_NUM NUMBER(10,0)                default 0 not null
,CONFLICT_ID VARCHAR2(15)                     default '0' not null
,PAR_ROW_ID          VARCHAR2 (15)            not null -- FK to S_SRCH_INDXINFO
,DIRTY_READ          CHARACTER (1)            default true
                                              -- a flag that indicates if the index file
                                              -- attachments have changed/refreshed --- since the
                                              last synch.
,FILE_NAME           VARCHAR2(200)            -- file name
-- and other file related columns
);
create unique index S_SRCH_INDXINFO_ATT_P1 on S_SRCH_INDXINFO_ATT (ROW_ID);
create index S_SRCH_INDXINFO_ATT_F1 on S_SRCH_INDXINFO_ATT (PAR_ROW_ID);
```

Figure 49:
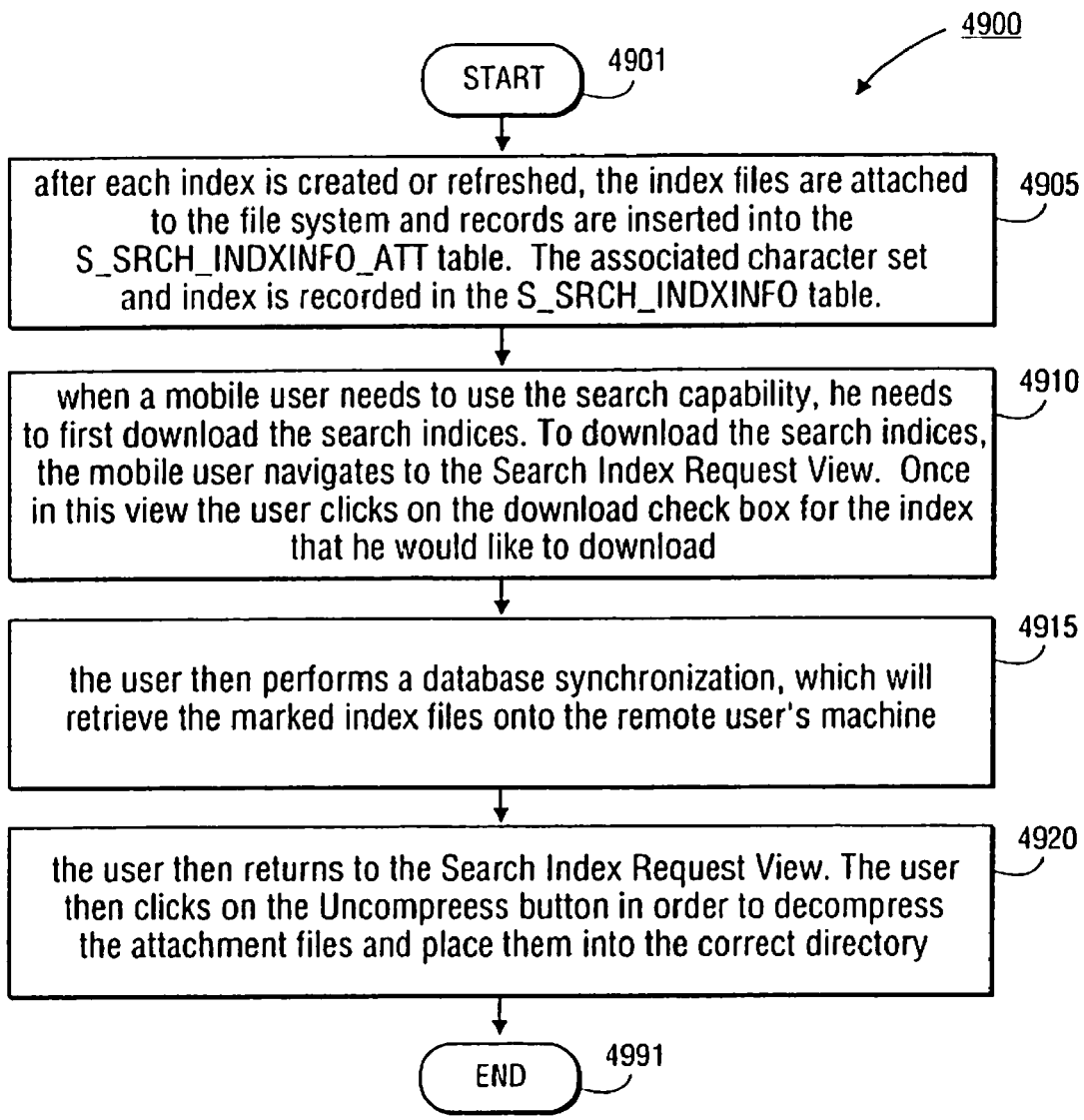
FIG. 49 illustrates a flow diagram of one embodiment of a process for remote client search indexing in accordance with the teachings of the present invention.

FIG. 49 shows a flow diagram of one embodiment of a process for remote client search indexing according to the teachings of the present invention.

At block 4905: after each index is created or refreshed, the index files are attached to the file system and records are inserted into the S_SRCH_INDXINFO_ATT table. The associated character set and index is recorded in the S_SRCH_INDXINFO table.

At block 4910: when a mobile user needs to use the search capability, he needs to first download the search indices. In one embodiment, in order to download the search indices, the mobile user navigates to the Search Index Request View. Once in this view the user clicks on the download check box for the index that he would like to download. In one embodiment, when the user checks the download box, the system goes through the S_SRCH_INDXINFO_ATT table and mark the associated index attachment files to be requested next time a database synchronization is performed.

At block 4915: the user then performs a database synchronization, which will retrieve the marked index files onto the remote user's machine. In one embodiment, if the index files have not changed since the last synchronization they will not be downloaded.

At block 4920: the user then returns to the Search Index Request View. The user then clicks on the Uncompress button in order to decompress the attachment files and place them into the correct directory. After the process is complete the remote user will be able to search using search indices.

It should be noted that the functional components, as shown above in the figures and described in the text accompanying the figures, could be implemented using software code segments. If the aforementioned functional components are implemented using software code segments, these code segments can be stored on a machine-readable medium, such as floppy disk, hard drive, CD-ROM, DVD, tape, memory, or any storage device that is accessible by a computing machine.

The invention has been described in conjunction with the preferred embodiment. It is evident that numerous alternatives, modifications, variations and uses will be apparent to those skilled in the art in light of the foregoing description.

What is claimed is:

1. A method comprising:
configuring search indices on a first server, the search indices being associated with corresponding business components;
displaying the search indices to a first client, the first client being connected to the first server via a computer network and being configured to perform search using data records stored on a local machine; and
downloading one or more particular search indices from the first server onto the local machine in response to the first client's request to download the one or more particular search indices to be used for searching on the local machine, wherein
the downloading comprises performing a database synchronization operation to download index files comprising search indices as attachments onto the local machine.

2. The method of claim 1 wherein each search index is associated to a corresponding search category.

3. The method of claim 2 wherein displaying the search indices includes:
displaying a list of search categories that are associated to the search indices.

4. The method of claim 1 further including:
providing the first client with a mechanism to individually select one or more particular search indices for download onto the local machine.

5. The method of claim 1 further including:
performing an uncompress operation to uncompress the index files downloaded from the first server into a specific directory on the local machine.

6. The method of claim 1 wherein each search index is represented by a corresponding search index object which includes an index identifier and a business component identifier of a specific business component to which the respective search index is associated.

7. The method of claim 1 wherein configuring the search indices includes:
defining a search index object for each business component that needs to be indexed by a search engine; and
associating the respective search index object to the corresponding business component.

8. The method of claim 1 wherein search index related information including index identifier and search engine identifier are stored in a first table and search index related file attachments are stored in a second table.

9. The method of claim 8 wherein downloading includes:
marking associated index attachment files to be downloaded in response to the first client's request for a database synchronization operation.

10. A system comprising:
means for configuring search indices on a first server, the search indices being associated with corresponding business components;
means for displaying the search indices to a first client, the first client being connected to the first server via a computer network and being configured to perform search using data records stored on a local machine; and
means for downloading one or more particular search indices from the first server onto the local machine in response to the first client's request to download the one or more particular search indices to be used for searching on the local machine, wherein
the means for downloading further comprises a means for performing a database synchronization operation to download index files comprising search indices as attachments onto the local machine.

11. The system of claim 10 wherein each search index is associated to a corresponding search category.

12. The system of claim 11 wherein the means for displaying the search indices includes:
means for displaying a list of search categories that are associated to the search indices.

13. The system of claim 10 further including:
means for providing the first client with a mechanism to individually select one or more particular search indices for download onto the local machine.

14. The system of claim 10 further including:
the means for performing an uncompress operation to uncompress the index files downloaded from the first server into a specific directory on the local machine.

15. The system of claim 10 wherein each search index is represented by a corresponding search index object which includes an index identifier and a business component identifier of a specific business component to which the respective search index is associated.

16. The system of claim 10 wherein the means for configuring the search indices includes:
means for defining a search index object for each business component that needs to be indexed by a search engine; and
means for associating the respective search index object to the corresponding business component.

17. The system of claim 10 wherein search index related information including index identifier and search engine identifier are stored in a first table and search index related file attachments are stored in a second table.

18. The system of claim 17 wherein the means for downloading includes:
means for marking associated index attachment files to be downloaded in response to the first client's request for a database synchronization operation.

* * * * *

UNITED STATES PATENT AND TRADEMARK OFFICE
CERTIFICATE OF CORRECTION

| | | |
|---|---|---|
| PATENT NO. | : 7,698,282 B2 | |
| APPLICATION NO. | : 11/742935 | |
| DATED | : April 13, 2010 | |
| INVENTOR(S) | : Pavitra Subramaniam et al. | |

It is certified that error appears in the above-identified patent and that said Letters Patent is hereby corrected as shown below:

Title page, Item (74), in column 2, under "Attorney", line 1, delete "Cambpell" and insert -- Campbell --, therefor.

In column 29, line 30, delete "Ul" and insert -- UI --, therefor.

Signed and Sealed this
Nineteenth Day of April, 2011

David J. Kappos
*Director of the United States Patent and Trademark Office*